(12) United States Patent
Monroe

(10) Patent No.: US 7,428,002 B2
(45) Date of Patent: Sep. 23, 2008

(54) EMERGENCY TELEPHONE WITH INTEGRATED SURVEILLANCE SYSTEM CONNECTIVITY

(76) Inventor: David A. Monroe, 7800 IH 10 W., No. 740, San Antonio, TX (US) 78230-4753

( * ) Notice: Subject to any disclaimer, the term of this patent is extended or adjusted under 35 U.S.C. 154(b) by 412 days.

(21) Appl. No.: 10/163,679

(22) Filed: Jun. 5, 2002

(65) Prior Publication Data

US 2003/0227540 A1    Dec. 11, 2003

(51) Int. Cl.
*H04N 7/18* (2006.01)
(52) U.S. Cl. .................. 348/143; 348/153
(58) Field of Classification Search ......... 348/100–300; 725/100–130
See application file for complete search history.

(56) References Cited

U.S. PATENT DOCUMENTS

| | | |
|---|---|---|
| 4,163,283 A | 7/1979 | Darby |
| 4,179,695 A | 12/1979 | Levine et al. |
| 4,197,536 A | 4/1980 | Levine |
| 4,516,125 A | 5/1985 | Schwab et al. |
| 4,831,438 A | 5/1989 | Bellman, Jr. et al. |
| 4,845,629 A | 7/1989 | Murge |
| 4,857,912 A | 8/1989 | Everett, Jr. et al. |
| 4,891,650 A | 1/1990 | Sheffer |
| 4,910,692 A | 3/1990 | Outram |
| 5,027,104 A | 6/1991 | Reid |
| 5,027,114 A | 6/1991 | Kawashime et al. |
| 5,091,780 A | 2/1992 | Pomerleau |
| 5,111,291 A | 5/1992 | Erickson |
| 5,166,746 A | 11/1992 | Sato et al. |
| 5,202,759 A | 4/1993 | Laycock |
| 5,218,367 A | 6/1993 | Sheffer et al. |
| 5,243,340 A | 9/1993 | Norman et al. |
| 5,243,530 A | 9/1993 | Stanifer et al. |
| 5,268,698 A | 12/1993 | Smith, Sr. et al. |
| 5,283,643 A | 2/1994 | Fujimoto |
| 5,321,615 A | 6/1994 | Frisbie et al. |

(Continued)

FOREIGN PATENT DOCUMENTS

EP    220752    5/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—Andy S Rao

(57) ABSTRACT

A digital telephone or an analog telephone system with VOIP conversion is linked into the surveillance system and transmissions therefrom are treated as an event requiring an emergency response from the system. The system supports integration of emergency telephone systems into a multi-media surveillance system to permit comprehensive and multiple responses to an event triggered by receipt of the emergency phone call transmission. The telephone transmission is captured and transmitted to a surveillance system processor. Upon receipt, the system can react with any of numerous responses. First, the telephone call is transmitted to a manned station and may be answered in the normal fashion with a live voice response. The receipt of the call also activates the entire system in the same manner as a triggering signal from any other sensor or appliance. In addition, various other responses may be activated, either manually or in a pre-programmed hierarchy.

55 Claims, 86 Drawing Sheets

U.S. PATENT DOCUMENTS

| | | |
|---|---|---|
| 5,334,982 A | 8/1994 | Owen |
| 5,341,194 A | 9/1994 | Rose et al. |
| 5,400,031 A | 3/1995 | Fitts |
| 5,408,330 A | 4/1995 | Squicciarini et al. |
| 5,432,838 A | 7/1995 | Purchase |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rochall et al. |
| 5,469,371 A | 11/1995 | Bess |
| 5,497,149 A | 3/1996 | Fast |
| 5,508,736 A | 4/1996 | Cooper |
| 5,530,440 A | 6/1996 | Denzer et al. |
| 5,553,609 A | 9/1996 | Chen et al. |
| 5,557,254 A | 9/1996 | Johnson et al. |
| 5,557,278 A | 9/1996 | Piccirillo et al. |
| 5,598,167 A | 1/1997 | Zjderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Avid |
| 5,670,961 A | 9/1997 | Tomote et al. |
| 5,677,979 A | 10/1997 | Squicciarini |
| 5,689,442 A | 11/1997 | Swanson |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozler |
| 5,777,551 A | 7/1998 | Hess |
| 5,777,580 A | 7/1998 | Janky et al. |
| 5,793,416 A | 8/1998 | Rostoker et al. |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joso |
| 5,926,210 A | 7/1999 | Hackett et al. |
| 5,933,098 A | 8/1999 | Haxton |
| 5,938,706 A | 8/1999 | Feldman |
| 5,974,158 A | 10/1999 | Auty et al. |
| 5,983,161 A | 11/1999 | Lemelson et al. |
| 5,999,116 A | 12/1999 | Evers |
| 6,002,427 A | 12/1999 | Kipust |
| 6,009,356 A | 12/1999 | Monroe |
| 6,067,571 A | 5/2000 | Igarashi et al. |
| 6,069,655 A | 5/2000 | Seeley |
| 6,078,850 A | 6/2000 | Kane et al. |
| 6,084,510 A | 7/2000 | Lemelson et al. |
| 6,092,008 A | 7/2000 | Bateman |
| 6,100,964 A | 8/2000 | De Cremiers |
| 6,133,941 A | 10/2000 | Ono |
| 6,154,465 A | 11/2000 | Pickett |
| 6,154,658 A | 11/2000 | Caci |
| 6,157,317 A | 12/2000 | Walker |
| 6,181,373 B1 | 1/2001 | Coles |
| 6,195,609 B1 | 2/2001 | Pilley et al. |
| 6,204,760 B1 | 3/2001 | Brunius |
| 6,208,658 B1 | 3/2001 | Pickett |
| 6,208,952 B1 | 3/2001 | Goertzel et al. |
| 6,226,031 B1 | 5/2001 | Barraciough et al. |
| 6,246,320 B1 | 6/2001 | Monroe |
| 6,259,475 B1 | 7/2001 | Ramachandran et al. |
| 6,266,340 B1 | 7/2001 | Pickett et al. |
| 6,266,341 B1 | 7/2001 | Surprenant et al. |
| 6,275,231 B1 | 8/2001 | Obradovich |
| 6,278,965 B1 | 8/2001 | Glass et al. |
| 6,282,488 B1 | 8/2001 | Castor et al. |
| 6,289,025 B1 | 9/2001 | Pang et al. |
| 6,292,098 B1 | 9/2001 | Ebata |
| 6,298,045 B1 | 10/2001 | Pang et al. |
| 6,337,858 B1 | 1/2002 | Petty et al. |
| 6,343,074 B1 | 1/2002 | Pickett |
| 6,356,554 B1 | 3/2002 | Pickett et al. |
| 6,356,625 B1 | 3/2002 | Casteiani |
| 6,366,578 B1 | 4/2002 | Johnson |
| 6,385,194 B2 | 5/2002 | Surprenant et al. |
| 6,385,772 B1 | 5/2002 | Courtney |
| 6,396,849 B1 | 5/2002 | Sarkissian et al. |
| 6,400,711 B1 | 6/2002 | Pounds et al. |
| 6,424,370 B1 | 7/2002 | Courtney |
| 6,445,682 B1 | 9/2002 | Weitz |
| 6,462,697 B1 | 10/2002 | Klamer et al. |
| 6,476,858 B1 | 11/2002 | Ramirez Diaz et al. |
| 6,496,483 B1 | 12/2002 | Kung et al. |
| 6,498,791 B2 | 12/2002 | Pickett et al. |
| 6,504,479 B1 | 1/2003 | Lemons et al. |
| 6,522,532 B2 | 2/2003 | Liao et al. |
| 6,525,761 B2 | 2/2003 | Sato et al. |
| 6,549,130 B1 | 4/2003 | Joso |
| 6,556,241 B1 | 4/2003 | Yoshimura et al. |
| 6,570,610 B1 | 5/2003 | Kipust |
| 6,628,835 B1 | 9/2003 | Brill |
| 6,646,676 B1 | 11/2003 | DeGrace |
| 6,650,901 B1 * | 11/2003 | Schuster et al. ........... 455/456.1 |
| 6,662,649 B1 | 12/2003 | Knight et al. |
| 6,675,386 B1 | 1/2004 | Hendricks et al. |
| 6,698,021 B1 | 2/2004 | Amini |
| 6,720,990 B1 | 4/2004 | Walker et al. |
| 6,826,173 B1 * | 11/2004 | Kung et al. ................. 370/352 |
| 7,113,971 B1 | 9/2006 | Ohi et al. |
| 2003/0071899 A1 | 4/2003 | Joso |
| 2005/0055727 A1 | 3/2005 | Creamer et al. |
| 2005/0138083 A1 | 6/2005 | Rastegar |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 744630 | 11/1996 |
| EP | 785536 | 7/1997 |
| EP | 613111 | 8/1998 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO9737336 | 10/1997 |
| WO | WO98/52174 | 11/1999 |

OTHER PUBLICATIONS

Nov. 24, 1976, TELEXIS ViaNet General Information Booklet Version 1.3.

2000, ViaNet 3000 Administrator's Manual Version 1.1- NetXpress Video by TELEXIS, Kanata, Ontario, Canada.

1999 Vianet 3000 Operator Manual Version 1.0—NetXpress Video by TELEXIS, Kanata, Ontario, Canada.

1999 ViaNet 3000 Administrator Manual Version 1.0—NetXpress Video by TELEXIS, Kanata, Ontario, Canada.

1999 ViaNet 3000 Instruction Manual Operator's Revision 1—NetXpress Video by TELEXIS, Kanata, Ontario, Canada.

* cited by examiner

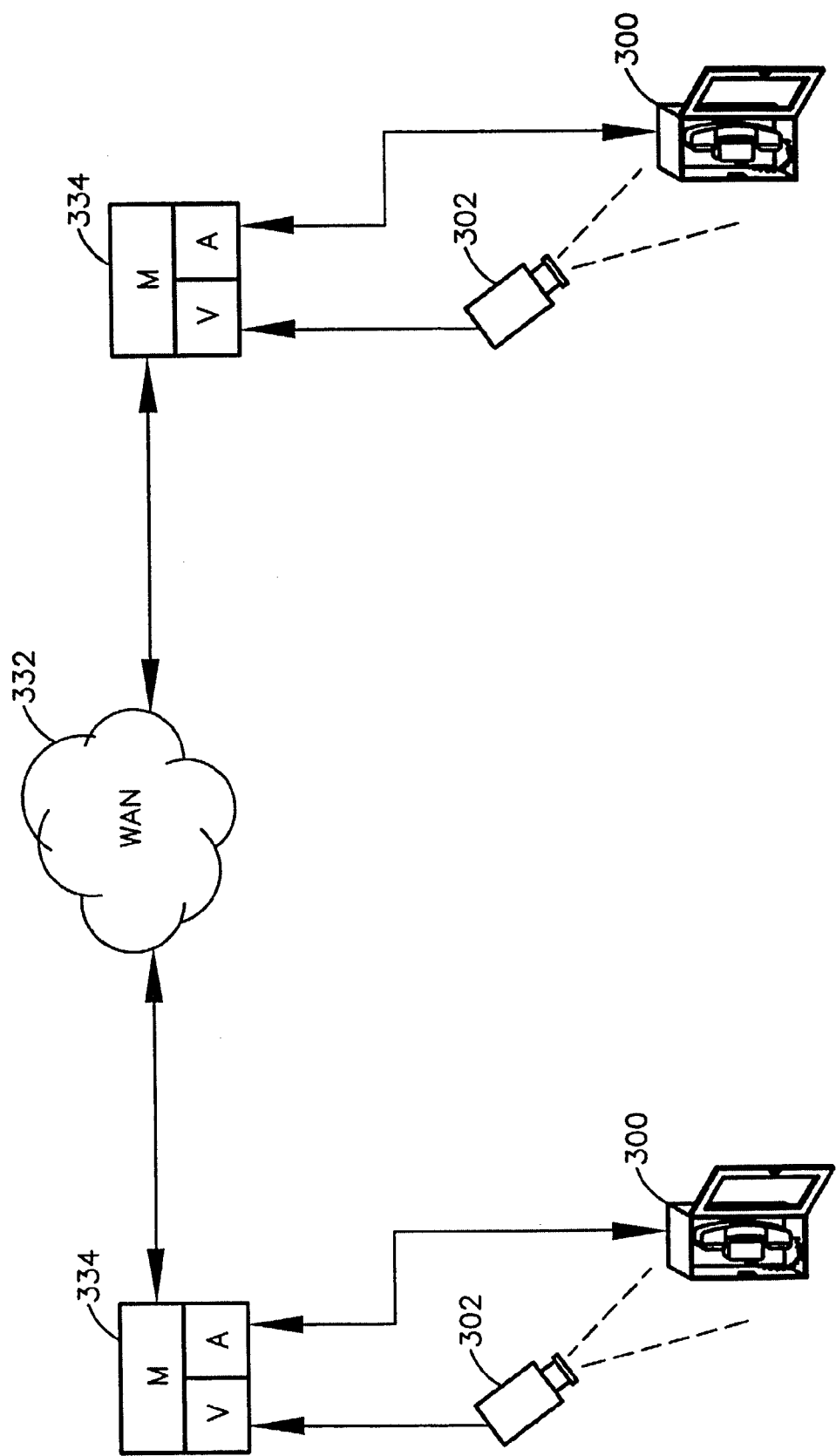

EMERGENCY TELEPHONE WITH INTERNAL
ANALOG CAMERA I/F AND LAN I/F

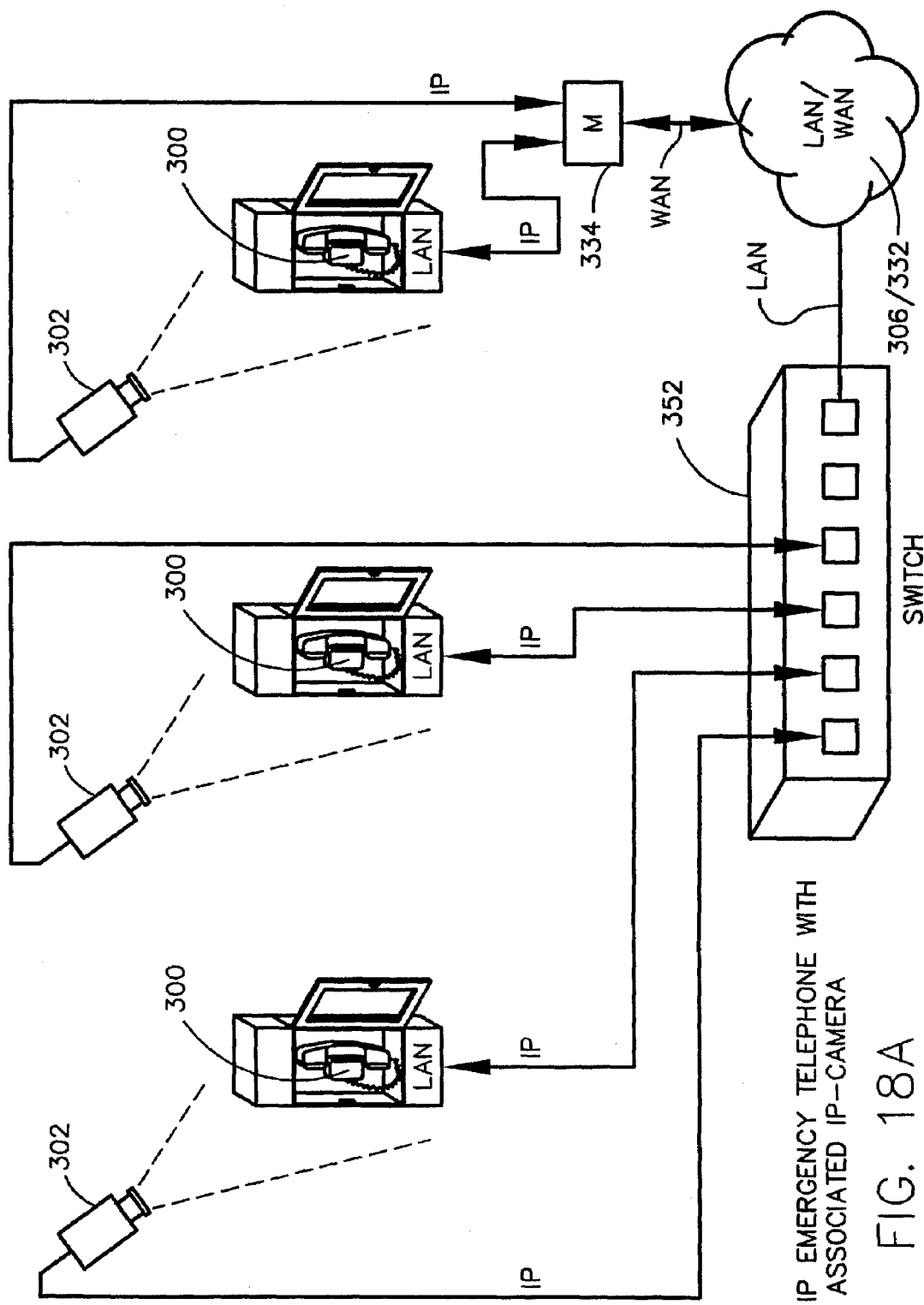

LAN INTERFACE CONFIGURATION

IP EMERGENCY TELEPHONE
WITH INTERNAL LAN HUB
AND IP-CAMERA

EMERGENCY TELEPHONE WITH INTERNAL LAN MODEM AND HUB FOR IP CAMERA

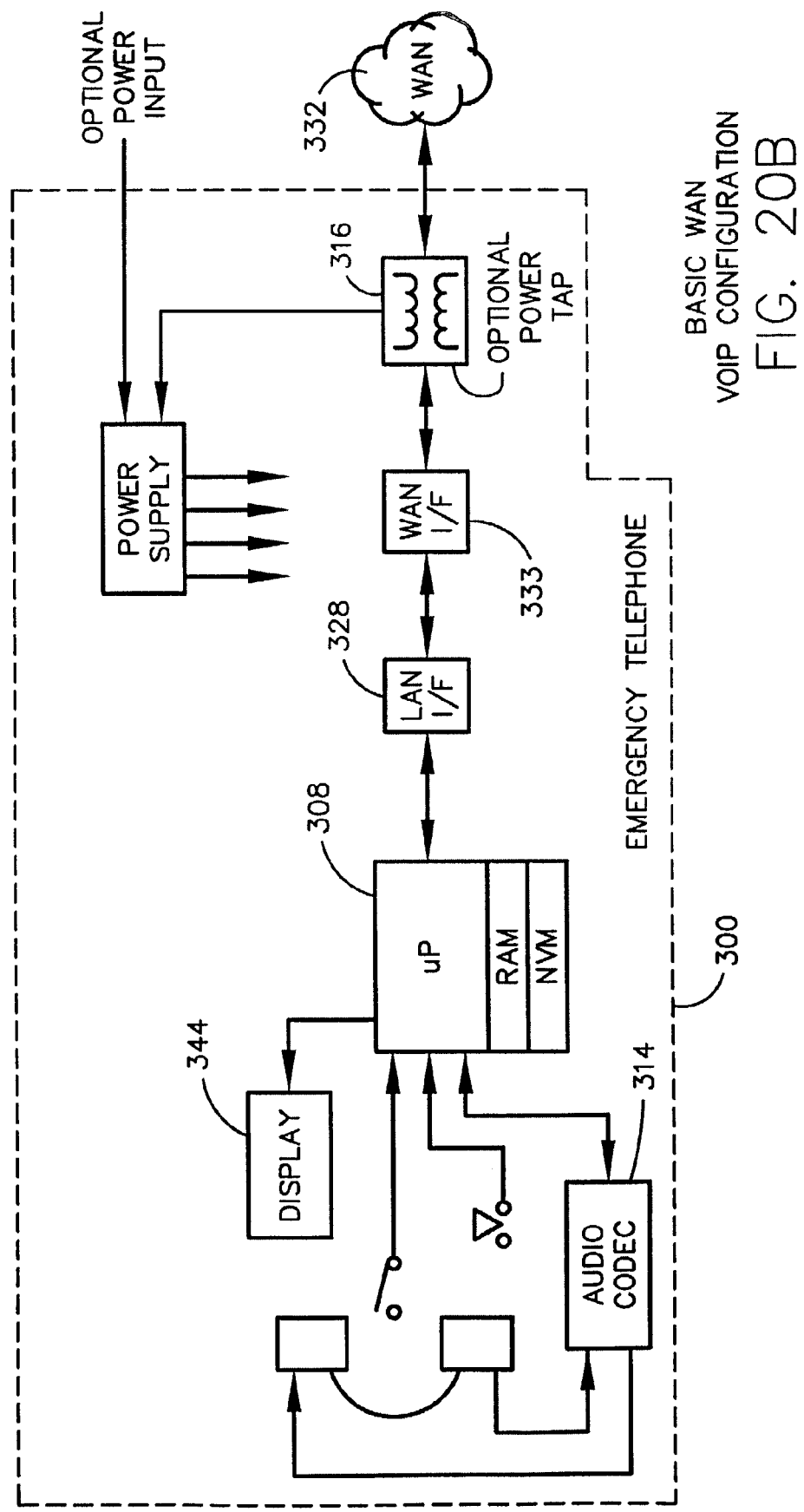
FIG. 20B BASIC WAN VOIP CONFIGURATION

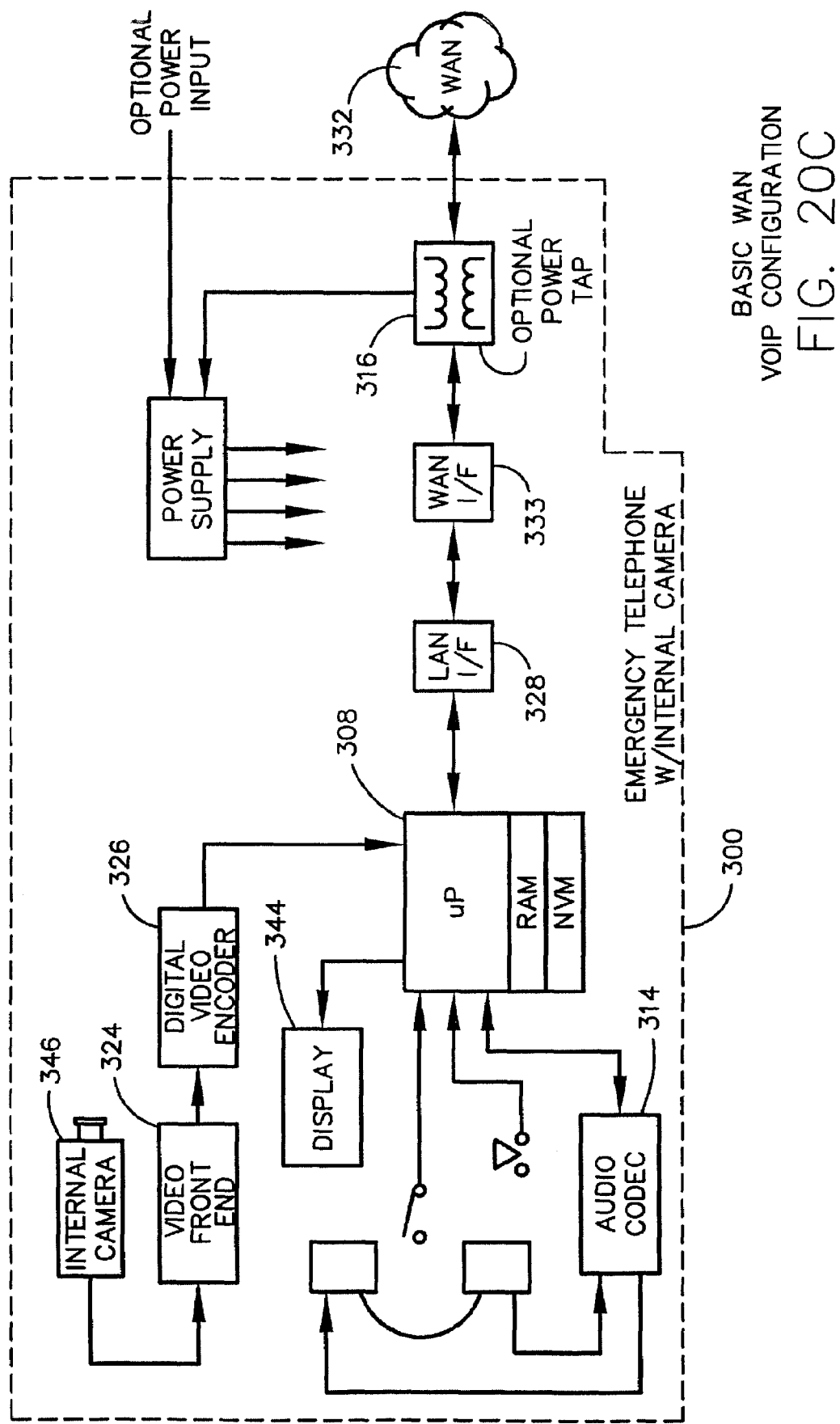

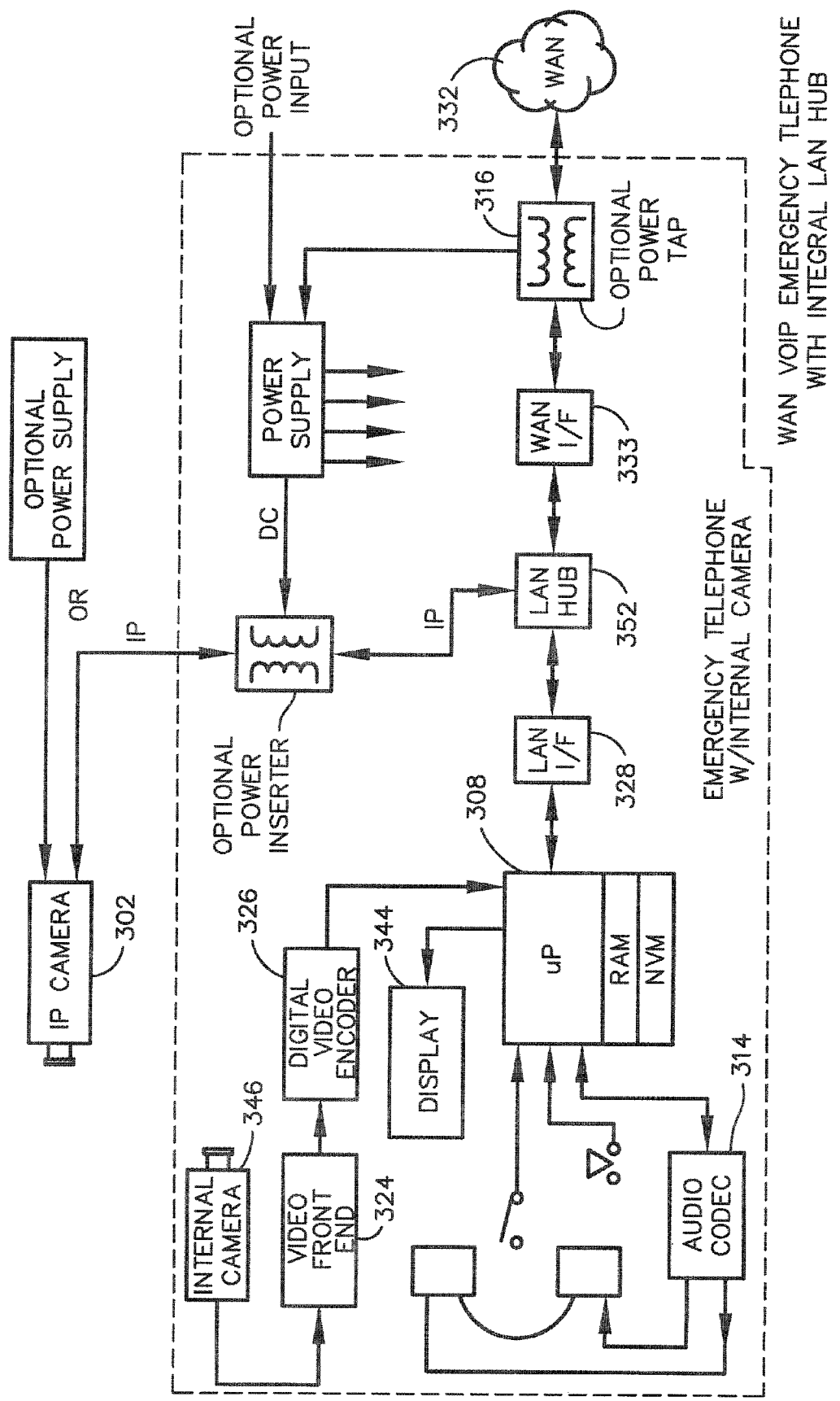

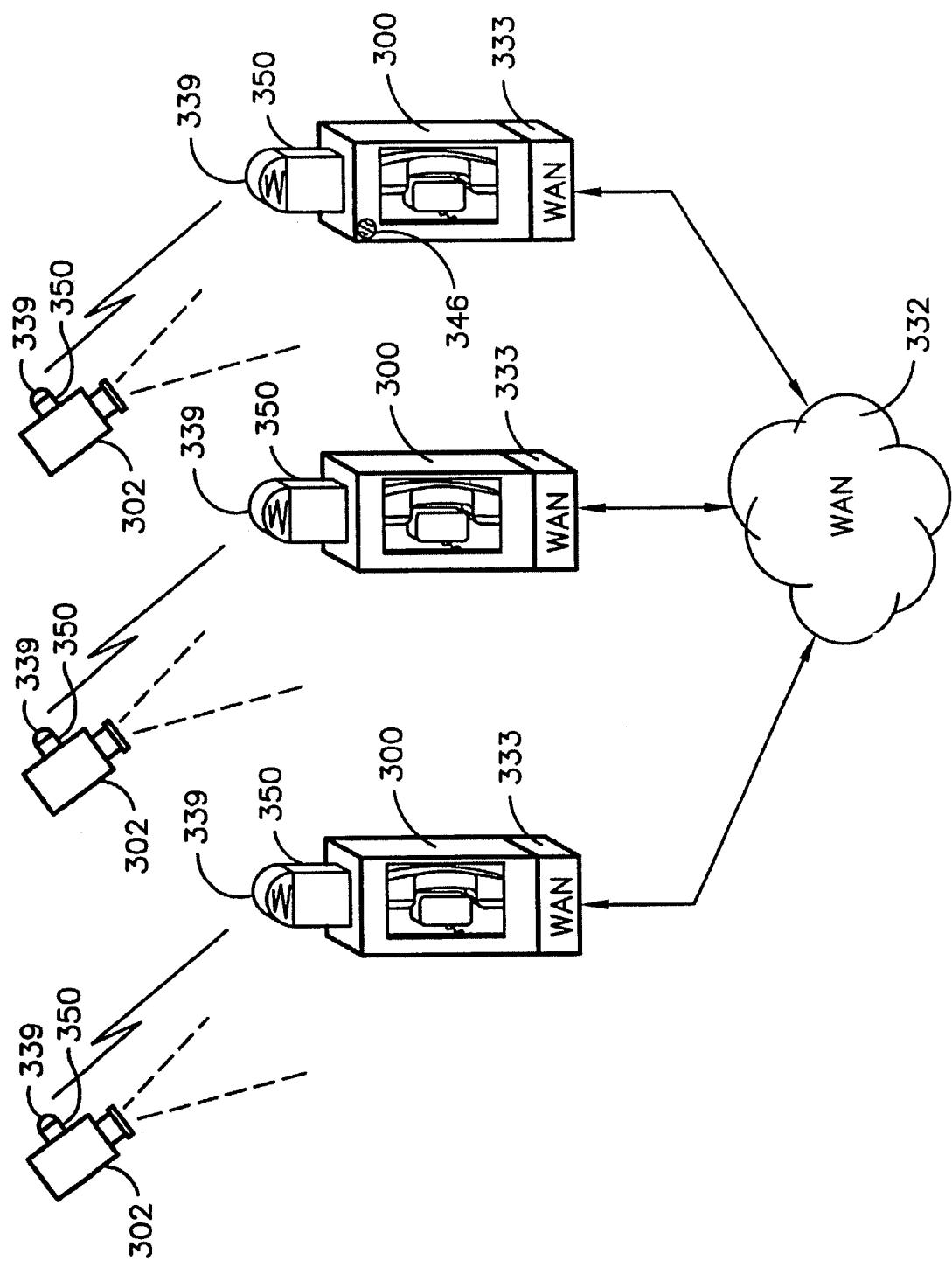

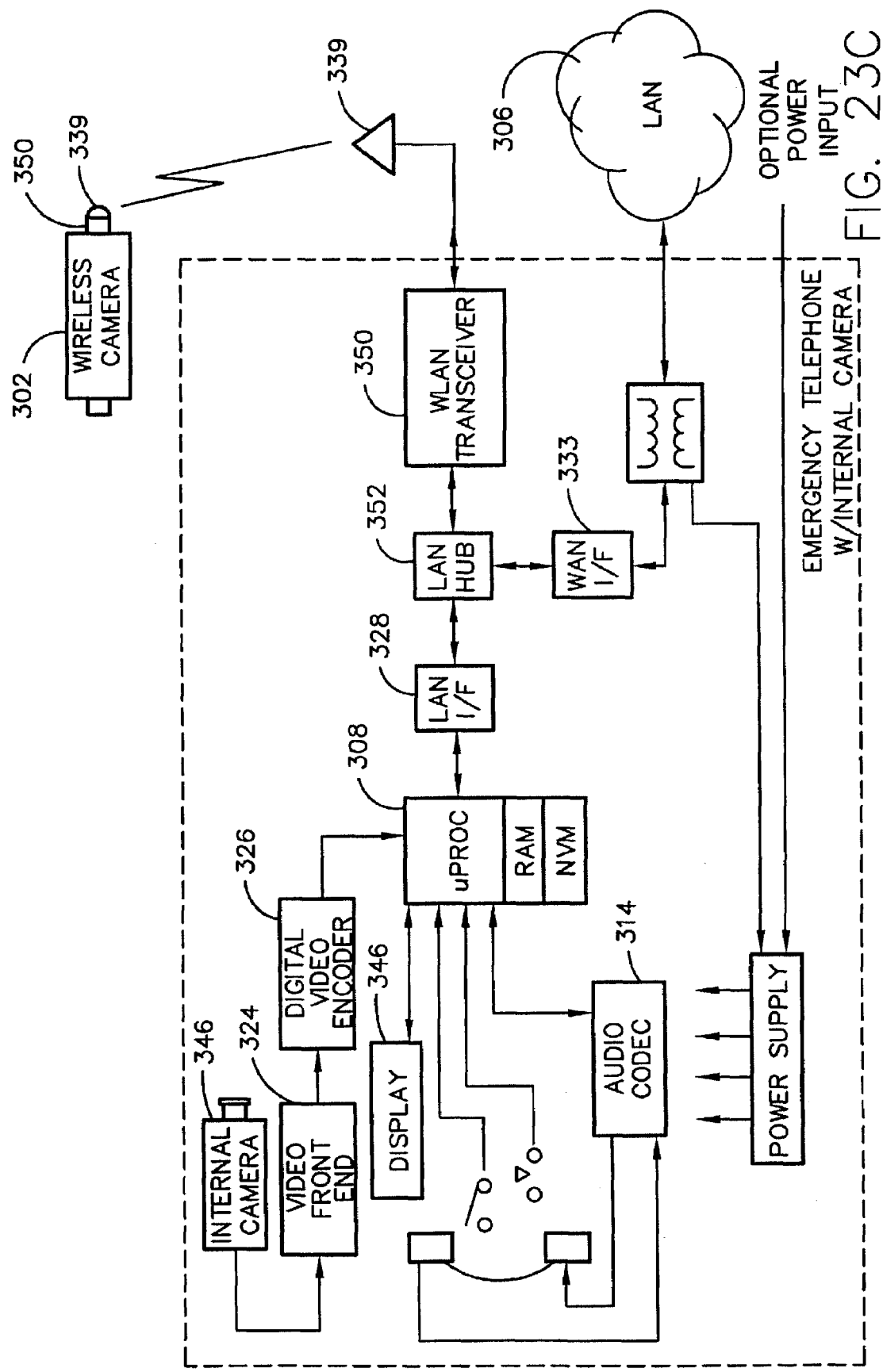

IP CAMERA WITH INTEGRATED LAN & VOIP ENCODER FOR ANALOG OR POTS EMERGENCY TELEPHONE

IP CAMERA WITH INTEGRATED VOIP ENCODER

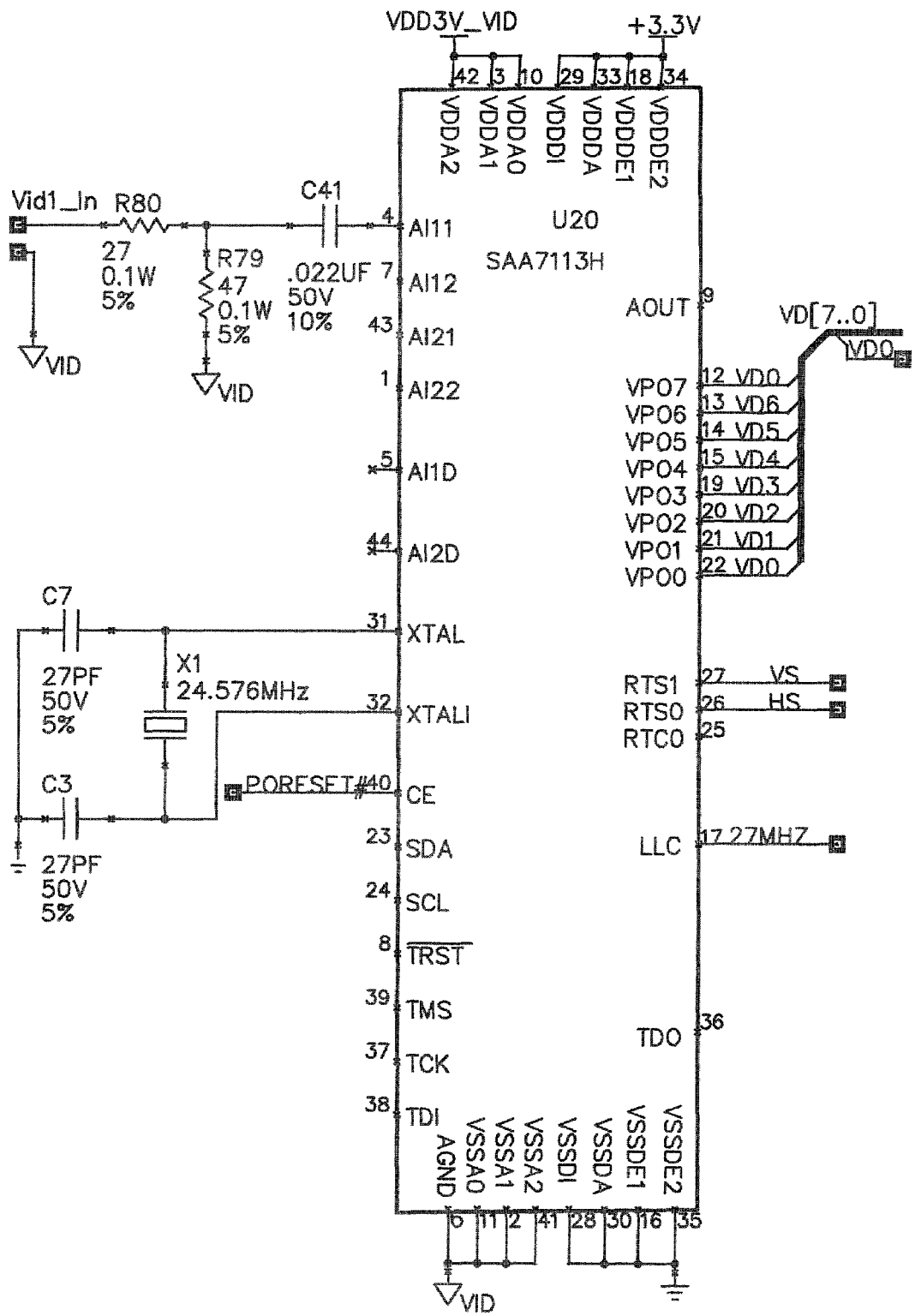
FIG. 33A (VIDEO FRONT END)

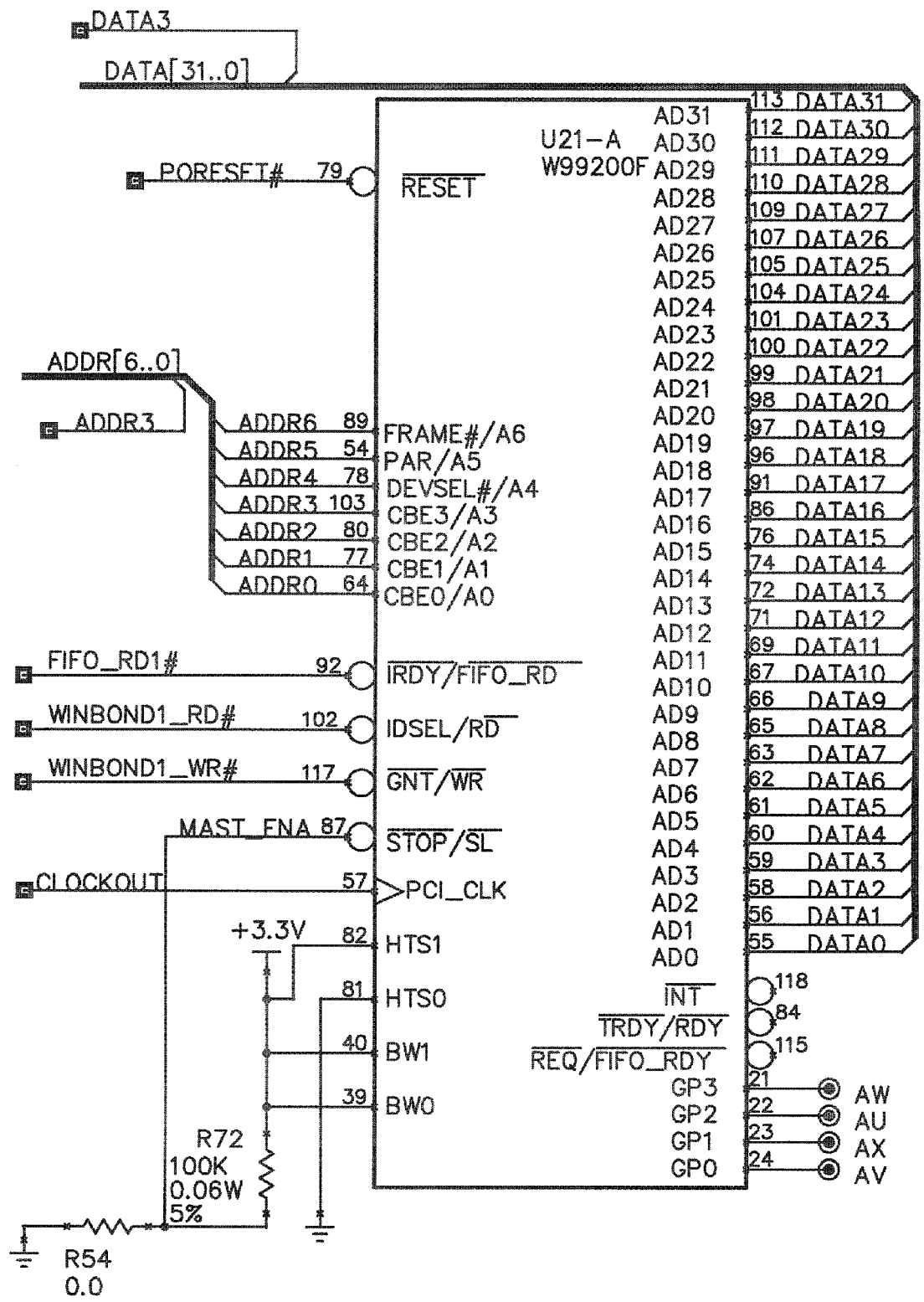
FIG. 33B (VIDEO ENCODER)

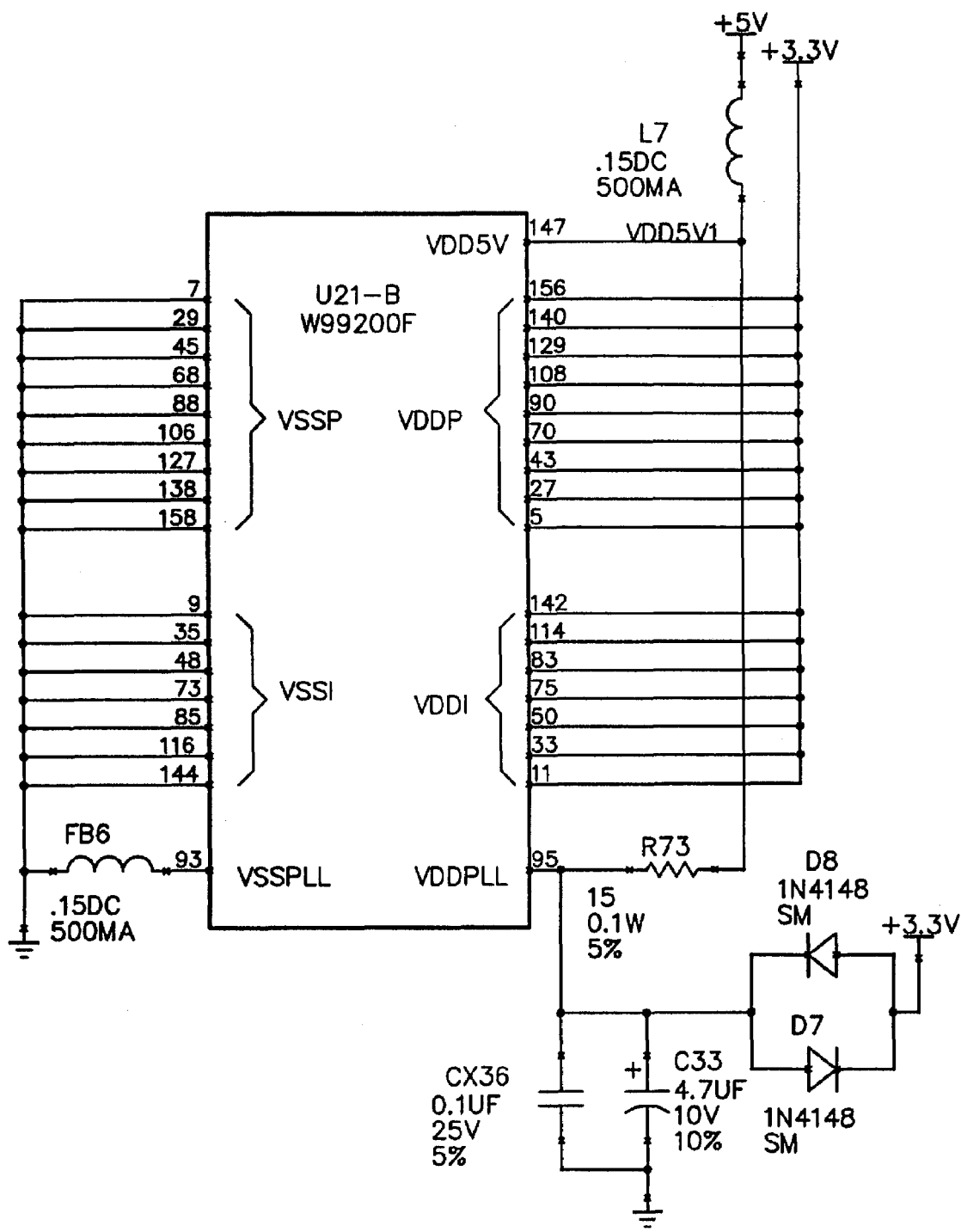
FIG. 33C (VIDEO ENCODER)

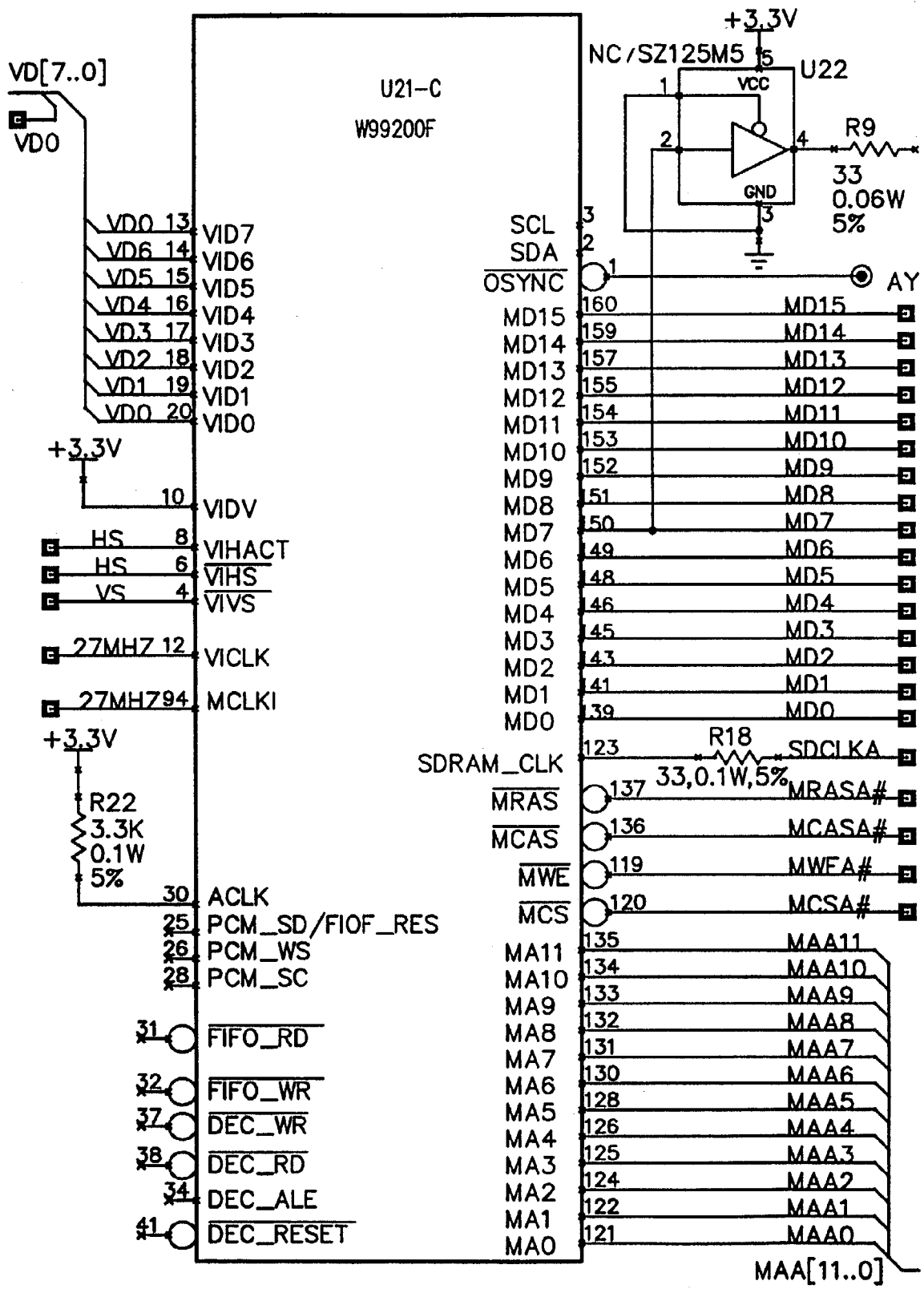
FIG. 33D (VIDEO ENCODER)

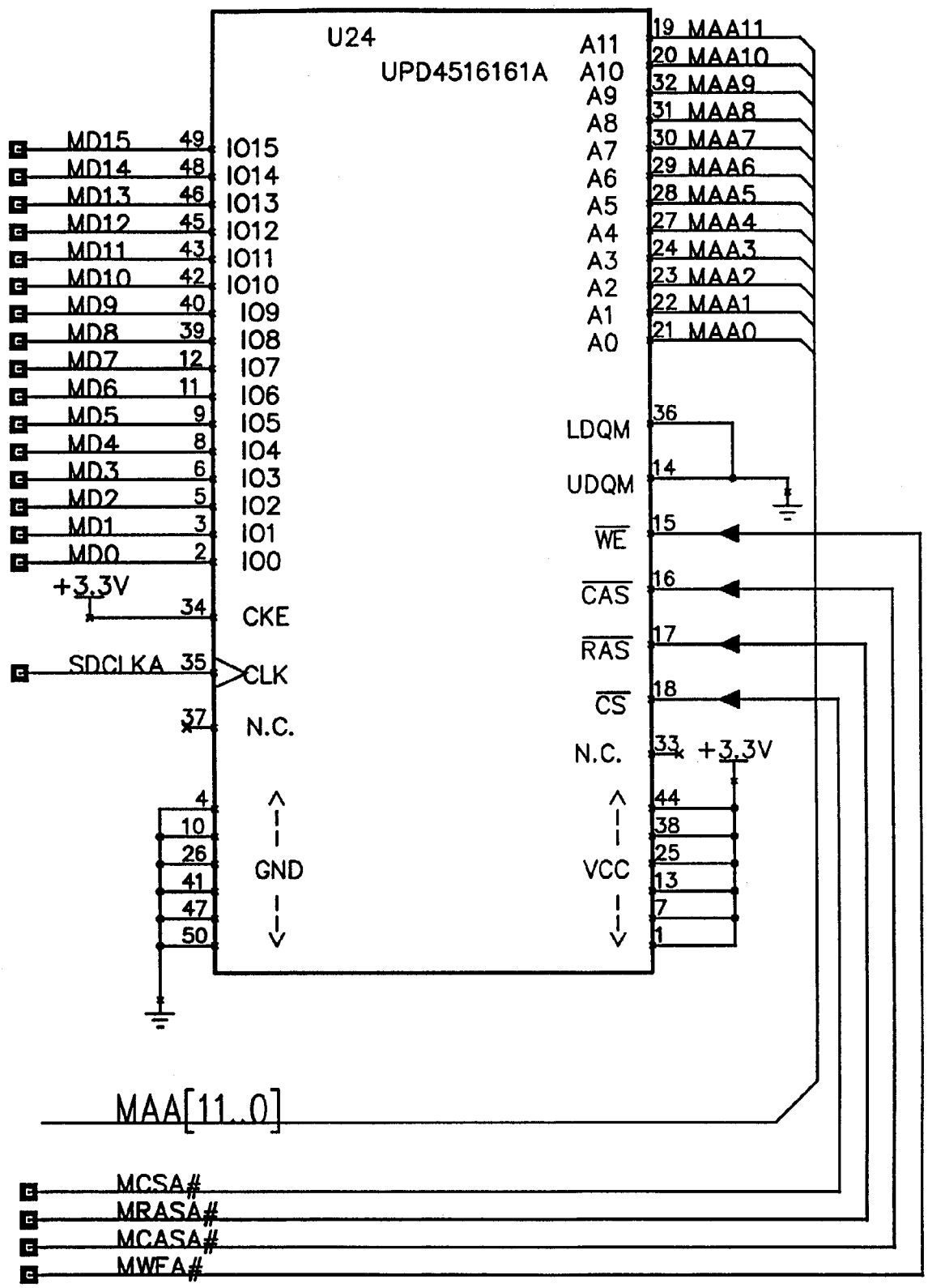
FIG. 33E (VIDEO ENCODER)

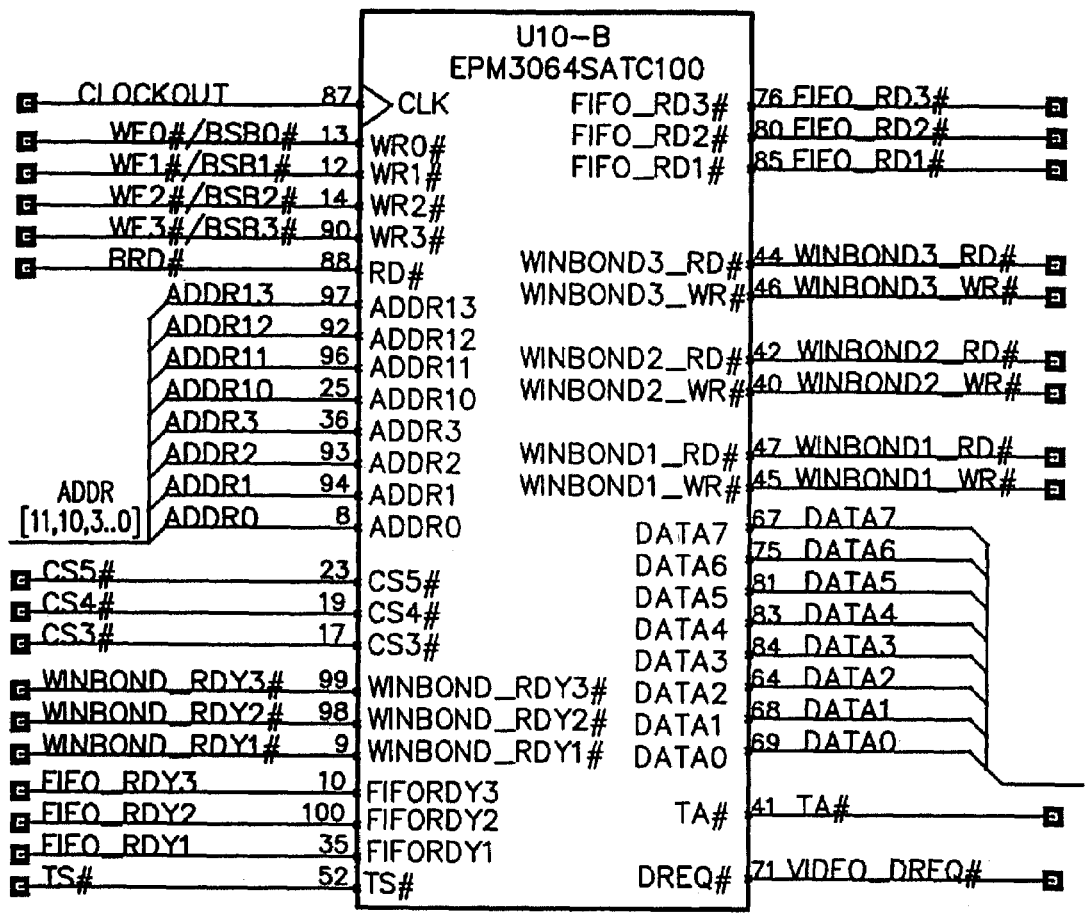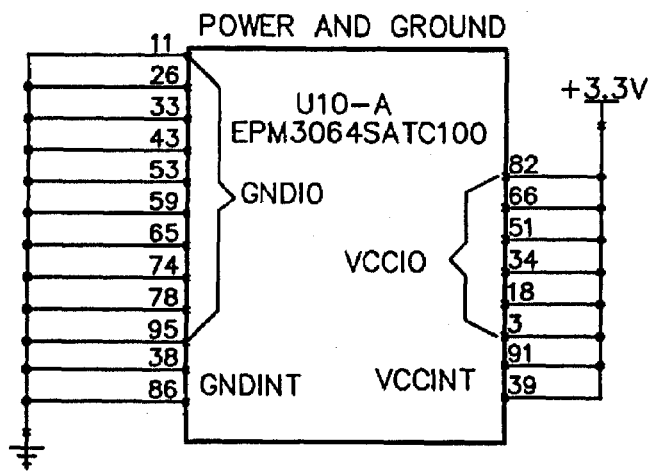
FIG. 33F (VIDEO ENCODER)

EMERGENCY TELEPHONE WITH INTEGRATED SURVEILLANCE SYSTEM CONNECTIVITY

BACKGROUND OF THE INVENTION

1. Field of the Invention

The subject invention is generally related to emergency telephone systems and is specifically directed to an emergency telephone system capable of being connected to and integrated with a network supported comprehensive multimedia surveillance system.

2. Discussion of the Prior Art

It is common practice to provide emergency telephones in strategic locations such as elevators, along highways and in various facilities such as airports, schools and hospitals. Typically these telephones are pre-programmed to dial a security or response station and automatically dial upon removal of the handset from the switch-hook or cradle. Most of these telephones are "Plain Old Telephone Service (POTS)" devices and are hard-wired to the landline telephone system and rely on a common carrier to transmit the call. In some cases, closed circuit systems or dedicated point-to-point systems sometimes called "ring-down circuits" may be utilized. More recently, some emergency telephones have been installed utilizing wireless telephone technology such as cellular. Solar power of these installations allows for easy installation without relying on other public services such as telephone lines and power lines. These are appearing along remote highways, on college campuses, in parks, and in other outdoor public areas.

In use, the caller requiring emergency assistance will pick up the telephone and once answered, will provide the responding party with details of the emergency. In more sophisticated installations the identification of the emergency telephone will be conveyed utilizing Caller ID (CLID) technology, which then can index into a database and present the location of the telephone from which the call is being made. While these systems have been in wide use for many years, there remain several drawbacks to the usefulness of the system in dealing with many emergency situations. First, the receiving station must be continuously manned in a specific location such as at a guard station. There are many instances where a guard or other personnel is busy making rounds or with other duties and is not available to answer the call immediately upon transmission. In certain types of situations, time may be a very critical factor in dealing with the emergency, and such delays in response can diminish the opportunity to deal with the emergency in the most effective manner.

Further, such systems do not permit the responding personnel to make any personal direct assessment of the emergency. They are required to take the information given to them as accurate and accordingly develop their response. This presents a problem in determining whether the caller is overstating or understating the emergency conditions. This problem is magnified by the fact that the caller may be under some stress when placing the call and may not be able to give accurate information in a calm manner, leaving it to the response personnel to make an assessment of the situation with less than optimum information. In extreme cases, the person making the call may be injured or even incapacitated and not be able to make adequate disclosure of the emergency. The person may also be forced to flee the location of the emergency telephone before a complete disclosure has been made.

Recently, security systems have been developed which have the capability of better assessing an event and of transmitting information to a hierarchy of recipients depending on the assessed conditions. In additions, such systems have back-up capability so that when the first response destination is not available the information is forwarded to back-up response destinations in a selected priority, assuring that a response can be made in a timely manner. An example of such a system is shown and described in my copending applications Ser. No. 09/257,720, filed on Feb. 25, 1999; Ser. No. 09/594,041, filed on Jun. 14, 2000; and Ser. No. 09/853,274, filed on May 11, 2001.

Such systems greatly enhance the assessment of a situation and expedite appropriate responses. To date, emergency telephone systems have not been able to assure the quick and accurate responses that are available with the comprehensive, multimedia surveillance systems such as described in the aforementioned application.

An additional disadvantage is the reliance on landline telephone systems to transmit the call. Often this form of communication is one of the first systems to break down in an emergency. Alternative and back-up communications systems are desired to assure that an emergency call can be properly transmitted to the intended recipient.

More recently, appliances have been designed that permit analog telephone systems to provide voice data that can be converted to IP protocols, permitting digitizing of the information for transmission over digital systems such as LANS, WANS and the Internet. An example of such an appliance is the MULTIVOIP Standalone voice/IP gateway appliance offered by MultiTech Systems of Mounds View, Minn. This system supports analog voice and fax communication of an IP network. These voice over IP or VOIP systems permit standard, analog telephones (sometimes called by the industry POTS—Plain Old Telephone Service telephones) to be used to communicate voice transmissions directly over a digital network system. Cisco Systems also makes a similar product, the ATA 186 Analog Telephone Adapter that allows POTS telephone instruments to perform on an IP telephone system.

Purely digital IP telephones have also been designed. These devices do not convert existing analog telephone instruments to IP; instead they are devices that include the telephone handset, the analog to digital/digital to analog converter (CODEC) and the IP interface into one device. These devices also facilitate transmission of voice over digital networks such as LANS, WANS, Wireless LANS and the Internet. Cisco Systems manufactures two such IP telephones. The Cisco 12 SP+ model is the Cisco IP telephone designed for business professionals and office workers. This voice instrument supports 12 programmable line and feature buttons, an internal, high-quality two-way speakerphone, and microphone mute. This phone also features a large LCD display for call status and identification. An LED associated with each of the 12 feature and line buttons provides feature and line status. The Cisco 30 VIP model is the full-featured Cisco IP telephone for executives and managers. This voice instrument provides 30 programmable line and feature buttons, an internal, high-quality, two-way speakerphone with microphone mute, and a transfer feature button. A large 40-character LCD display features ⅝" characters provides information such as date and time, calling party name, calling party number, and digits dialed. An LED associated with each of the 30 feature and line buttons provides feature and line status.

Each model, including the analog telephone adapter with a POTS telephone attached, is a full-featured telephone that can be plugged directly into a standard 10BaseT Ethernet connection. Each provides toll-quality audio, with no need for a companion PC. Because they are IP-based telephones, they can be installed anywhere on a corporate IP network. The telephones are connected to typical network switched hubs and routers in a like manner to PC's. In a preferred implementation, the phones and analog telephone adapters are DHCP Dynamic Host Configuration Protocol (DHCP) supported and do not need to be co-located with the IP switch. Typically the analog telephone adapters and IP telephones communicated with digitized compressed voice conforming to a standard such as the popular G.711 and G.723.1 audio compression for low-bandwidth requirements.

Advanced functions are also provided by the more sophisticated IP telephones. In the case of the Cisco IP Telephones, each model also contains an integrated Ethernet repeater, so you can use a single Ethernet switch port for the computer (data) and the IP telephone. Cisco IP telephones are also Microsoft NetMeeting(TM) enabled. Using NetMeeting, features such as application sharing and videoconferencing are available simply by pressing a button on your Cisco IP telephone. The phones are configured using your Web browser.

It is important to note that the switching function in an IP telephony system is provided by one or more computer processing element(s) on the network to which the IP telephones/adapters are attached. That processing element typically contains a plurality of System Processing Engine (SPE) cards. An SPE card is a computing platform that runs the telephony applications that support the IP phones. The number of cards that are required is dependent upon the number of stations that are to be supported. The processing elements can provide a range of telephony applications. Currently they include:

Call Manager Application—an application that provides connection and management of the voice calls. This software maps directories entries and telephone numbers to telephone sets. This includes all of the logic necessary to "route" the data from the IP address of the origination telephone to the correct IP address for the destination telephones.

Conference Bridge Application—this function allows three or more IP telephones and/or adapters to be connected in a virtual conference. This requires mixing or adding of the voice information in the digital domain and the conference bridge application.

Media Transfer Point Application—this function allows connection of calls over a wide variety of circuits. These may be traditional telephony circuits such as ISDN, T-1, T-2, OC-3, etc. They also may be IP circuits. An example of an IP transfer application is the Cisco IP Transfer Point (ITP), a product for transporting Signaling System 7 (SS7) traffic over IP (SS7oIP) networks.

Integrated Voice Mail Application—this application allows the digital streams of voice coming from the IP telephones, analog adapters, and incoming circuit trunks to be recorded in digital format on a System Processing Element or a designated File Server. Access to the server can be made utilizing this application to access the stored digital voice information over the IP network. Access can also be accomplished from the IP telephones, analog adapters, and incoming circuit trunks.

SUMMARY OF THE INVENTION

The subject invention is directed to apparatus 1) integrating legacy emergency telephone systems into a comprehensive, multi-media surveillance system with network connectivity, 2) creating emergency telephone systems with IP telephones integrated into a comprehensive multi-media surveillance system with network connectivity, 3) providing enhanced security appliances with one-way or two-way IP audio capability in order to interoperate with guard stations, IP telephones, and IP analog telephone adapters, and 4) provide a method of searching a multimedia database by voice recognition or audio processing/sound recognition.

In the case of integrating legacy emergency telephone systems, either a digital telephone or an analog telephone system with VOIP conversion is linked into the surveillance system and transmissions therefrom are treated as an event requiring an emergency response from the system. By way of example, in my aforementioned copending application activation of various classes of sensors and appliances will trigger specific types of responses and send the data to an appropriate response team. The activation will also initiate follow-up activity within the system, such as, by way of example, activating cameras to start the transmission of live video from the scene or zone where the sensor or appliance is located. Additional actions are also initiated including, but not limited to: mapping the area where the event occurred; providing flashing icons on a screen map showing the location of the event; sending programmed informational data transmissions to the scene; locking or unlocking secure doors depending on the event, and various other response functions.

The subject invention is specifically directed to integration of emergency telephone systems to take full advantage of a multi-media surveillance system and to permit comprehensive and multiple responses to an event triggered by receipt of the emergency phone call transmission. The subject invention captures the telephone transmission and transmits it to the surveillance system processor. Upon receipt, the system can react with any of numerous responses. First, the telephone call is transmitted to a manned station and may be answered in the normal fashion with a live voice response. The receipt of the call also activates the entire system in the same manner as a triggering signal from any other sensor or appliance. This may activate cameras focused on the location of the telephone for transmitting live video data to the manned station as well as to the system server for management and for archiving both the audio and video data. In addition, various other responses may be activated, either manually or in a preprogrammed hierarchy. For example, if the telephone call is not answered within a certain number of rings, it can be automatically sent to a second level priority and so on. The video of the scene is immediately presented on the manned station screen, permitting the response personnel to monitor the events while communicating with the person initiating the call. In addition, the live or archived data may be sent via a network, including LANs, WANs and the Internet, to remote stations for monitoring and response.

Various sensors and appliances may be combined with the emergency telephone system in this manner, greatly enhancing the response to the call while at the same time permitting response personnel to monitor the call for accuracy and authenticity.

An additional feature of the invention is to permit immediate response from various response stations anywhere on the security system network. For example, the call may be sent via both wired and wireless transmission systems to any station. One important feature is that the emergency call can be sent directly to roving personnel via a wireless PDA or other handheld device, virtually eliminating the likelihood of no answer. The PDA includes full functionality with voice response and with a monitor to provide assessment of the situation. This capability is also more fully described in my aforementioned copending application.

It is, therefore, an object and feature of the subject invention to provide for enhancement of emergency telephone systems by incorporating such systems directly into an interactive security system.

It is also an object and feature of the subject invention to provide for the capability of monitoring and assessing the situation at the location from which the call is generated.

It is an object and feature of this invention to flash an icon on the map indicating the position of the specific emergency telephone based on an emergency telephone being accessed.

It is a further object and feature of the subject invention to provide for archiving the call and additional data for later retrieval purposes.

It is an additional object and feature of the subject invention to provide for a hierarchy for answering incoming emergency calls to assure that if the first priority recipient does not respond additional recipients are contacted in an established priority.

It is an object and feature of this invention to utilize off-the-shelf IP telephones and/or IP analog telephone adapters as emergency telephones for origination of emergency calls in a comprehensive multimedia security system.

It is an object and feature of this invention to utilize off-the-shelf IP telephones and/or IP analog telephone adapters as response telephones for answering emergency calls in a comprehensive multimedia security system.

It is an object and feature of this invention to utilize off-the-shelf IP telephones and/or IP analog telephone adapters as intercommunication telephones between two or more monitoring stations in order for multiple response personnel to hear emergency calls simultaneously.

It is an object and feature of this invention to utilize off-the-shelf IP telephones and/or IP analog telephone adapters as intercommunication telephones between two or more monitoring stations in order for multiple response personnel to discuss emergency response actions among themselves.

It is an object and feature of this invention to utilize off-the-shelf IP telephones and/or IP analog telephone adapters as intercommunication telephones to monitor audio sensors in IP security appliances.

It is an object and feature of this invention to utilize off-the-shelf IP telephones and/or IP analog telephone adapters as intercommunication telephones to speak to IP security appliances that are equipped with loud speaker output transducers.

It is an object and feature of this invention to utilize off-the-shelf IP telephones and/or IP analog telephone adapters to recall stored audio information that has been recorded in a comprehensive multimedia database, and to recall data that is associated with it.

It is an object and feature of this invention to utilize off-the-shelf IP telephones and their advanced display capability to display real time alarm events by name, location, type and description in textual and graphical forms.

It is an object and feature of this invention to utilize off-the-shelf IP telephones and their advanced display capability to display information on the IP telephone related to prerecorded alarm events by time, name, location, type and description in textual and graphical forms.

It is an object and feature of this invention to utilize off-the-shelf IP telephones and their advanced display capability to display a map on the IP telephone showing the alarm location.

It is an object and feature of this invention to utilize off-the-shelf IP telephones and their advanced display capability to display a bar graph on the IP telephone showing the relative location of voice during playback of a pre-recorded audio event.

It is an object and feature of this invention to utilize off-the-shelf IP telephones and their advanced display capability to display real-time events by name, location, time and the like on the IP telephone as they are happening, such as door access/denials, alarm sensors triggering, and the like. Audio, if available, will be presented synchronized with the text/graphical display.

It is an object and feature of this invention to utilize off-the-shelf IP telephones and their advanced display capability to display pre-recorded events by name, location, time and the like on the IP telephone as they are happening, such as door access/denials, alarm sensors triggering, and the like. Audio, if available, will be presented synchronized with the test/graphical display.

It is an object and feature of this invention to utilize the processing element that provides IP voice applications to host the voice processing functions of the comprehensive multimedia security system.

It is an object and feature of this invention to utilize the processing element that provides IP voice applications to provide the audio switching/connection functions of the comprehensive multimedia security system.

It is an object and feature of this invention to utilize the processing element that provides IP voice applications including the voice mail functions, to provide the audio recording and playback functions of the comprehensive multimedia security system.

It is an object and feature of this invention to provide for an audio search capability allowing for searching by voice recognition, then playback of all multimedia data such as audio, video, and textual event data from the key point found by voice recognition.

It is an object and feature of this invention to provide for an audio search capability allowing for searching by audio processing seeking events such as gunshots, loud noises, screams, and the like, then playback of all multimedia data such as audio, video, and textual event data from the key point found by audio processing.

It is an object and feature of this invention to utilize the IP audio capability of a PC that is being utilized as a monitor station to interact with analog telephones, digital telephones, IP telephones, and security sensors for the purpose of monitoring the audio data.

It is an object and feature of this invention to utilize the IP audio capability of a PC that is being utilized as a monitor station as response telephone for answering emergency calls in a comprehensive multimedia security system.

It is an object and feature of this invention to utilize the IP audio capability of PCs that are being utilized as a monitors as a telephone as intercommunication telephones between two or more monitoring stations in order for multiple response personnel to hear emergency calls simultaneously.

It is an object and feature of this invention to utilize the IP audio capability of PCs that are being utilized as a monitors as intercommunication telephones between two or more monitoring stations in order for multiple response personnel to discuss emergency response actions among themselves.

It is an object and feature of this invention to utilize the IP audio capability of PCs that are being utilized as a monitors as telephones to intercommunicate with as IP Telephones and/or IP analog telephone adapters in order for multiple response personnel to hear emergency calls simultaneously.

It is an object and feature of this invention to utilize the IP audio capability of PCs that are being utilized as a monitors as intercommunication telephones to monitor audio sensors in IP security appliances.

It is an object and feature of this invention to utilize the IP audio capability of PC's that are being utilized as a monitors as intercommunication telephones to speak through speakers in IP security appliances.

It is an object and feature of this invention to utilize the IP audio capability of PC's that are being utilized as a monitors as intercommunication telephones to speak to IP security appliances that are equipped with loudspeaker output transducers.

It is an object and feature of this invention to utilize the IP audio capability of PCs that are being utilized as a monitors to recall stored audio information that has been recorded in a comprehensive multimedia database, and to recall data that is associated with it.

It is an object and feature of this invention to utilize a PDA configured with a wireless LAN module and Voice-Over-IP speaker and microphone to operate as a mobile guard station.

It is an object and feature of this invention to utilize a PDA configured with a wireless LAN module and Voice-Over-IP speaker and microphone to operate as monitor for listening to IP appliances equipped with IP microphones.

It is an object and feature of this invention to utilize a PDA configured with a wireless LAN module and Voice-Over-IP speaker and microphone to be utilized as an intercommunication telephone to speak to IP security appliances that are equipped with loudspeaker output transducers.

It is an object and feature of this invention to utilize a PDA configured with a wireless LAN module and Voice-Over-IP speaker and microphone to be utilized as an intercommunication telephone to speak to other monitor stations of the PC type or of the wireless PDA type for the purposes of intercommunicating about security breaches, alarm events and other matters.

It is an object and feature of this invention to provide an IP security telephone that is encased in a protective housing and that encodes Voice-Over-IP.

It is an object and feature of this invention to provide an IP security telephone that is encased in a protective housing and that encodes Voice-Over-IP and that generates alarm events communicated over IP in when the door is opened.

It is an object and feature of this invention to provide an IP security telephone that is encased in a protective housing and that encodes Voice-Over-IP and that generates alarm events communicated over IP in when the handset is lifted off of its restraint.

It is an object and feature of this invention to provide an IP security telephone that is encased in a protective housing and that encodes Voice-Over-IP and that has a display that is presented with data over IP and displayed with a micro browser such as is utilized on IP desk telephones.

It is an object and feature of this invention to configure alarm appliance such that they can communicate to an IP telephony processing system in a manner compatible with IP telephones.

It is an object and feature of this invention to configure alarm appliance such as a multimedia camera appliance such that it can communicate to an IP telephony processing system in a manner consistent with IP telephones, and originate emergency calls to a specified emergency monitor station or stations.

It is an object and feature of this invention to utilize voice recognition to select actions based upon detection of key words, such as detecting the word "police" signaling the police guard station, "fire" signaling the fire department station, "heart attack" or "blood" or "hurt" or "broken" signaling the EMS station, and the like.

It is an object and feature of this invention to flash an icon on the map indicating the position of the specific emergency telephone based on an emergency telephone being spoken into utilizing voice amplitude threshold detection (VOX).

It is an object and feature of this invention to flash an icon on the map indicating a guard station response, which is indicated by a guard pushing a button, speaking into a microphone utilizing voice amplitude threshold detection (VOX), or speaking into a POTS telephone with IP adapter or speaking into an IP telephone.

It is an object and feature of this invention to utilize Voice Activated Recording™ to gate the audio onto the Server in order to reduce the amount of storage space required. The data stream will be stamped with time information such that during playback exact recording time may be determined.

It is an object and feature of this invention to provide for a buffer status "bar graph" to indicate health of transmitted and/or received audio data in a manner previously described for video in my aforementioned pending applications.

It is an object and feature of this invention to provide an emergency telephone with a built-in LAN interface.

It is an object and feature of this invention to provide an emergency telephone with a built-in WAN interface.

It is an object and feature of this invention to provide an emergency telephone with a built-in wireless LAN interface.

It is an object and feature of this invention to provide an emergency telephone with a built-in LAN HUB.

It is an object and feature of this invention to provide an emergency telephone with a built-in camera.

It is an object and feature of this invention to provide an emergency telephone with a built-in camera interface for an associated external analog video camera.

It is an object and feature of this invention to provide an emergency telephone with a built-in camera interface for an associated external digital video camera.

It is an object and feature of this invention to provide a specialized IP video camera that is configured for hosting an interface for an associated analog or POTS emergency telephone.

It is an object and feature of this invention to provide a specialized IP video camera that is configured for hosting an interface to an associated digital emergency telephone.

It is an object and feature of this invention to provide a specialized IP video camera that has an internal LAN HUB.

It is an object and feature of this invention to provide a specialized IP video camera that has a built-in WAN interface.

It is an object and feature of this invention to provide a specialized emergency telephone modem that has a built-in interface for an analog camera and a built in interface for a built-in analog or POTS telephone.

It is an object and feature of this invention to provide a specialized emergency telephone modem configured with a LAN interface that has a built-in interface for an analog camera and a built in interface for a built-in analog or POTS telephone.

It is an object and feature of this invention to provide a specialized emergency telephone modem configured with a WAN interface that has a built-in interface for an analog camera and a built in interface for a built-in analog or POTS telephone.

It is an object and feature of this invention to provide a specialized emergency telephone modem configured with a wireless LAN interface that has a built-in interface for an analog camera and a built in interface for a built-in analog or POTS telephone.

It is an object and feature of this invention to configure an emergency telephone to receive power over a LAN connection in a well-known manner to power the emergency telephone.

It is an object and feature of this invention to configure an emergency telephone to receive power over a WAN connection in a well-known manner to power the emergency telephone's associated camera.

It is an object and feature of this invention to configure an emergency telephone to receive power over a WAN connection in a well-known manner to power the emergency telephone.

It is an object and feature of this invention to configure an emergency telephone to receive power over a LAN connection in a well-known manner to power the emergency telephone's associated camera.

It is an object and feature of this invention to utilize Session Initiated Protocol (SIP) to establish and maintain voice connections between emergency telephones and fixed guard stations.

It is an object and feature of this invention to utilize Session Initiated Protocol (SIP) to establish and maintain voice connections between emergency telephones and wireless guard stations.

It is an object and feature of this invention to utilize Session Initiated Protocol (SIP) to establish and maintain voice connections between guard stations.

It is an object and feature of this invention to utilize Session Initiated Protocol (SIP) to establish and maintain voice connections between guard stations and standard telephone networks and telephones.

It is an object and feature of this invention to utilize Session Initiated Protocol (SIP) to establish and maintain voice connections between multiple voice elements, including guard stations, emergency telephones, and standard telephones.

It is an object and feature of this invention to utilize Session Initiated Protocol (SIP) to establish voice links between security sensors that have audio capability for monitoring and guard stations or telephones.

It is an object and feature of this invention to utilize Session Initiated Protocol (SIP) to provide event notification from sensors to clients, such as guard stations, that an event of interest should be monitored.

It is an object and feature of this invention to utilize Session Initiated Protocol (SIP) to provide an indication of a failure of event notification from sensors to clients, such as guard stations, that an event of interest should be monitored and why the failure occurred (i.e. no answer, circuit not available, and the like).

It is an object and feature of this invention to utilize Session Initiated Protocol (SIP) to provide initiation of an audio stream from a security sensor appliance that is equipped with an audio transducer.

It is an object and feature of this invention to utilize Session Initiated Protocol (SIP) to provide initiation of a video stream from a security sensor appliance that is equipped with a video transducer.

It is an object and feature of this invention to utilize Session Initiated Protocol (SIP) to provide initiation of a step-video stream from a security sensor appliance that is equipped with a video transducer.

It is an object and feature of this invention to utilize SIP Proxy servers for information security authentication and authorization of connection to security sensor appliances and/or guard stations or elements utilized as monitor points.

It is an object and feature of this invention to utilize SIP redirector servers for routing security messages from location to location.

It is an object and feature of this invention to utilize SIP registrar servers to process requests from security appliances or guard stations for registration of their current location.

It is an object and feature of this invention to utilize SIP gateways to provide connection control between security appliances, security guard stations, SIP endpoints and other terminal types.

It is an object and feature of this invention to utilize SIP gateways to provide translation functions as required including audio and video CODEC translations between security appliances, security guard stations, SIP endpoints and other terminal types.

It is an object and feature of this invention to utilize H.323 Protocol to establish and maintain voice connections between emergency telephones and fixed guard stations.

It is an object and feature of this invention to utilize H.323 Protocol to establish and maintain voice connections between emergency telephones and wireless guard stations.

It is an object and feature of this invention to utilize H.323 Protocol to establish and maintain voice connections between guard stations.

It is an object and feature of this invention to utilize H.323 Protocol to establish and maintain voice connections between guard stations and standard telephone networks and telephones.

It is an object and feature of this invention to utilize H.323 Protocol to establish and maintain voice connections between multiple voice elements, including guard stations, emergency telephones, and standard telephones.

It is an object and feature of this invention to utilize H.323 Protocol to establish voice links between security sensors that have audio capability for monitoring and guard stations or telephones.

It is an object and feature of this invention to utilize H.323 Protocol to provide event notification from sensors to clients, such as guard stations, that an event of interest should be monitored.

It is an object and feature of this invention to utilize H.323 Protocol to provide an indication of a failure of event notification from sensors to clients, such as guard stations, that an event of interest should be monitored and why the failure occurred (i.e. no answer, circuit not available, and the like).

It is an object and feature of this invention to utilize H.323 Protocol to provide initiation of an audio stream from a security sensor appliance that is equipped with an audio transducer.

It is an object and feature of this invention to utilize H.323 Protocol to provide initiation of a video stream from a security sensor appliance that is equipped with a video transducer.

It is an object and feature of this invention to utilize H.323 Protocol to provide initiation of a step-video stream from a security sensor appliance that is equipped with a video transducer.

It is an object and feature of this invention to utilize H.323 Protocol gateways to provide connection control between security appliances, security guard stations, SIP endpoints and other terminal types.

It is an object and feature of this invention to utilize H.323 Protocol gateways to provide translation functions as required including audio and video CODEC translations between security appliances, security guard stations, SIP endpoints and other terminal types.

Other objects and features of the subject invention will be readily apparent from the accompanying drawings and description.

BRIEF DESCRIPTION OF THE DRAWINGS

FIG. 13A is an illustration of a system similar to FIG. 12A, adapted for a WAN.

FIG. 18A is an illustration of a system having VOIP with companion video using a switching hub.

FIG. 20B illustrates the basic WAN configuration for the system of FIG. 20A.

FIG. 20C illustrates the basic WAN VOIP telephone configuration for the system of FIG. 20A.

FIG. 20E illustrates the basic WAN VOIP telephone configuration for the system of FIG. 20A with an integral LAN hub and an internal camera.

FIG. 23A is an illustration of a VOIP telephone and companion video system for a WAN.

FIG. 23C is an illustration of the flow diagram for the circuitry of FIG. 23A, with an internal camera.

FIGS. 33A-F are schematics of the video interface for the circuits of the various embodiments.

DETAILED DESCRIPTION OF THE PREFERRED EMBODIMENTS

Figure 1:
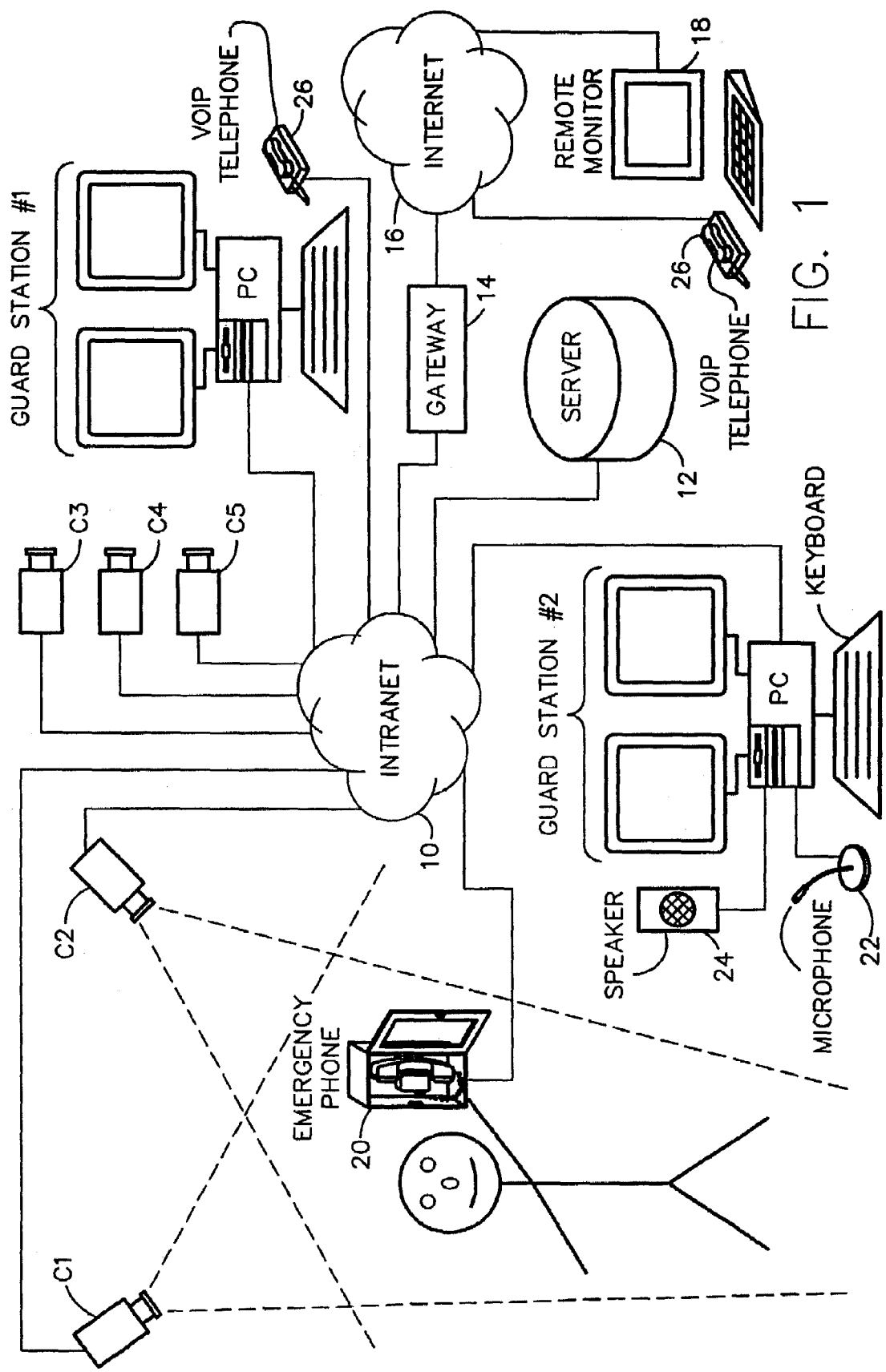
FIG. 1 is a diagram showing certain features of a surveillance system and an emergency telephone system in combination therewith.

A typical surveillance system as more fully described in my aforementioned copending application is shown in FIG. 1 and includes, in this example, IP cameras C1, C2, C3, C4 and C5; a pair of manned guard station No. 1 and No. 2 on the intranet or LAN 10; a system server 12 also on the intranet 10; a gateway 14 to the Internet or other Wide Area Network (WAN) 16 and remote support such as the remote monitor station 18. An emergency IP voice telephone 20 is connected to the system via the intranet 10. In this embodiment, the emergency telephone sends IP protocol voice transmissions to the system via the intranet, where the system can capture the incoming call signal and transmit it to the various guard stations No. 1 and No. 2 and, via the Internet 16, to the remote station 18. This transmission can be done simultaneously or in a hierarchal order, as preferred and as managed by the server 12. In addition, once the incoming call is received, the location of the telephone 20 is identified and the appropriate IP cameras C1 and C2 are activated to start transmitting video data to the stations and to the server. This permits the guard personnel to quickly monitor and assess the situation at the monitor screens provided at each of the various stations. The personnel at each of the stations may communicate directly with the caller at the emergency telephone 20 via the microphone/speaker system 22, 24 as provided at guard station No. 2 or via a VOIP telephone 26 as provided at guard station No. 1 or the remote station 18. The emergency call can be received and heard by guard stations No. 1, No. 2 and No. 3 simultaneously. Any or all of the three guard stations can respond to the caller at emergency telephone 20 by pushing their push-to-talk at their station, or if desired by activating voice operated switching (VOX) by speaking. Further, if one guard station is responding with voice, all of the other guard stations will hear the audio from the responding station. Audio is enabled by more than one station by an audio bridge function in a well-known manner consistent with IP telephony. This function can operate on any processing node on the system capable of audio bridging, but the preferred embodiment would implement this function on the security server element 12. It can also be implemented on a different element than the security server 12, for example could be implemented on the corporate IP telephone processing system (not shown). Additional surveillance activity may also be initiated by the call in accordance with the full capability of the system described in my aforementioned copending application. For example, a map on one of the monitors at each station may include a flashing icon showing the location of the emergency call. It also can flash based on voice (VOX) activation, from the emergency telephone 20. Audio response from guard stations No. 1, 2 and 3 can also trigger VOX which will flash the icon for that respective guard station that had audio. Also, various security functions may be performed such as securing the facility or opening escape doors. Response instructions may be sent to response teams either automatically based on programmed responses or voice recognition of key words from the emergency telephone 20 or manually selected by the response personnel. In sum, the incorporation of the emergency telephone system into the surveillance network permits the telephone to be used as a full function appliance as with the many other sensors and appliances on the system.

Figure 2:
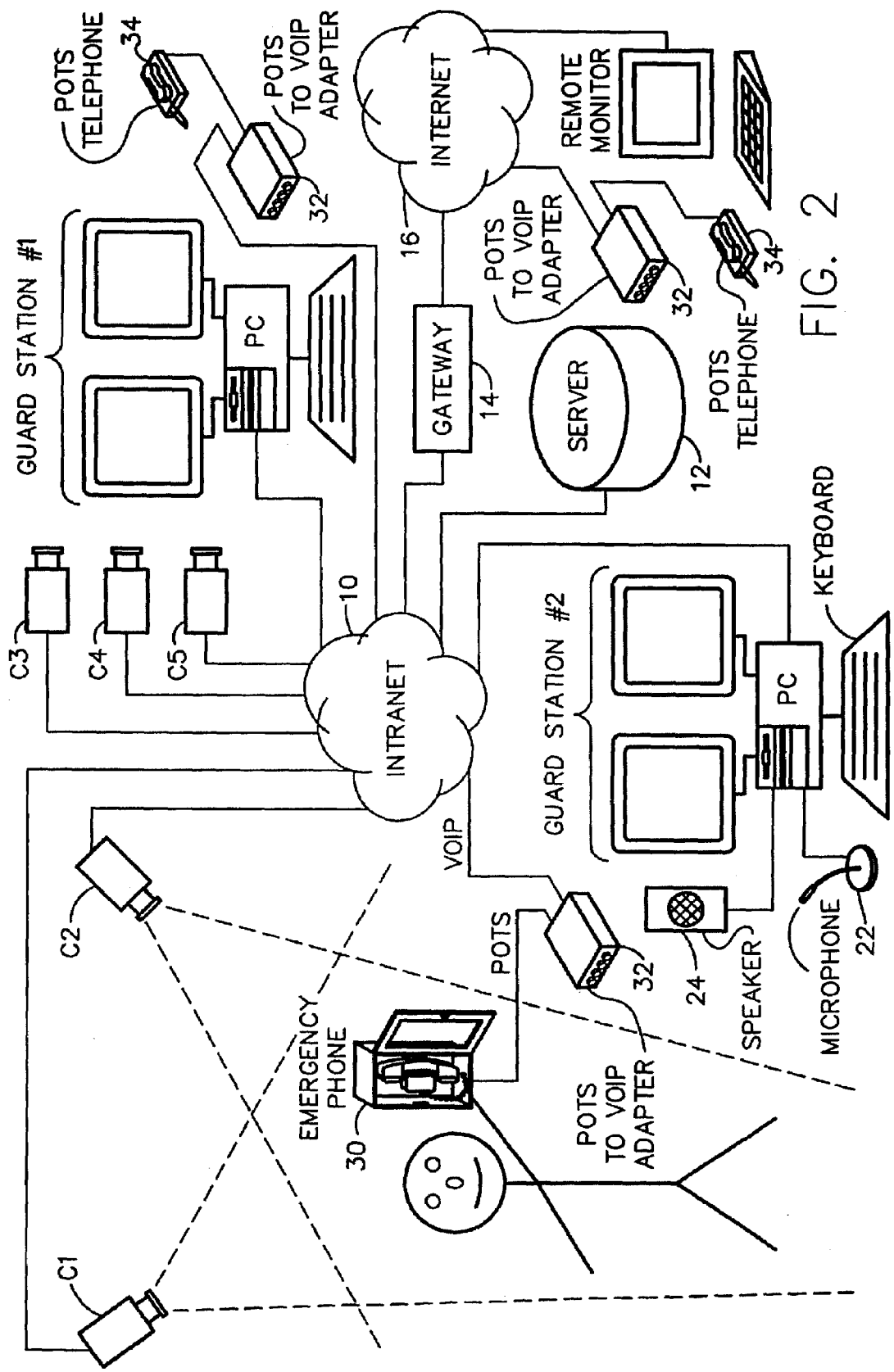
FIG. 2 is similar to FIG. 1 showing analog telephone conversion capability.

A modification of the system is shown in FIG. 2, wherein a legacy analog telephone 30 may be connected to the system using a Voice Over IP converter appliance 32 for converting the voice signal to IP protocol. The station telephones 34 may also be analog telephones connected with a converter 32. Signaling from the analog telephone can be generated by the telephone going off-hook, by special contacts provided in the enclosure of emergency telephone 30, and can be further enhanced by performing voice recognition on the voice stream coming from the emergency telephone 30.

Figure 3:
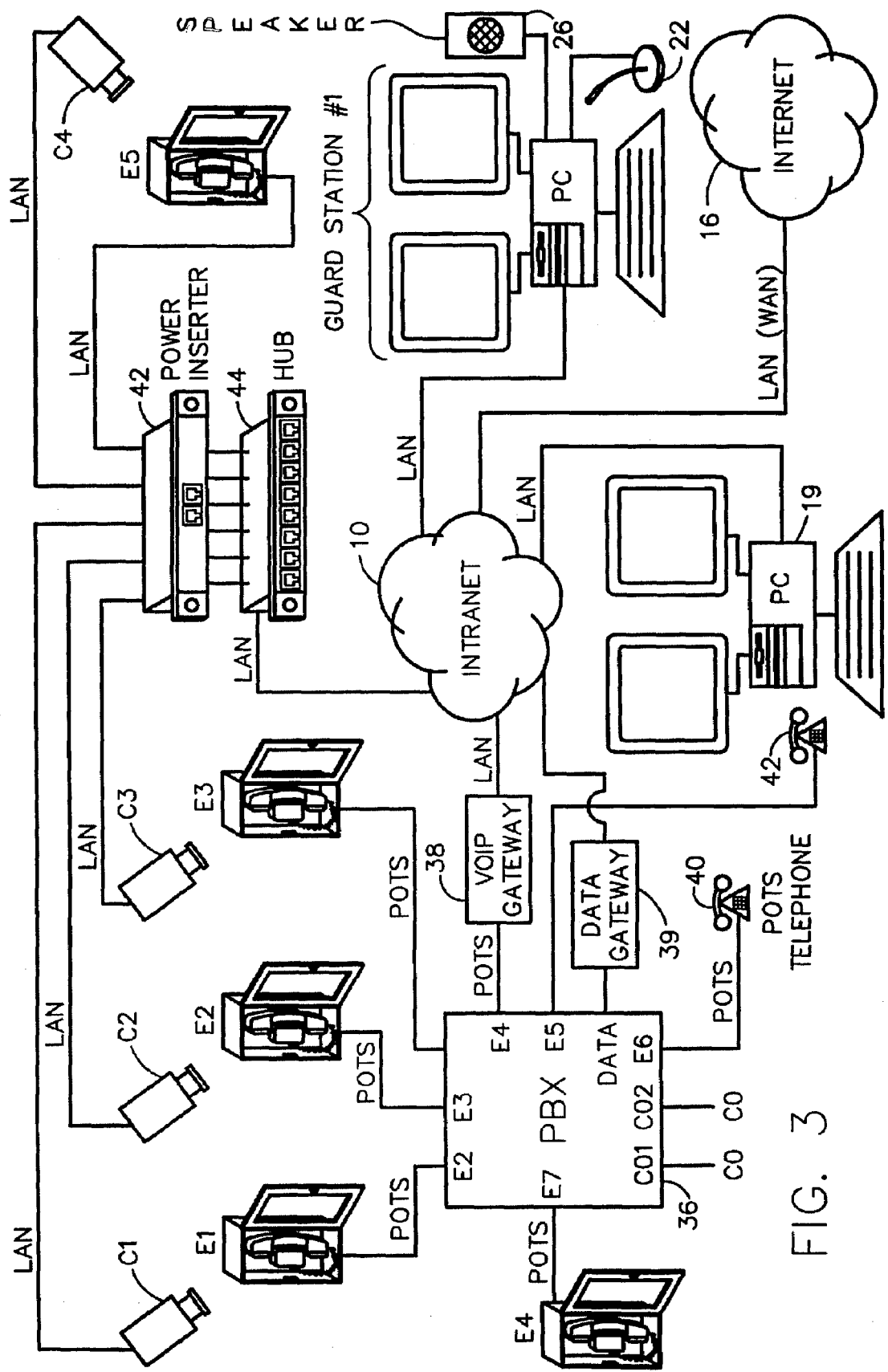
FIG. 3 shows a system as illustrated in FIG. 1, adapted for incorporating a multi-station emergency telephone network.

A modification showing the incorporation of an existing emergency telephone network of multiple telephones is shown in FIG. 3. An example of this system may be the use of an emergency telephone in each of a plurality of elevator cars in a large building. In this system a plurality of emergency telephones E1-E4 are connected through a PBX switch 36. A single VOIP converter gateway device 38 is required to convert the call transmissions to IP protocol. In this embodiment, other analog telephones are also support such as the independent telephone 40 and various other components such as facsimile machines and the like. Also, the original response telephone 42 may be used in combination with a typical manned station 19. One advantage to this configuration is that the system may be readily expanded by connecting additional analog telephones to the PBX switch 36 or by connecting compatible VOIP telephones such as telephone E5 directly to the intranet via the power inserter 42 and hub 44 which is used to connect the various IP cameras C1, C2, C3 and C4. It should be noted that the power inserter 42 is not required if each of the components have local power. It should also be noted that the camera does not need to be a separate component but could be imbedded in compatible telephones such as the VOIP telephone E5. Analog cameras can also be utilized with IP encoders in a manner as disclosed in my other applications. The PBX 36 utilizes a data gateway 39 to transmit call identification information such as Caller ID (CLID) to the monitor stations. This can be utilized to announce the particular emergency telephone that is originating the call and to activate icons on a floor plan associated with individual emergency telephones.

Figure 4:
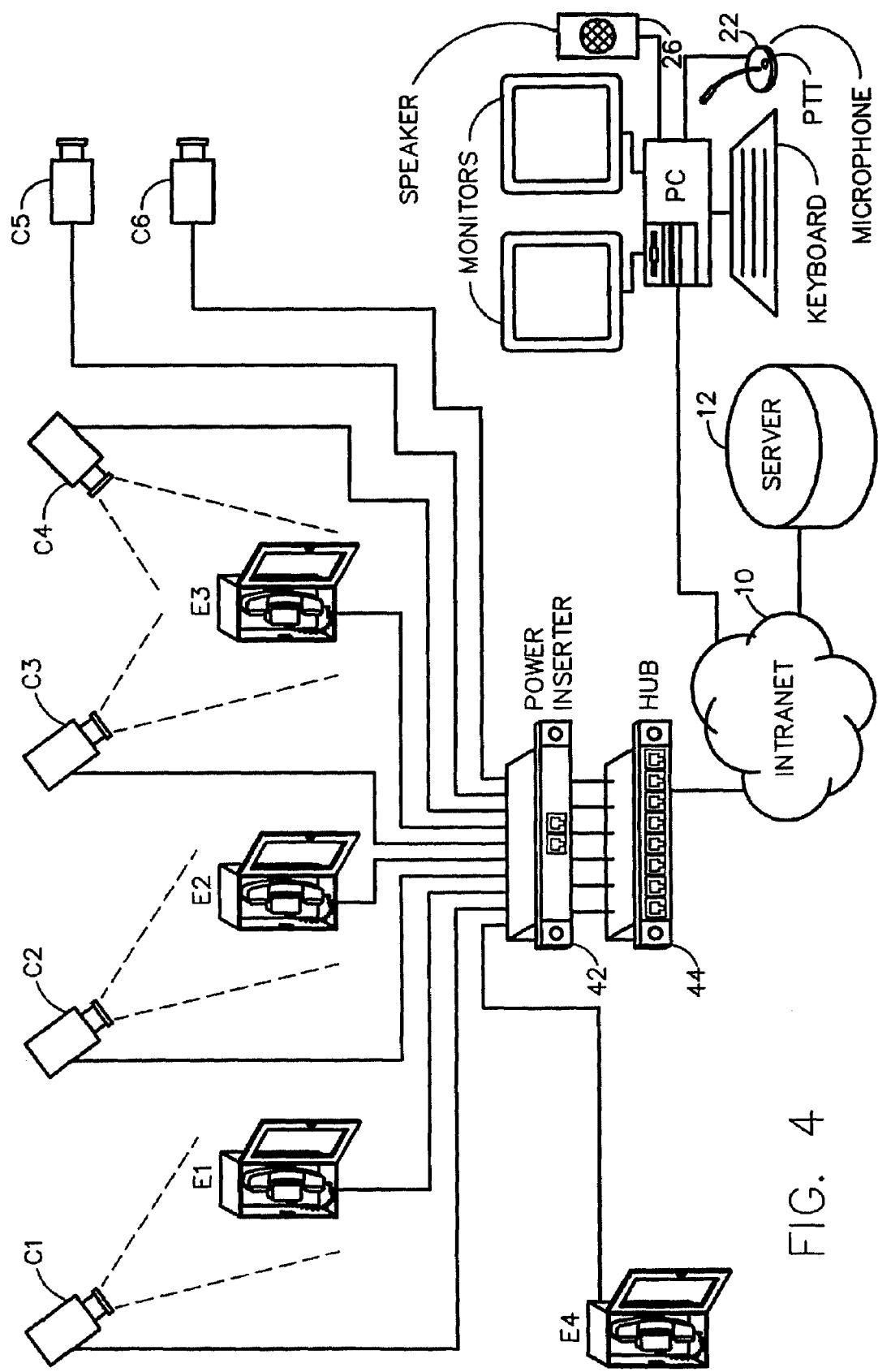
FIG. 4 is a modification showing the use of IP emergency telephones with a power inserter and a hub for driving the emergency telephone system and certain appliances such as the illustrated cameras.

A multiple unit VOIP telephone system configuration is shown in FIG. 4. In this configuration all of the emergency telephones E1, E2 and E3 are VOIP telephones connected directly to the intranet via the power inserter 42 and hub 44, as are the various IP cameras C1-C6. Additional VOIP telephones such as telephone E4 may be added with or without the cameras. This is a "pure" IP solution and therefore is the preferred embodiment of the appliance implementations allowing for great flexibility in deployment over an IP network that is configured for multiple rooms, buildings, and widespread geographic locations. The same switches, routers, and circuits that are providing an enterprise wide computer interconnection can be utilized for multimedia security integrated with voice over IP.

Figure 5:
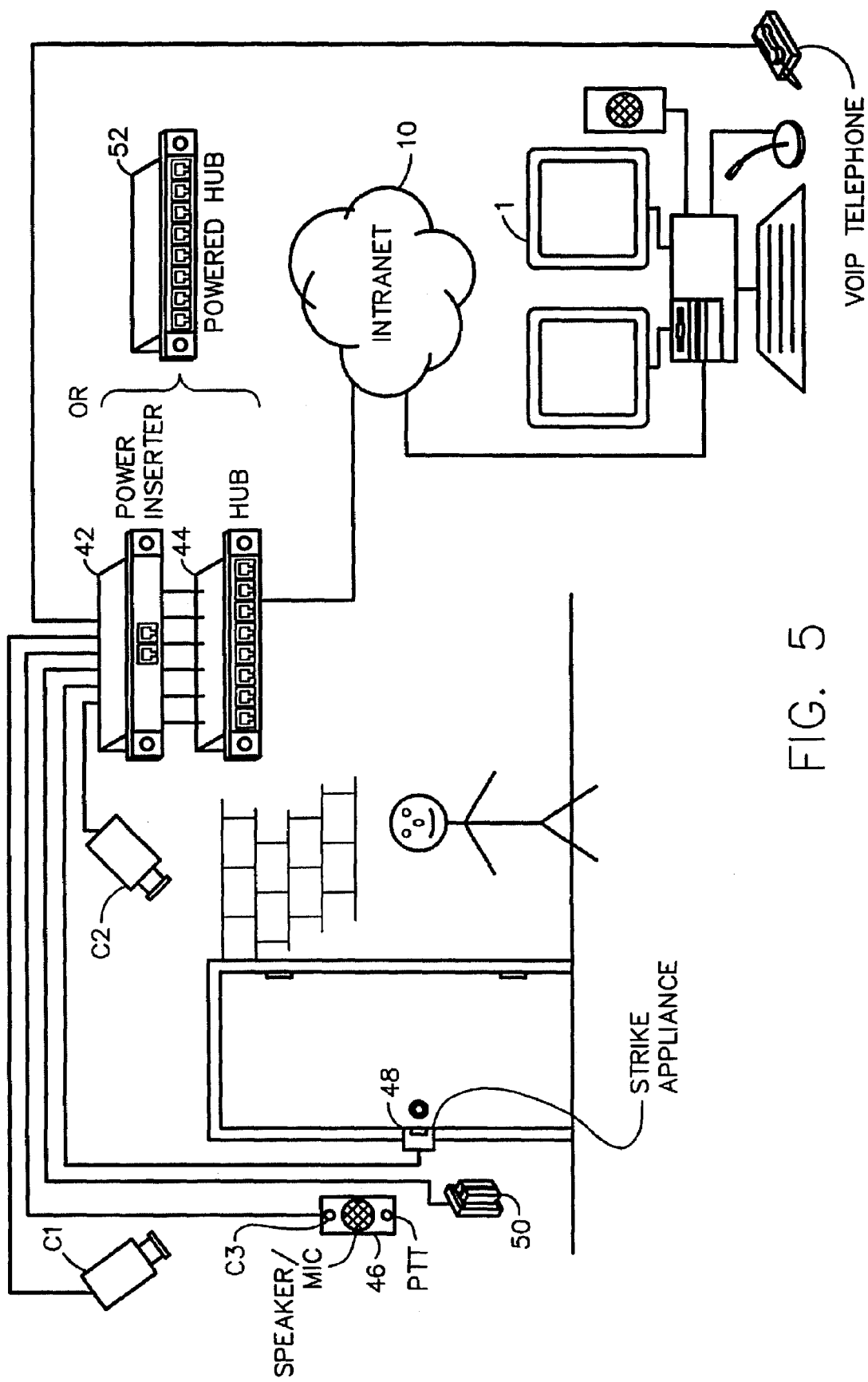
FIG. 5 is an illustration of a system wherein the legacy emergency telephone is replaced by a speaker and microphone appliance for use as an entry sentry device.

One advantage of the voice over IP technology is that other voice devices may be connected in addition to or as an alternative to the emergency telephone systems. As shown in FIG. 5, a speaker/microphone system 46 with VOIP capability can be used in connection with a door access control system such as the strike control 48, the card swipe 50, or other similar access control device. This permits the personnel at station 1 to communicate with an individual seeking access through the door. The related cameras C1 and C2 also give visual monitoring capability. One method of use is as follows. A person swipes his card at 50. The server (not shown) will verify the validity of the card and open the door after utilizing the IP electric strike 48. As an extension of the process, the swiping of the card can signal the guard station 1 and flash the image of the person desiring entry with cameras C1, C2 and C3 in the intercom unit. The unlocking of the door would be blocked. Images from the cameras will be stored on the server. The database will pull up the information about the person desiring entry and display it on the guard station 1. The guard can then decide to authorize entry (or not) and unlock the electric IP strike 48 (or not). If the guard desired to communicate with the person desiring entry, a VOIP session would be established between guard station 1 VOIP telephone and the IP intercom module 46. A camera directly on the intercom module C3 can provide a close-up image of the subject.

As another example, a person not having a badge at all can request entry by depressing PTT button on intercom 46. This will generate an event and signal the guard station 1. The guard can then respond utilizing IP and carry on a conversation with the subject at intercom 45. The images from cameras C1, C2 and C3 are being recorded on the database. The guard can decide to send the command to electric strike 48 (or not) and unlock the door (or not). The voice from the guard at station 1 and the voice of the person at the door speaking into intercom 46 can be recorded as VOIP on the multimedia server. This recorded voice can be played back with time information later in an investigation, and can be played back in synchrony with video and/or images captured by cameras C1, C2 and C3, and events such as PTT button pushes such as PTT on intercom 46.

It will be noted that the power inserter 42 and the hub 44 can be replaced with a powered hub 50, as desired. Industry standards are currently being developed for powered IP devices, but are not yet in place. The techniques available for power insertion are outline in my aforementioned copending applications. Also, it should be noted that the powered hub or power inserter is not required where local power is supplied to each device. This is true for all of the various configurations disclosed herein.

Figure 6:
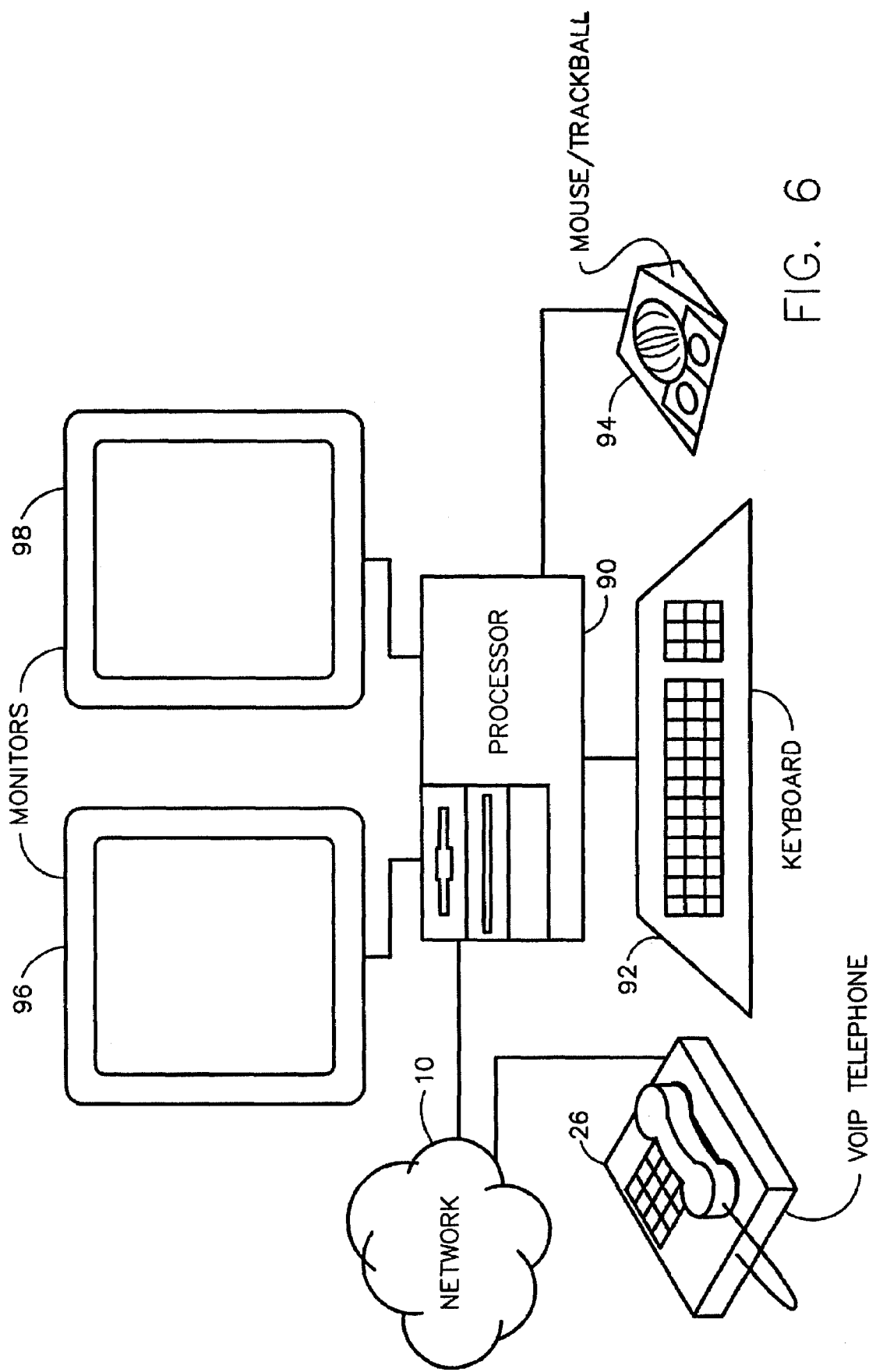
FIG. 6 is an illustration of a system having a dual monitor guard station with VOIP telephone connected to an IP network.

An enlarged view of guard station No. 1 (FIG. 1) is shown in FIG. 6. The processor 90 is connected to the network 10 and includes typical input devices such as the keyboard 92 and the mouse or trackball 94. The processor supports two or more monitors 96 and 98 to permit full screen view of multiple cameras and to permit one monitor to be used for displaying a camera transmission while the other is used for system data such as a system map or the like. In this configuration a VOIP telephone 26 is used to communicate with the integrated emergency telephone system. Both the digitized voice and the digitized sensor data such as encoded camera data is communicated over network 10.

Figure 7:
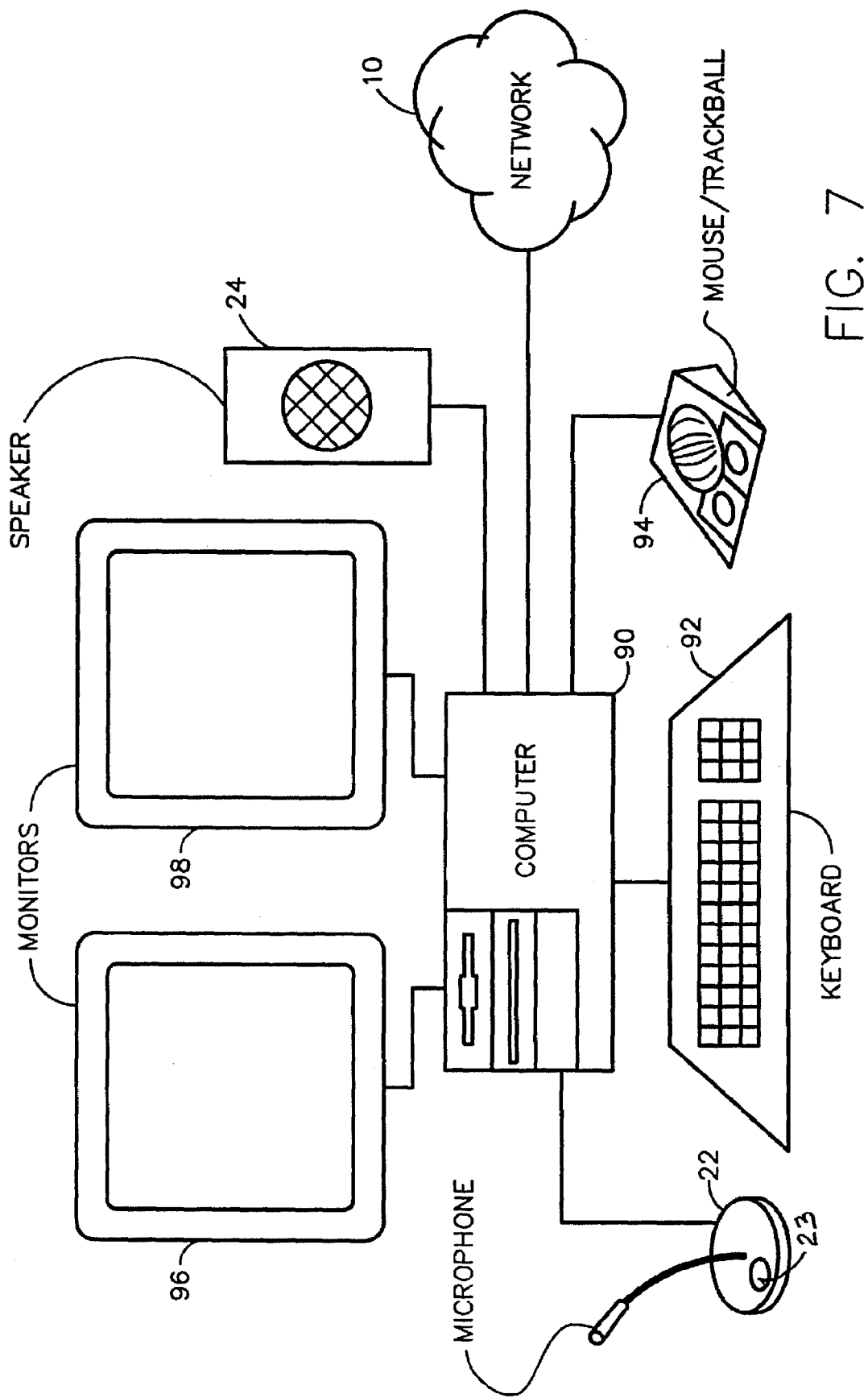
FIG. 7 is an illustration of a system having multiple dual monitor guard stations having a microphone and speaker communications system.

Guard station No. 2 (FIG. 1) is shown in FIG. 7. It is the same in all respects to guard station No. 1 with the exception that the VOIP telephone is replaced with the more typical microphone 22 and speaker 24. Half duplex operation (PTT or VOX) is preferred. The microphone may have a push-to-talk button 23 integral to the microphone, or the buttons on the mouse 94 can be utilized for Push-To-Talk (PTT). Voice Operated Switching (VOX) can also be utilized, or full duplex operation (less desirable, particularly in multi-station installations.)

Figure 8:
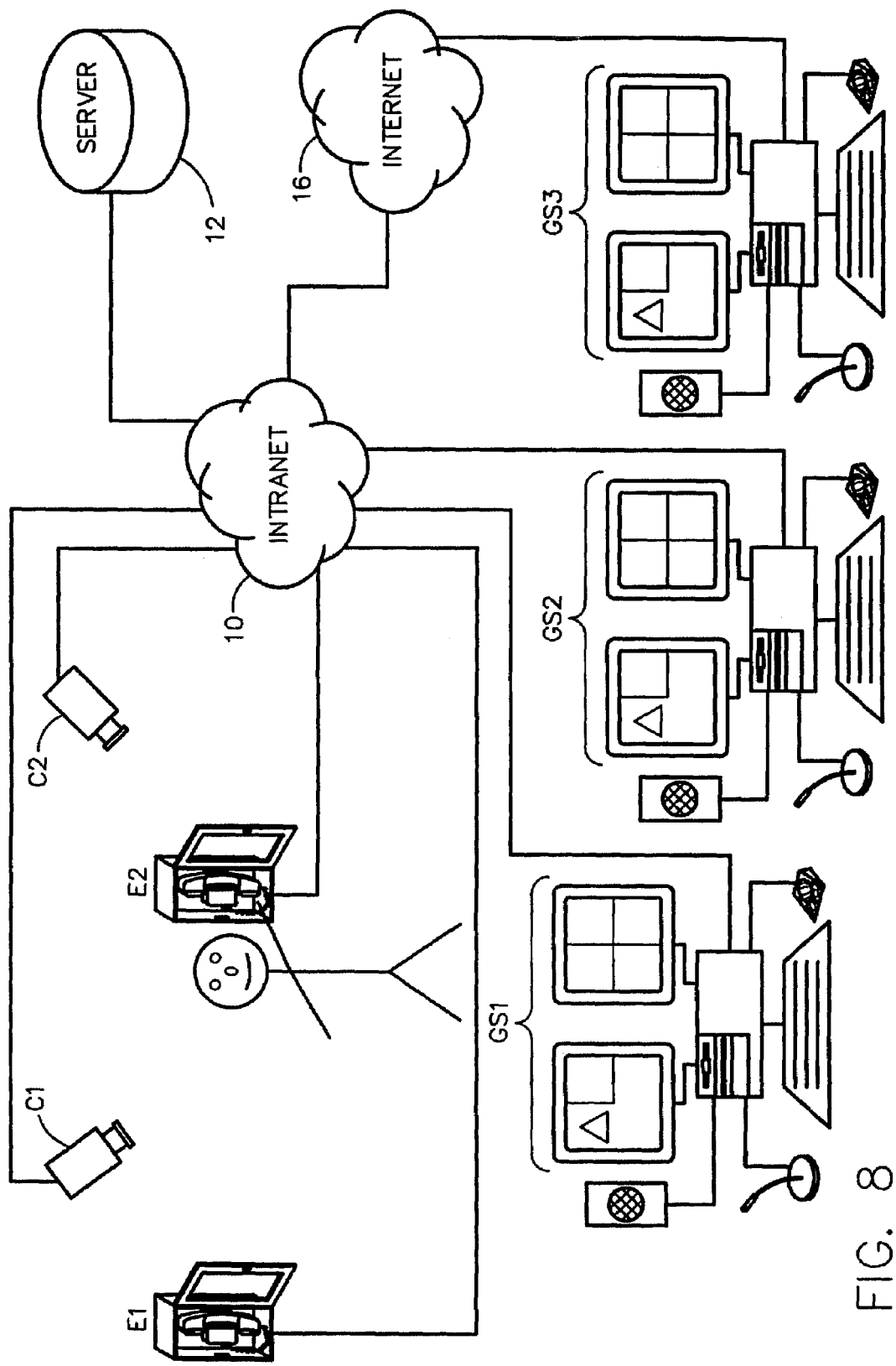
FIG. 8 is an illustration of a multiple manned station system. Note the multiple voice IP capability between all stations.

FIG. 8 shows a typical system with multiple emergency VOIP telephones E1 and E2, with at least one of the telephones (here telephone E2) having cameras C1 and C2 focused on the zone surrounding it. All components are connected via the intranet 10 to server 12 and two LAN guard stations GS1 and GS2 and a remote guard station GS3 via the Internet 16. During an emergency call, multiple guard stations can be alerted when the door of the emergency telephone is opened, when the handset is picked up, or when a button is pushed. During the call the voice of the subject at emergency telephone E2 would be communicated over IP to one or more guard stations. The broadcast protocol easily enables transmitting voice to all stations. Unicast from the emergency telephone E2 to the server 12, followed by unicast transmissions to the individual guard stations can then be implemented. A hybrid of unicast and broadcast can be beneficial when, for example, GS1 and GS2 are both on a local network that does not have quality of service (QOS) issues. The station GS3, on the other hand, does have QOS issues such as packets being delivered out of sequence because it is being delivered over the Internet through an unspecified plurality of switches and routers. In this case transmitting unicast to the guard station GS3 is an advantage.

Note that not only can guard stations GS1, GS2 and GS3 can listen to audio from emergency telephone E2, they can talk back to E2 utilizing their microphones. Any or all guard stations can call back in a "junkyard" technique. That is all stations on the network can hear all other stations on the net when they talk. Again, this can be implemented by all stations utilizing multicast in transmitting their signaling and audio, or by utilizing a server such as server 12 as a conference bridge.

In the preferred embodiment, in all cases the audio from all emergency telephones and all guard stations will be recorded on server 12 for future investigative playback. Additional data would also be recorded to allow exact determination of time and determination of which telephone or guard station is recording. Voice Activated Recording™ would be utilized to reduce data required on the security database.

Figure 9:
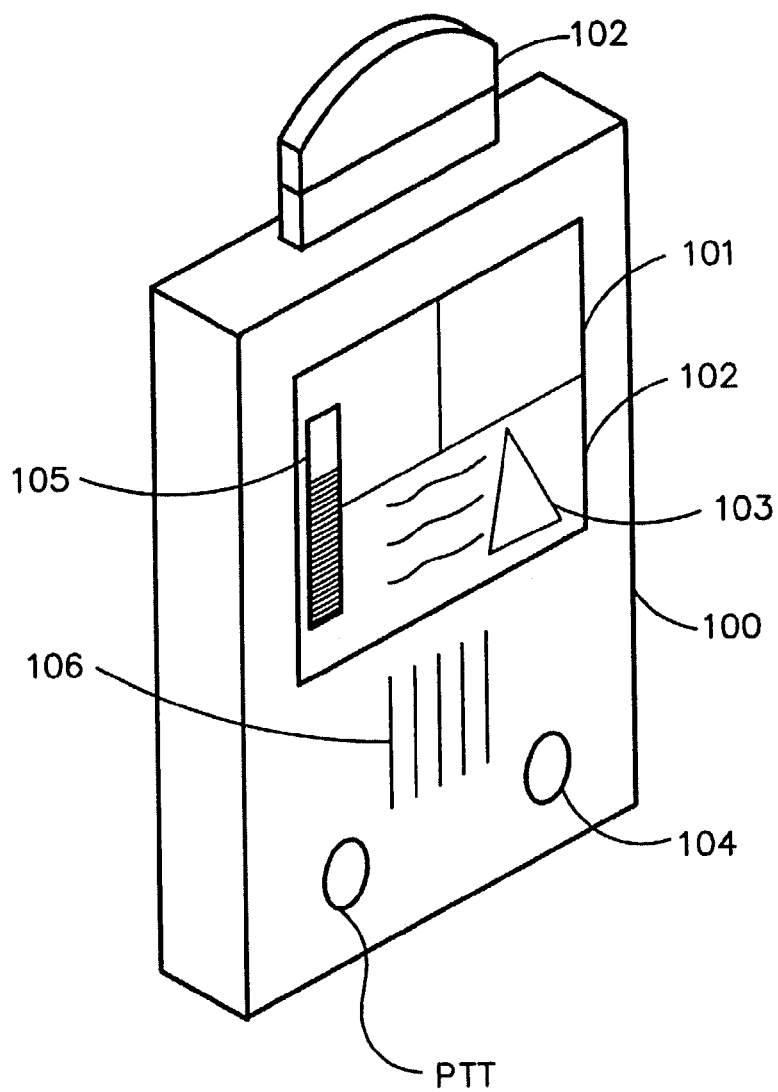
FIG. 9 is an illustration of a PDA handheld device for origination and receiving of VOIP calls in accordance with the subject invention.

FIG. 9 shows a typical PDA 100 having a wireless LAN access card for receiving data from the system via a wireless access point, as described in my aforementioned copending application. The Wireless LAN (WLAN) standards 802.11, 802.11A, 802.11B or any subsequent standard may be implemented. The PDA includes a monitor display screen 102, a microphone 104 and a speaker 106. This permits a roving guard to communicate directly with the emergency telephone user even when not present at the permanent guard station, station 1 or station 2. Voice transmit and receive data would be communicated with digitized compressed voice such as the popular G.711 and G.723.1 audio compression for low-bandwidth requirements. The voice data streams would be transmitted over the WLAN. The voice would be communicated in exactly the same manner as has been described for the wired monitor and guard stations in this application. Other multimedia data would displayed on the PDA display 102. This includes textual data, images, and full motion streams such as MPEG-1 or MPEG-4. These streams also would be communicated over the wireless channel in concert with the audio. All multimedia data would be played in a synchronous manner, such that voice, video and data would be largely synchronized.

Wireless streams are subject to widespread drop-outs and distortions from well know RF aberrations such as multipath, noise, absorption, and the like. In order to recover from reception problems, a receive buffer may be utilized. This buffer will ebb and flow with data, filling when the signal is strong and clear, and emptying when the signal is weak or noisy. A bar graph is implemented for the audio, and video as was previously disclosed in my aforementioned earlier application, such that the user of the portable station can be assisted in keeping the signal strong and keep the audio buffer full to provide for continuous clear audio. In the preferred application, the user would move the PDA to areas to keep the bar graph high. When the user saw the bar falling, they would be alerted to move to improve the signal strength. With the frequencies utilized in 802.11 systems, this may amount to distances of only a few inches.

Figure 10:
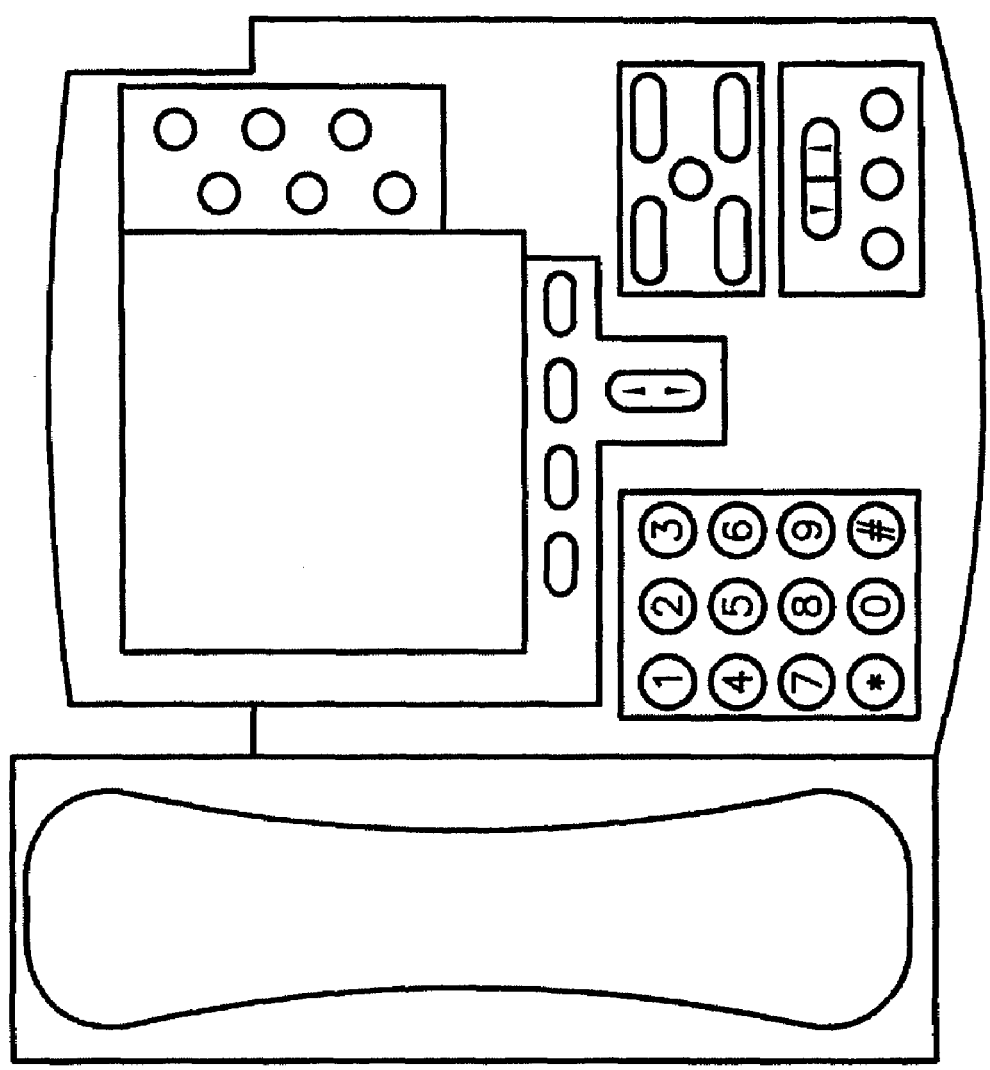
FIG. 10 is an illustration of a comprehensive multi-functional unit for VOIP connectivity.

FIG. 10 shows an SIP IP telephone configured to be used in conjunction with the system of the subject invention. An example of a suitable SIP telephone is the Cisco Systems' SIP IP Phone for use in VOIP infrastructure solutions. The telephone here described is not novel, per se, but the application in accordance with the overall system of the subject invention is believed to be a novel application. The telephone is described to permit a better understanding of the various features useful when employed by the subject invention. The SIP phone includes an LCD screen 200 for displaying information transmitted in text or video format. The line buttons 202 are used to open a new line in multiple line systems. The information button and keys 204 provide access to phone control information. The control keys 206 are volume control keys and are used to increase or decrease the volume of the handset, headset or speakerphone options. Keys 208 are soft keys used to activate text functions displayed on the LCD screen. Dial pad keys 210 are standard dial pad touch-tone keys. The handset is designated by the numeral 212. This telephone can be used in any of the various configurations for incorporating a VOIP telephone in accordance with the various embodiments of the invention.

Figure 11A:
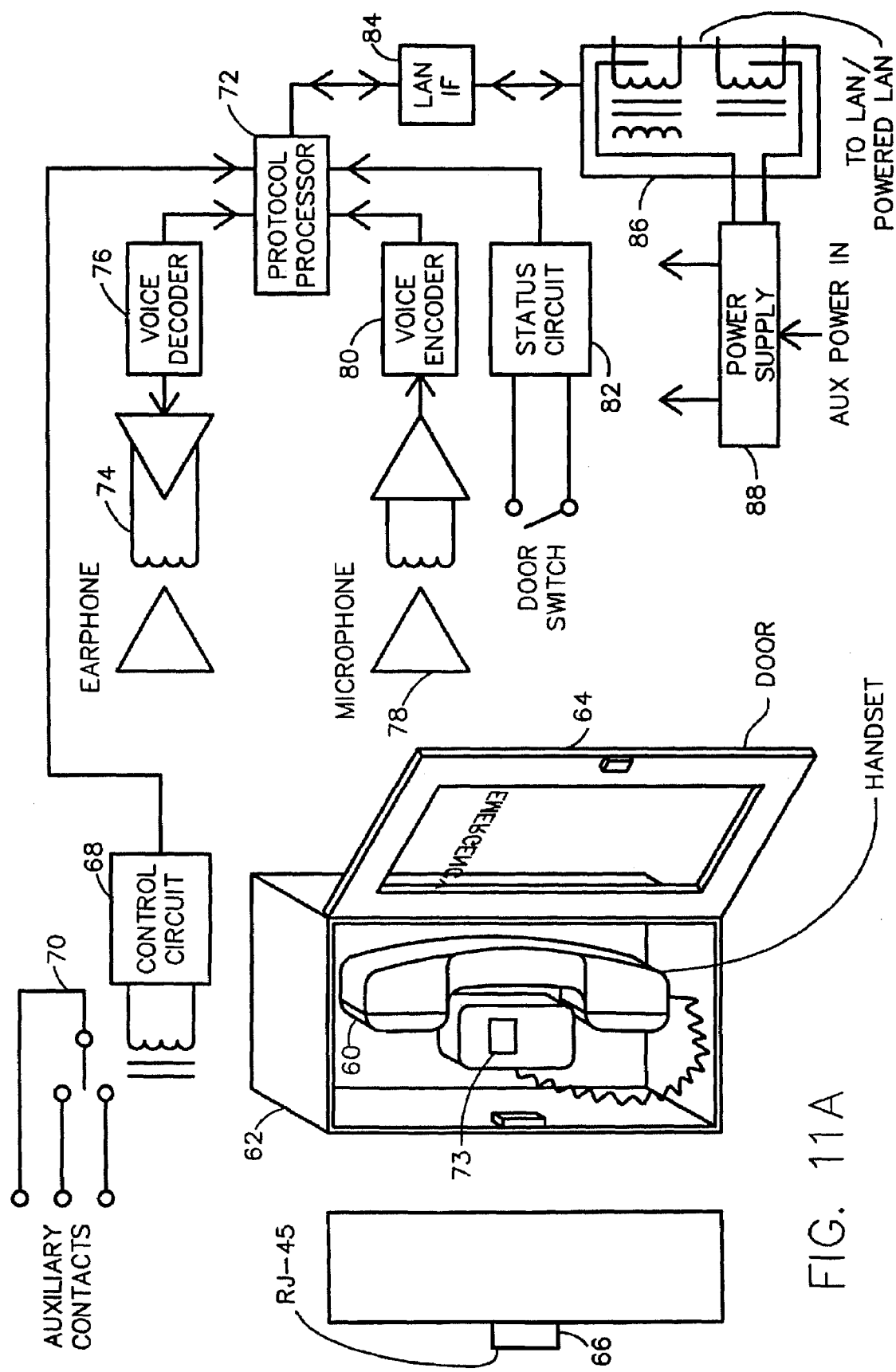
FIG. 11A is a flow diagram of circuitry for connecting the emergency telephone to the surveillance system utilizing IP technology.
Figure 11B:
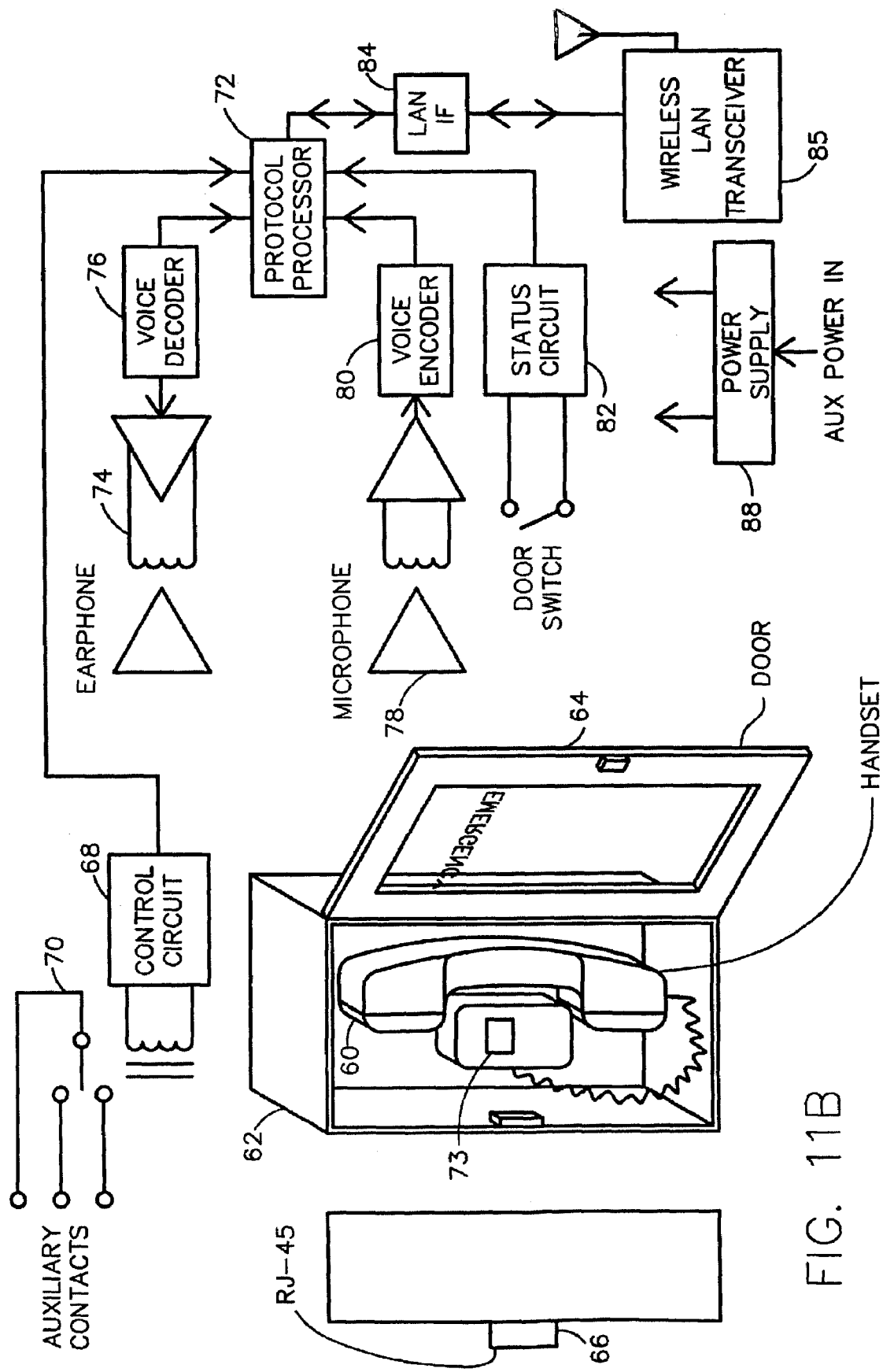
FIG. 11B is a flow diagram of circuitry for connecting the emergency telephone to the surveillance system utilizing wireless IP technology.

FIGS. 1A and 1B show a basic circuit for connecting a VOIP telephone to a network. Specifically, FIG. 1A shows a hard-wired LAN configuration and FIG. 11B shows a wireless LAN (WLAN) configuration. In both cases, the VOIP telephone includes a handset 60 carried in a suitable housing 62 with a call button or call keypad 73. In a typical installation the housing will have a suitable door 64. In these configurations, the telephone is hardwired to an interface via the RJ-45 jack 66. Handset/cradle contacts 70 are responsive to use of the handset for activating the telephone. When the contacts are activated the control circuit 68 is operational to activate the protocol processor 72. The handset includes an earphone 74 and associated decoder 76, and a microphone 78 and associated encoder 80 for transmitting voice data to and receiving voice data from the protocol processor. A door switch or other control switches may also be employed through a status circuit 82 to further control the activation and deactivation of the telephone. The protocol processor communicates with the LAN interface 84. In the embodiment of FIG. 11A, power may be provided over the LAN via the transformer 86 and power supply 82 and/or may be powered by auxiliary external power. The configuration of FIG. 11B for the wireless LAN is identical through the LAN interface 84, but includes a wireless LAN receiver 85. The power supply 88 is connected to local external power.

Power for operating subscriber equipment has been distributed by centralized telephone plants since before the turn of the century. This technique was initially applied to powering carbon granule variable resistance telephone transmitters with batteries in the telephone exchange. This was called "common battery" equipment. Techniques developed for distributing the power over the same pair of wires that the signal was transmitted on. This is called "loop powered" equipment.

Since the early days of telephony, other devices have been configured to operate over the telephone loop. For example, Plain Old Telephone Service, or POTS, typically distributes −48 VDC central office battery power through a current loop to the subscriber. This is commonly utilized to power the telephone, but is now also utilized to power simple devices such as caller ID units or call blocking devices.

With the advent of Wide Area Network (WAN) digital subscriber loops, such as T-1, ISDN, DSL and the like, powering of subscriber equipment from the central office over the data loop has not been utilized. On the other hand, digital termination devices or "loop extenders" have been powered over the loop. Common loop power conventions include −48 VDC and −130 VDC loop power sources. One such standard for loop power is the TR-TSY-000057 Class A2 standard for powering ISDN or DSL termination devices. An example of a termination device that utilizes this technique is the Digicom BritePort 9100 ADSL Modem. This device draws 7.33 watts at −79 VDC, and is current limited to 55 mA. Another such device is the Adtran TRI-R "Total Reach" ISDN remote unit. This device is a loop powered ISDN Simple Coded-Pulse Amplitude Modulation (SC PAM) modem that is utilized to transport 160 kpbs data to the subscriber end over longer loops without repeaters. Other examples of remote loop termination equipment also exist.

In the subject invention, the emergency telephone, IP camera, and audio/video analog modem devices described in this invention utilized embedded WAN interfaces such as DSL or ISDN. These devices are configured with internal "WAN Power Tap" circuits that utilize the central office battery, such as TR-TSY-000057 Class A2 standard power, for powering not only the WAN interface, but also the emergency telephone and/or associated camera. This provides ultimate simplicity and lowest cost installation of the emergency telephone and video surveillance camera devices because it is a "one unit" install. In other words, the central office pair that is hosting both two way data and power is brought directly into the security appliance. This minimizes the number of devices to buy, install, protect and maintain. This is particularly attractive for outdoor installations where the pair can be brought directly into the appliance's water resistant housing.

My aforementioned copending applications discuss powering an IP video camera over the same wiring as the LAN data signal, much in the manner described for the WAN above. The preferred embodiment of the emergency telephone of this invention is also powered in this manner. This recent technique has been adopted by IP Telephony manufacturers such as Cisco Systems, Inc. in their VOIP telephones. An example of this telephone is the model 7960. Cisco at this time utilized a proprietary technique for power insertion on to the LAN wiring. There are industry groups currently defining standard techniques for power insertion that will likely be adopted on a widespread basis.

The emergency telephone, IP camera, and audio/video analog modem devices described in this invention may utilize embedded LAN interfaces. These devices are configured with internal "LAN Power Tap" for powering not only the LAN interface, but also the emergency telephone and/or associated camera. This again provides ultimate simplicity and lowest cost installation of the emergency telephone and video surveillance camera devices because it is a "one unit" install. In other words, the LAN CAT-5 cable that is hosting both two way data and power is brought directly into the security appliance. This minimizes the number of devices to buy, install, protect and maintain. This is particularly attractive for outdoor installations where the pair can be brought directly into the appliance's water resistant housing.

Figure 12A:
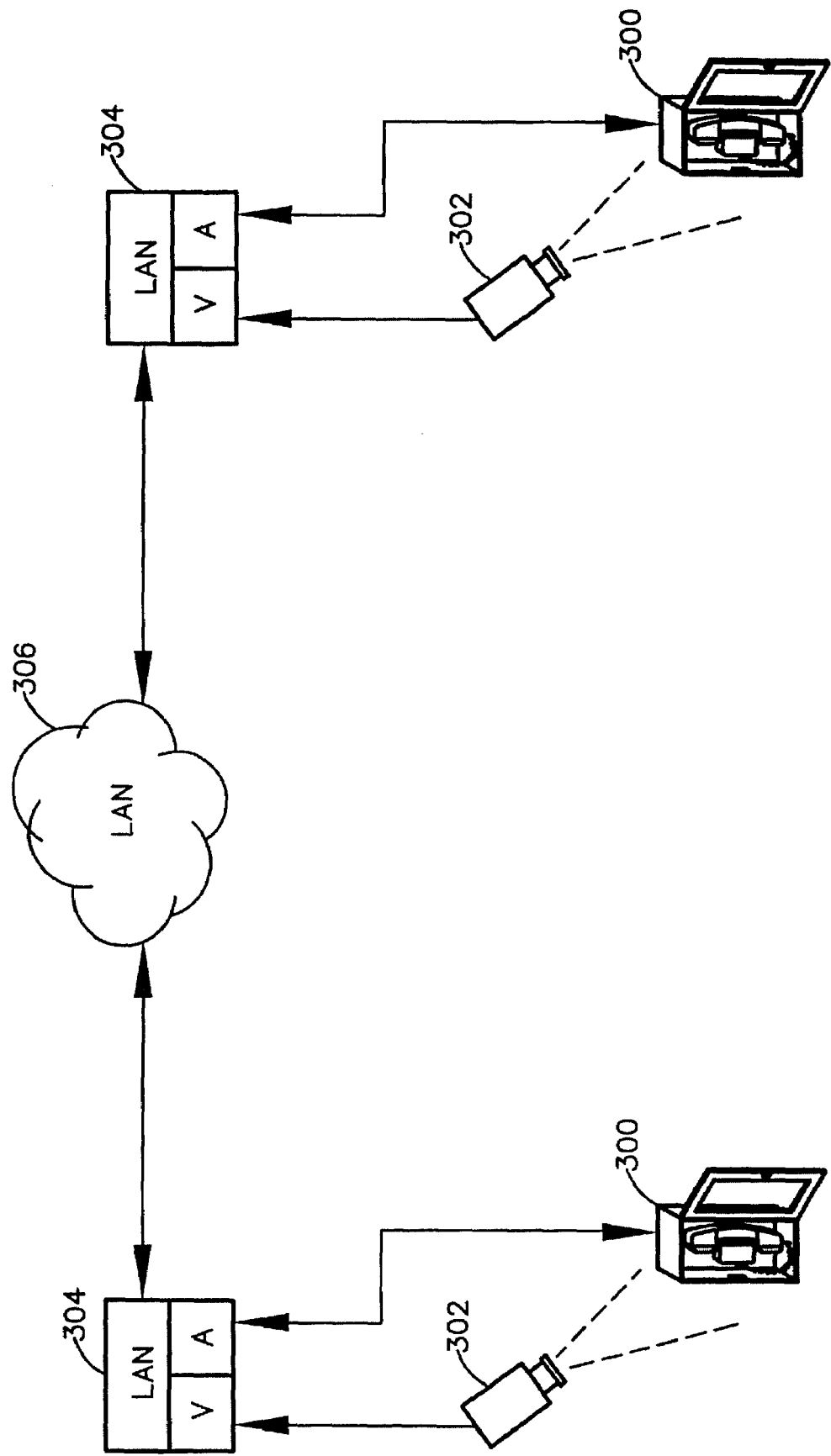
FIG. 12A is an illustration of a VOIP telephone system with companion video over a LAN.
Figure 12B:
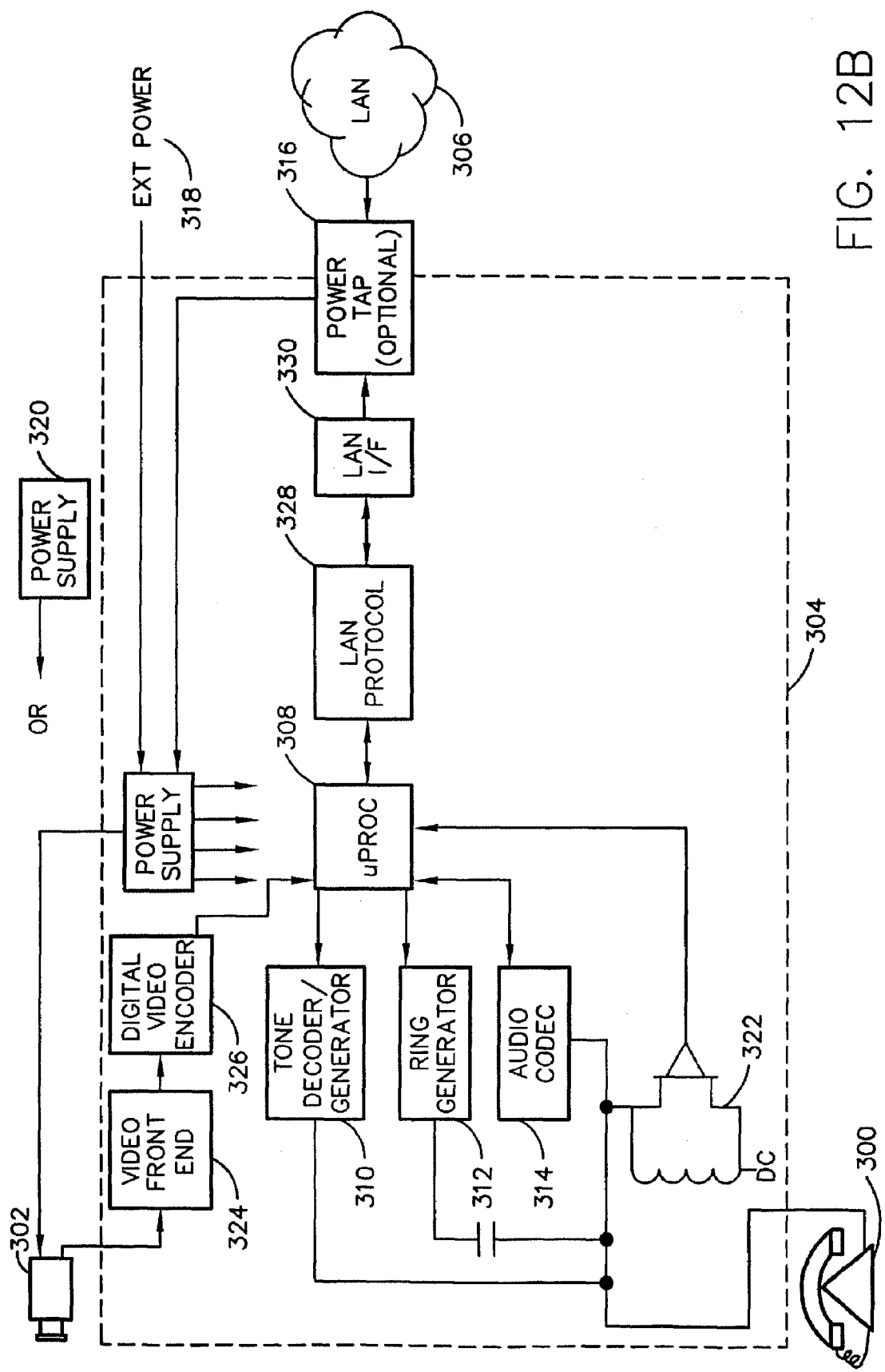
FIG. 12B is a flow diagram of the circuitry for the system of FIG. 12A.

FIGS. 12A-28C show various configurations for the system and demonstrate its wide versatility. FIGS. 12A and 12B show a typical local or LAN installation and supporting circuitry, respectively. In this configuration each telephone is a standard POTS telephone 300 with a separate companion video camera 302. The telephone and camera are each hardwired to a LAN interface 304 for communication over the LAN 306. The basic circuitry modules are shown in FIG. 12A. The heart of the interface is the processor 308. The telephone circuitry in the interface module 304 includes the tone decoder/generator 310, the ring generator 312 and an audio codec 314. DC power is supplied by over the LAN power tap 316, external power 318 or an external power supply 320 to the DC transformer 322. The camera 302 includes a video front-end circuit 324, and a digital video encoder 326. The video and voice signals are managed by the processor 308 that is connected to the LAN protocol circuit 328 that is connected to the LAN interface 330.

Figure 13B:
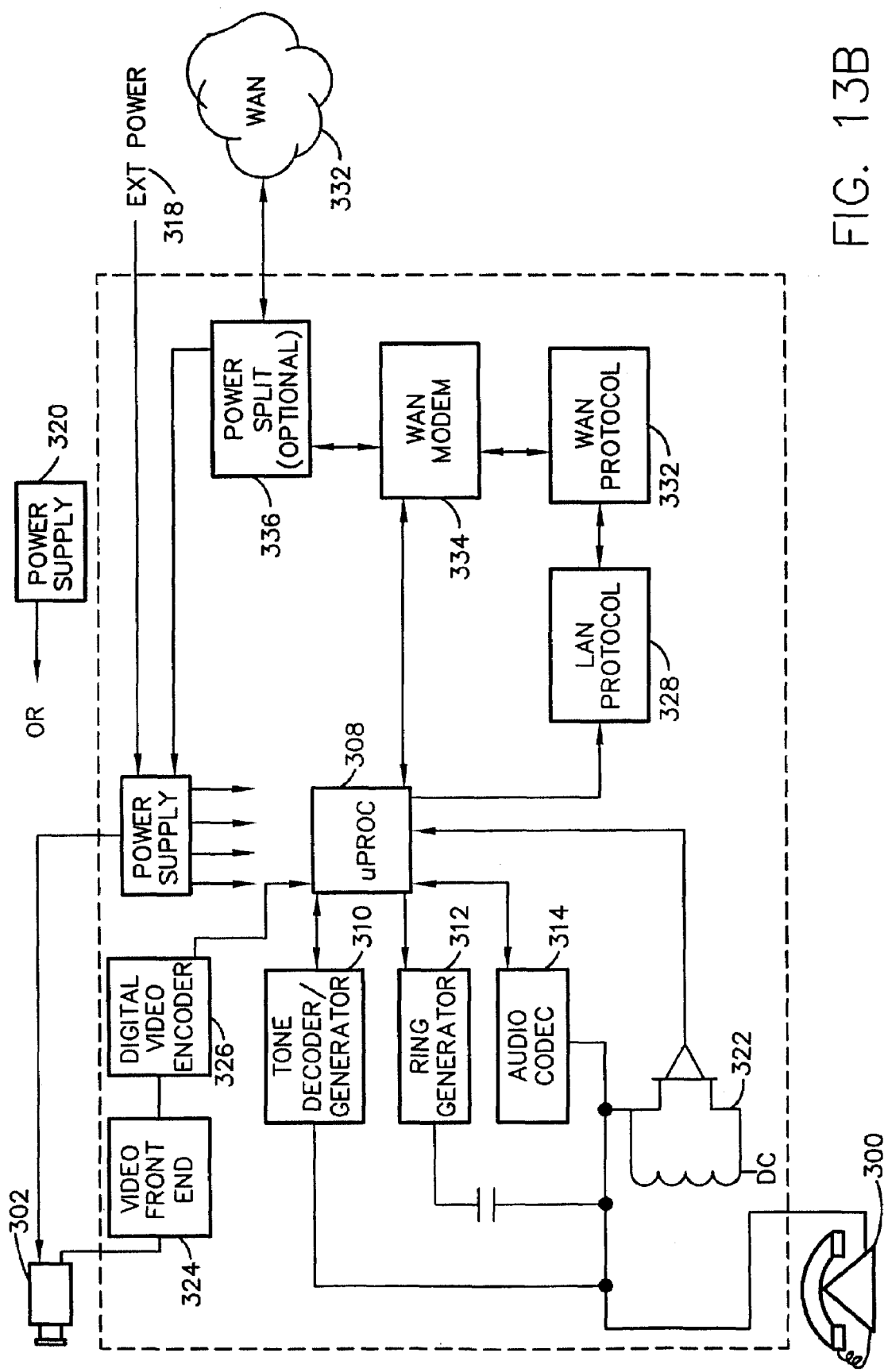
FIG. 13B is a flow diagram of the circuitry for the system of FIG. 13A.

A similar system for a wide area network or WAN 332 is shown in FIGS. 13A and 13B. As shown in FIG. 13B, the LAN interface is replaced with a WAN protocol circuit 335 and a WAN modem 334. The power split 336 is optional.

Figure 14A:
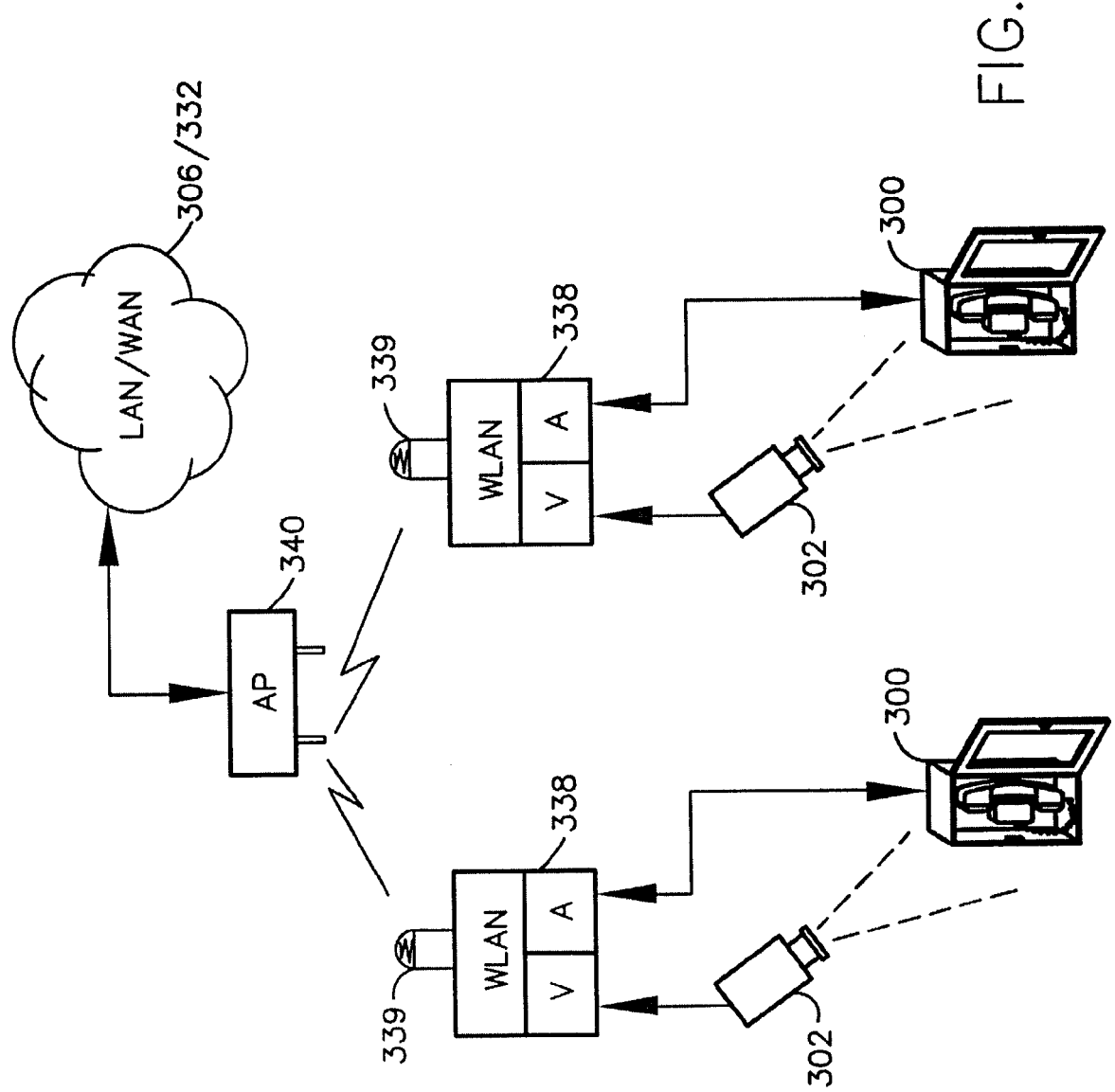
FIG. 14A is a an illustration of a system having wireless units and a transmitter system for a VOIP telephone with companion video.
Figure 14B:
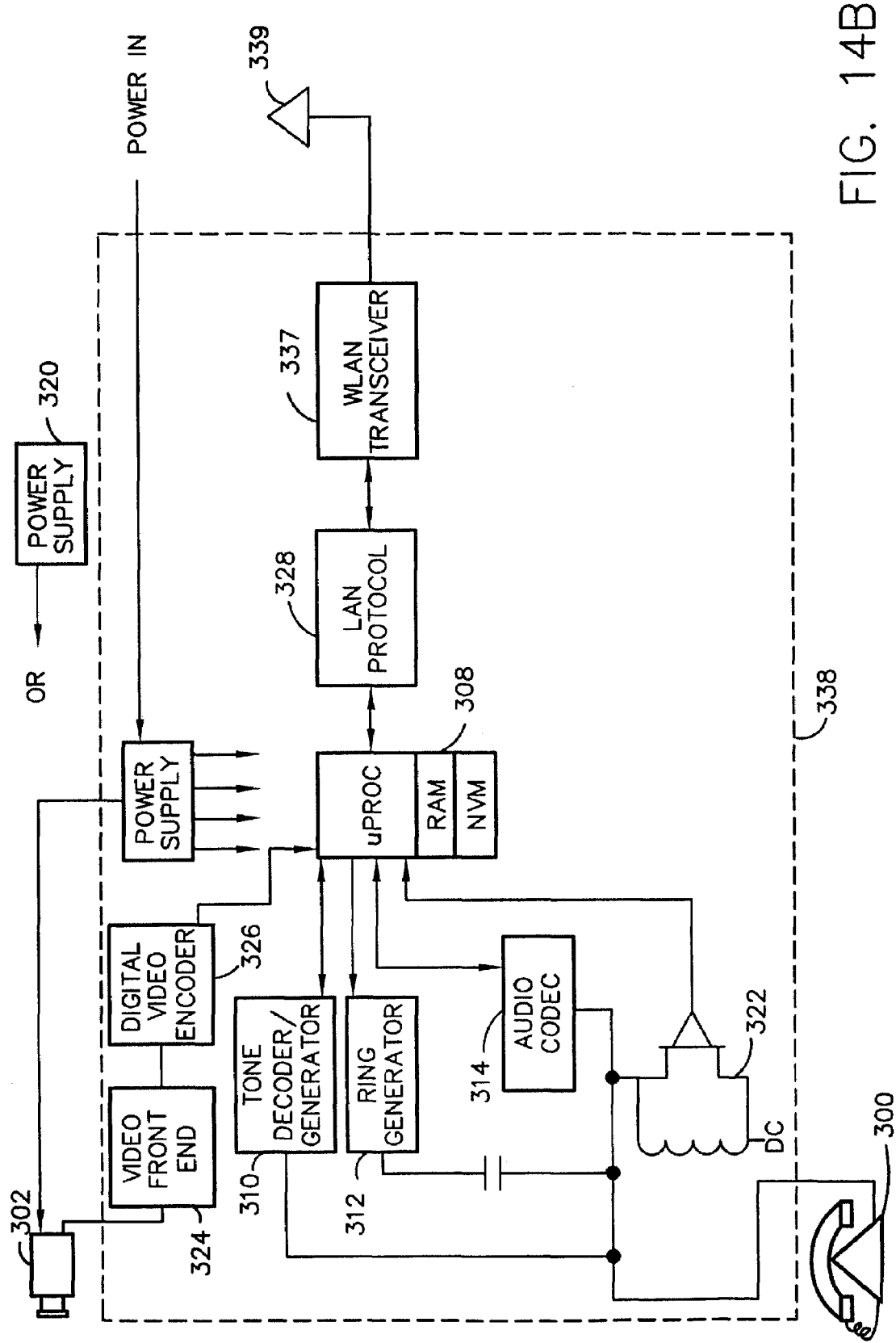
FIG. 14B is a flow diagram of the circuitry for the system of FIG. 14A.

A wireless configuration for either the LAN or WAN is shown in FIGS. 14A and 14B. In this configuration the interface module 338 includes a WLAN transceiver 337 and antenna 339 for transmitting a wireless signal to a suitable wireless access point 340 which is connected to the LAN or WAN.

Figure 15A:
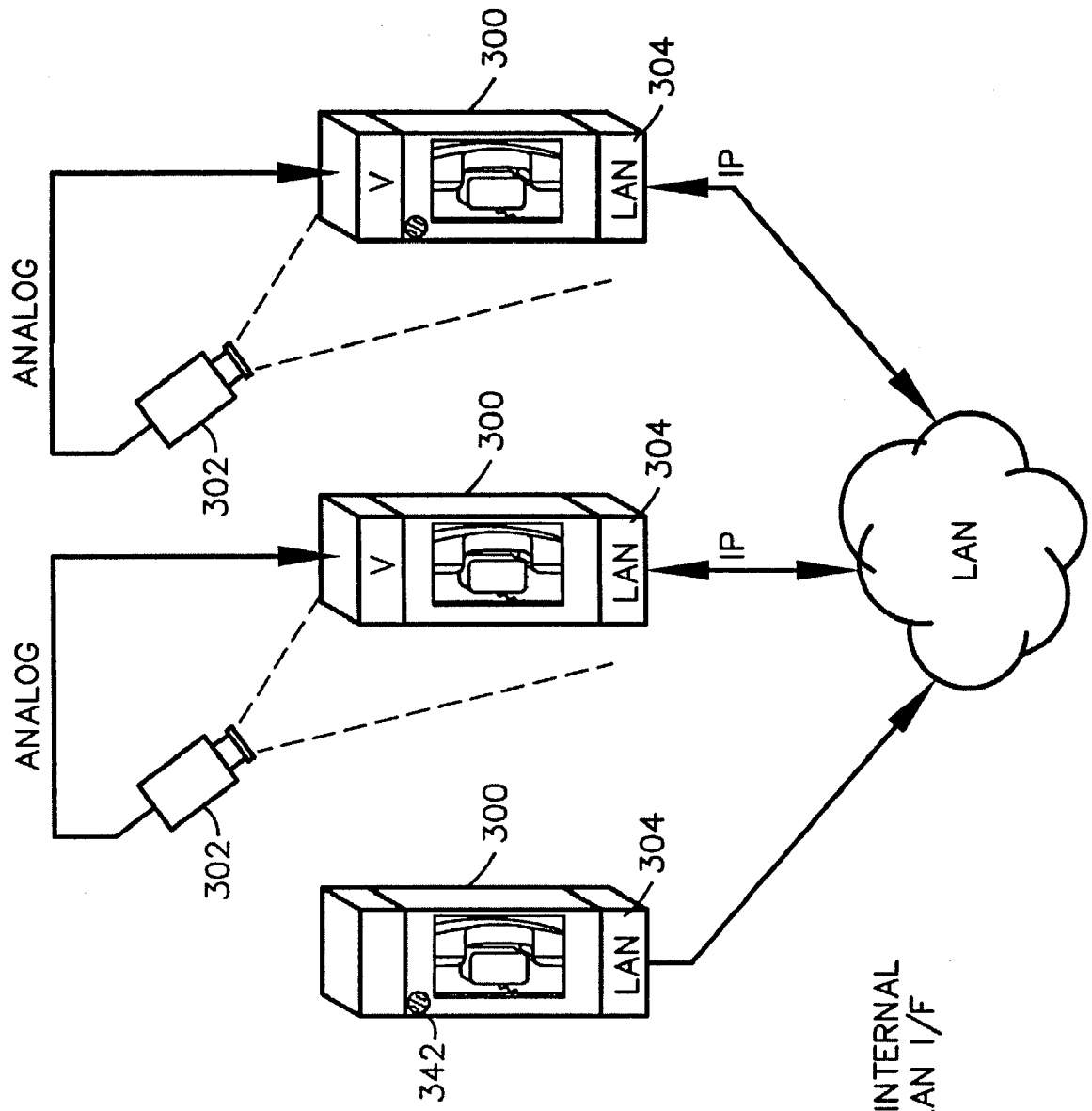
FIG. 15A shows multiple, mixed units in a system, connected over a LAN.
Figure 15B:
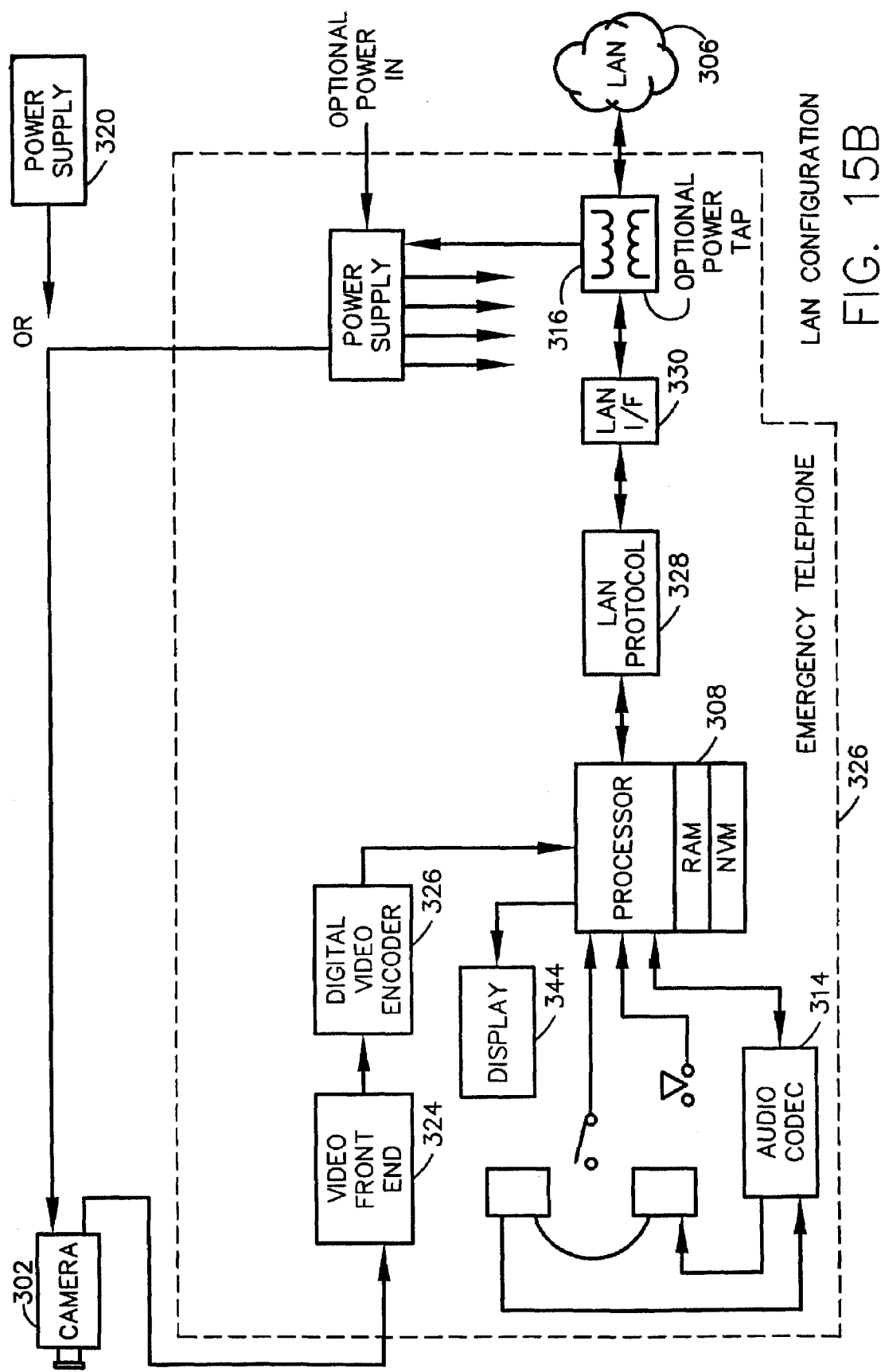
FIG. 15B is a flow diagram of the circuitry for the system of FIG. 15A.
Figure 15C:
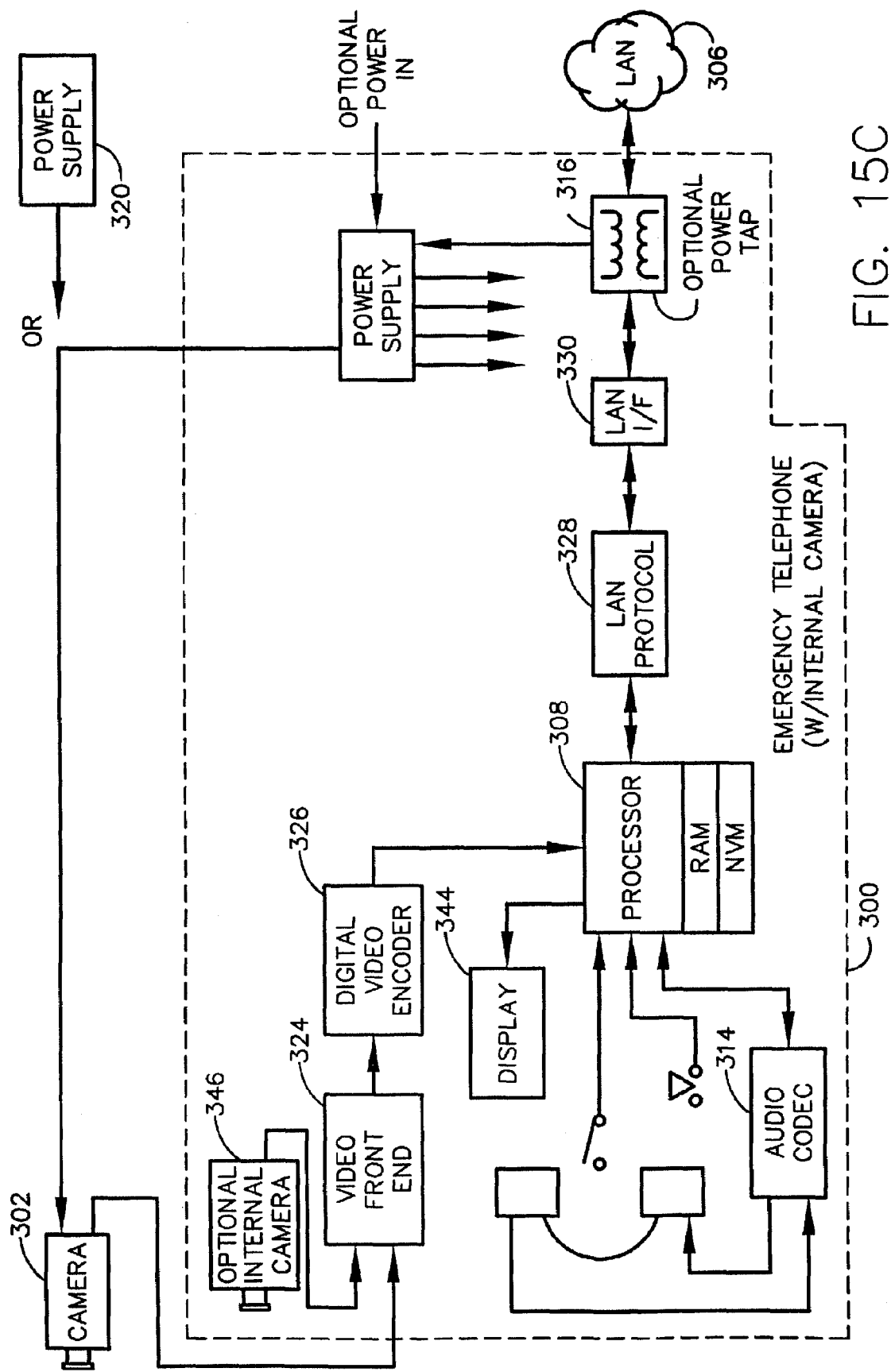
FIG. 15C is an optional flow diagram of the circuitry for the system of FIG. 15B, with an internal camera.

As shown in FIGS. 15A, 15B and 15C each telephone 300 may include a companion camera 302 or an integral camera 342 or a combination. In this configuration the LAN interface is an integral part of the telephone component. The circuitry for an external companion camera is shown in FIG. 15B. The circuitry for a system including an optional integral camera is shown in FIG. 15C. All of the processing circuitry is self-contained within the housing for the telephone 300. In this configuration the telephone can include an optional display 344, such as the LCD display of the telephone of FIG. 10. An integral camera 346 is shown in FIG. 15C.

Figure 16A:
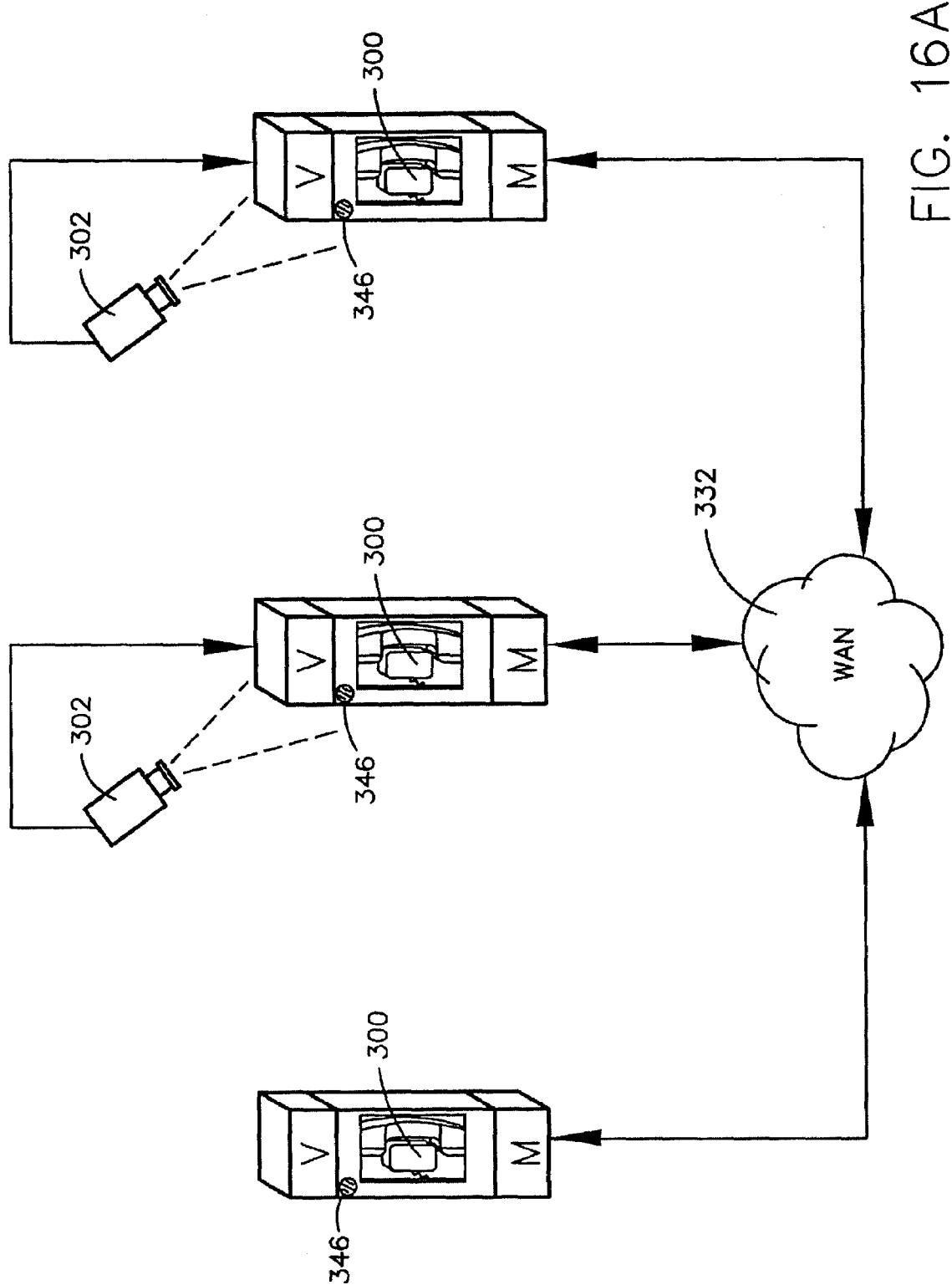
FIG. 16A is similar to FIG. 15A for a WAN.
Figure 16B:
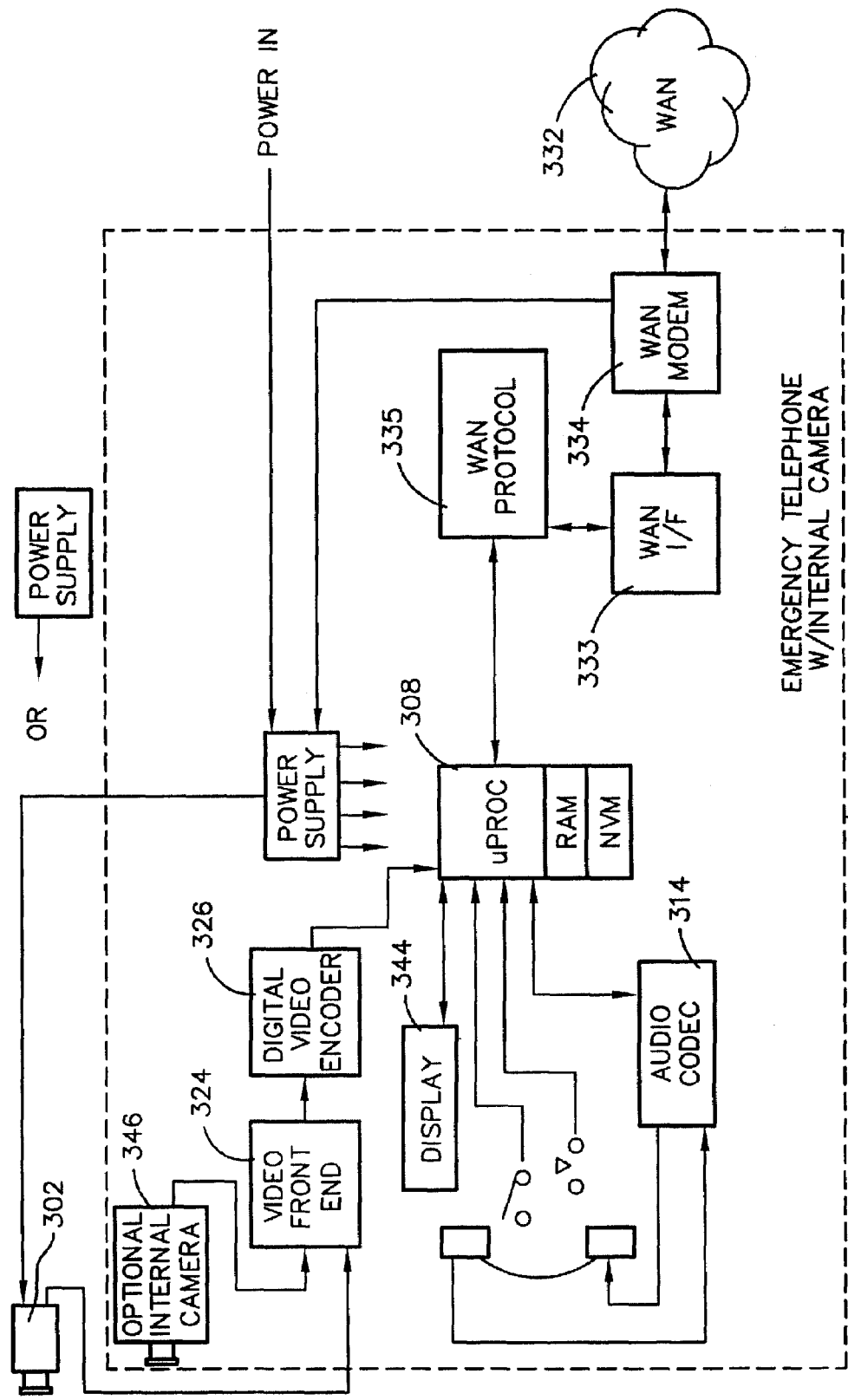
FIG. 16B is a flow diagram of the circuitry for the system of FIG. 16A.
Figure 17A:
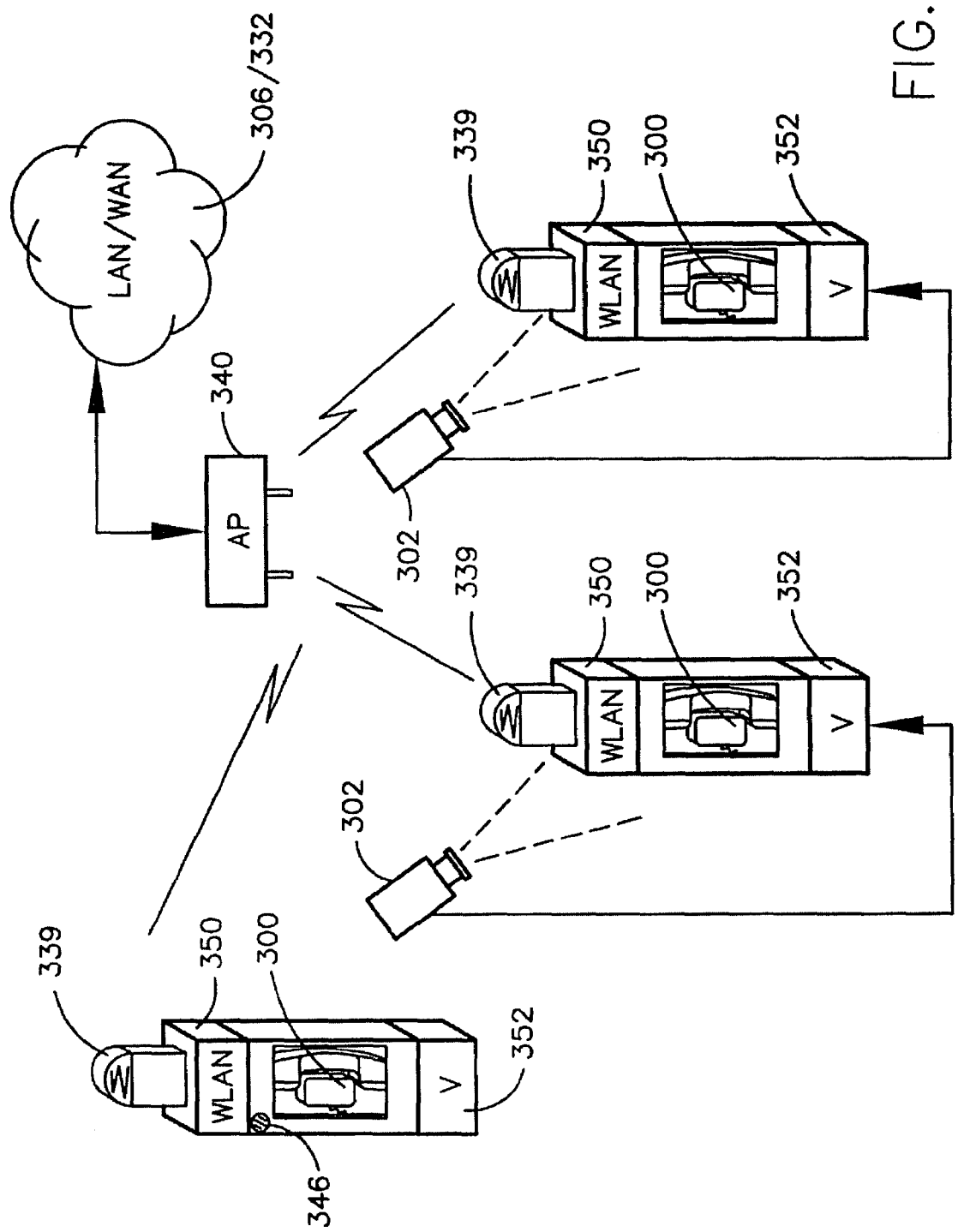
FIG. 17A is an illustration of a system having wireless units and a transmitter system for a VOIP telephone, with an internal camera.
Figure 17B:
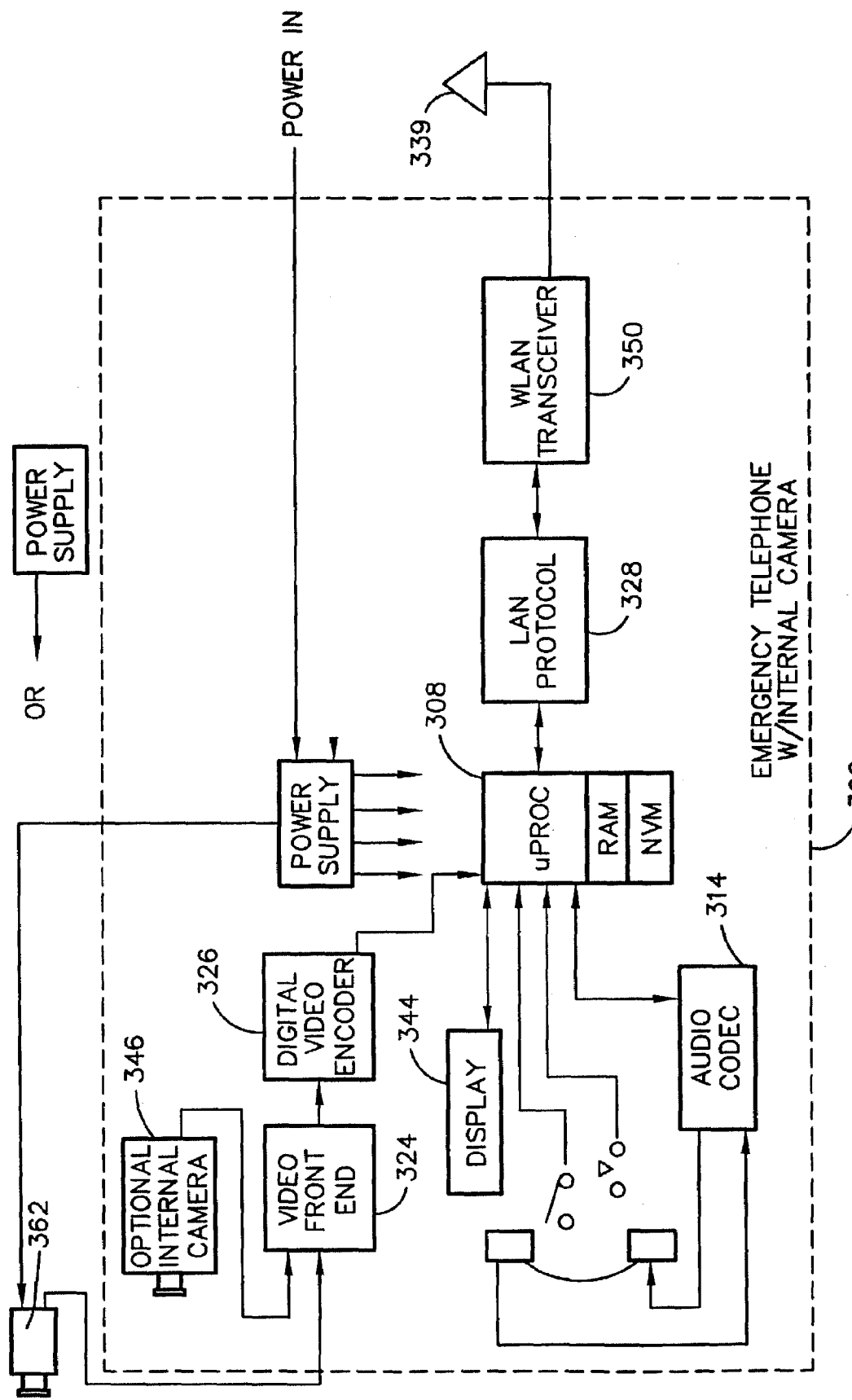
FIG. 17B is a flow diagram of the circuitry for the system of FIG. 17A.

The same hardware system configured for a WAN is shown in FIGS. 16A and 16B, with the LAN interface component being replaced with the WAN protocol circuitry 335, the WAN interface 333 and the WAN modem 334. The wireless configuration is shown in FIGS. 17A and 17B. In this configuration, the telephone is equipped with an integral WLAN interface 350 that operates in the same manner as the external wireless interface module 338 shown in FIGS. 14A and 14B. The cameras may be internal cameras 346, companion cameras 302, or a combination. In this configuration the companion camera interface 352 is an integral part of the telephone 300.

Figure 18B:
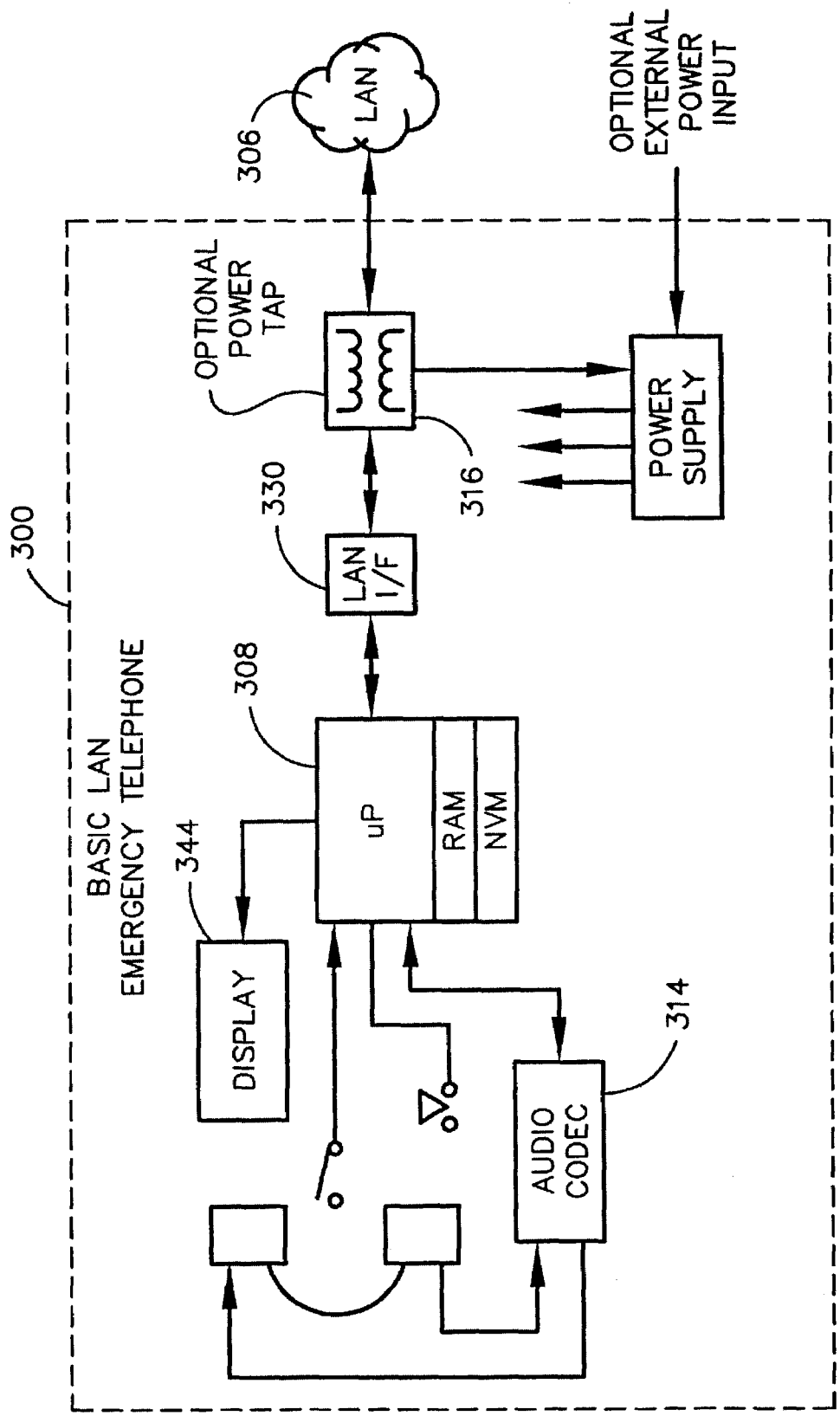
FIG. 18B illustrates the LAN interface configuration for the system of FIG. 18A.
Figure 18C:
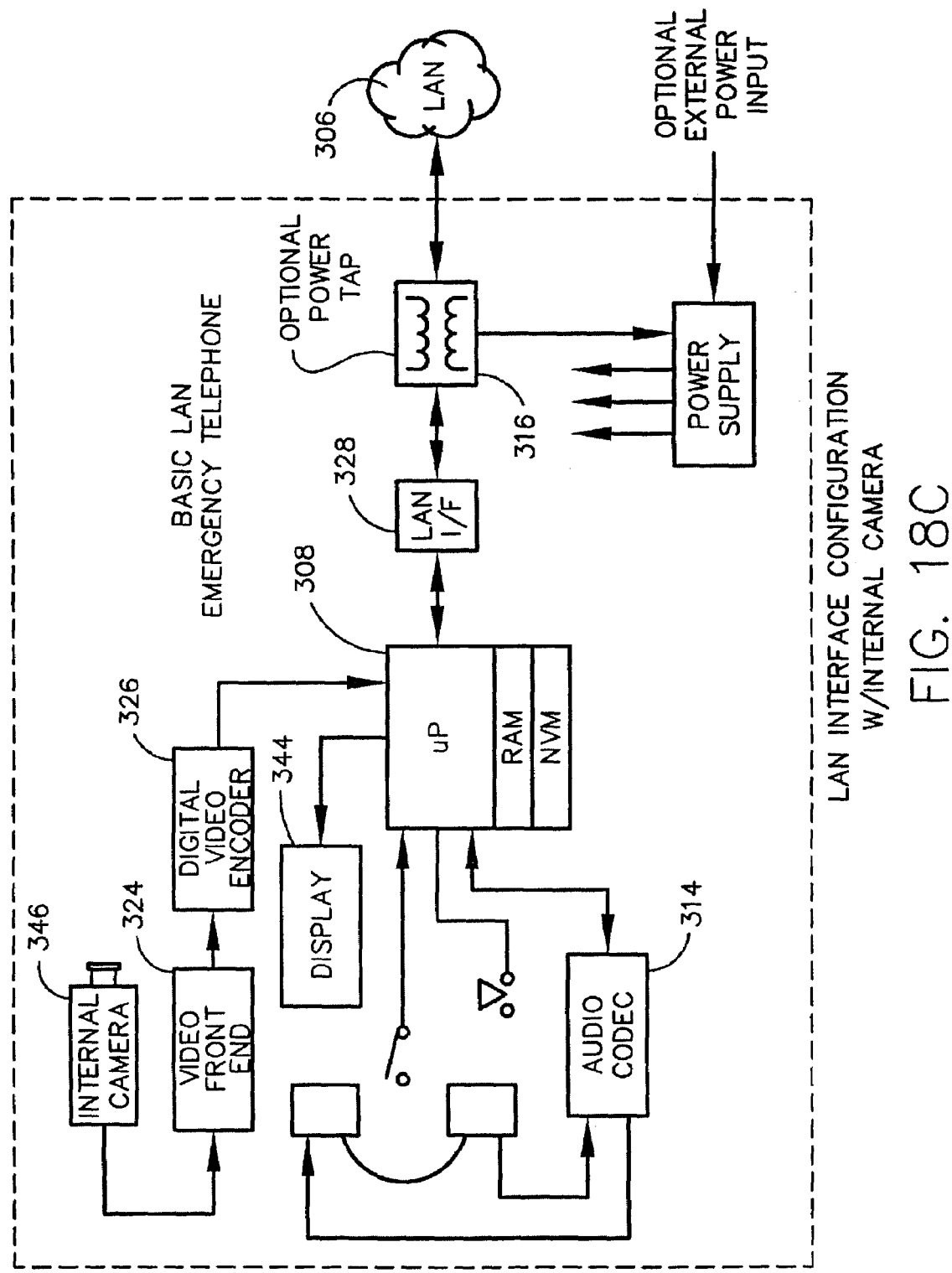
FIG. 18C illustrates the LAN interface configuration for a system similar to FIG. 18A, but having an internal camera.
Figure 19A:
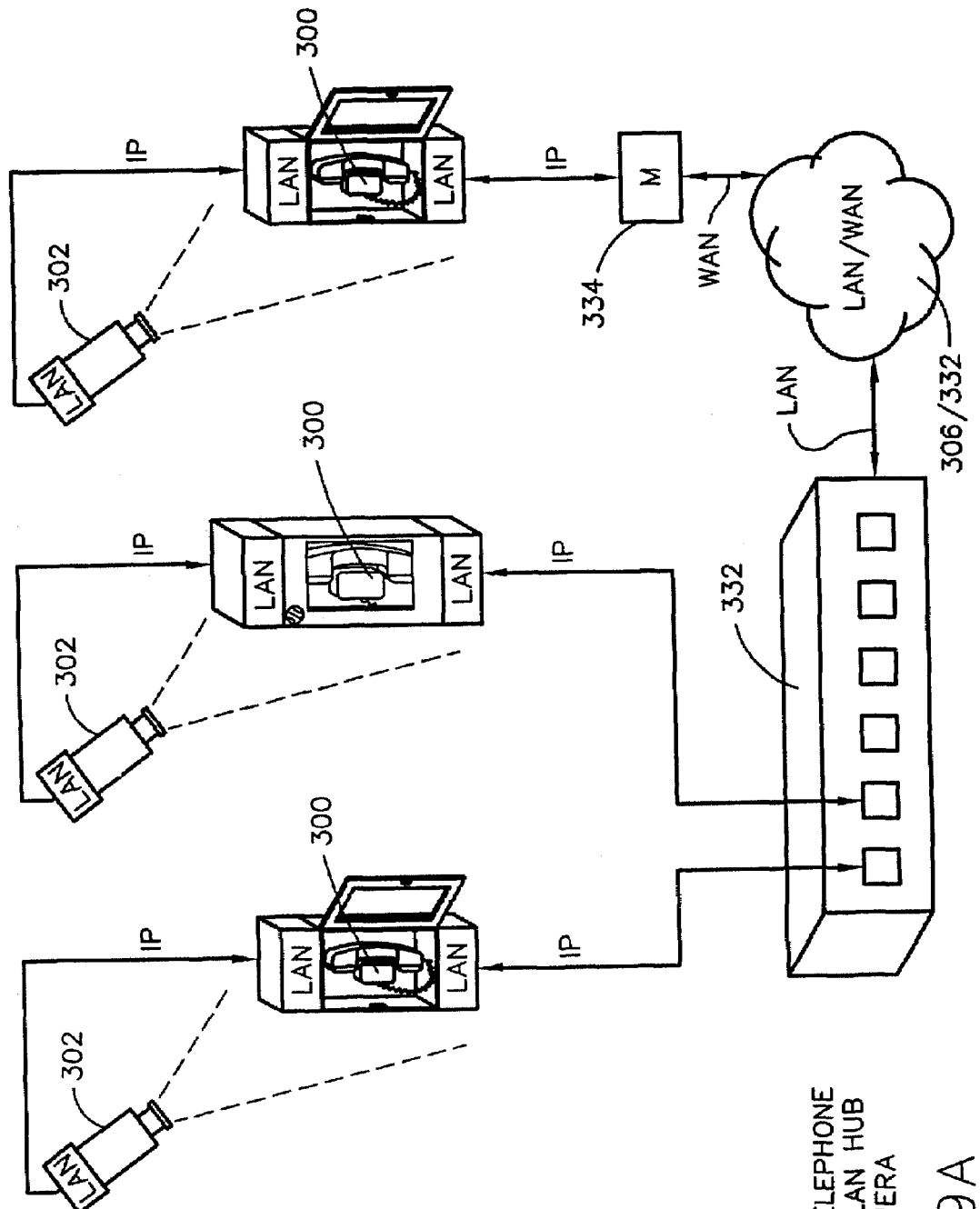
FIG. 19A is an illustration of a system having a VOIP telephone with an internal LAN hub and a companion IP camera.
Figure 19B:
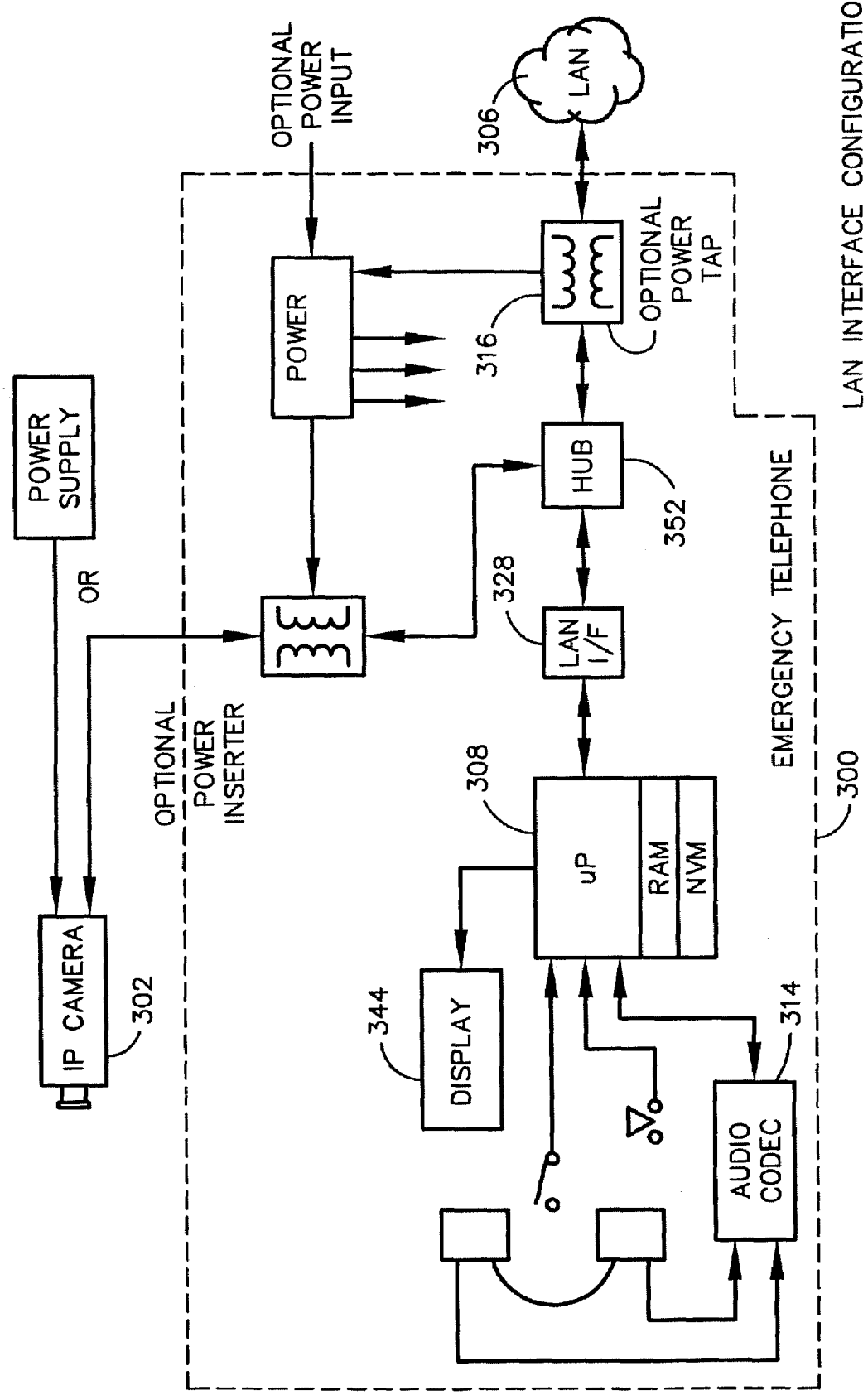
FIG. 19B illustrates the LAN interface configuration for the system of FIG. 19A.
Figure 19C:
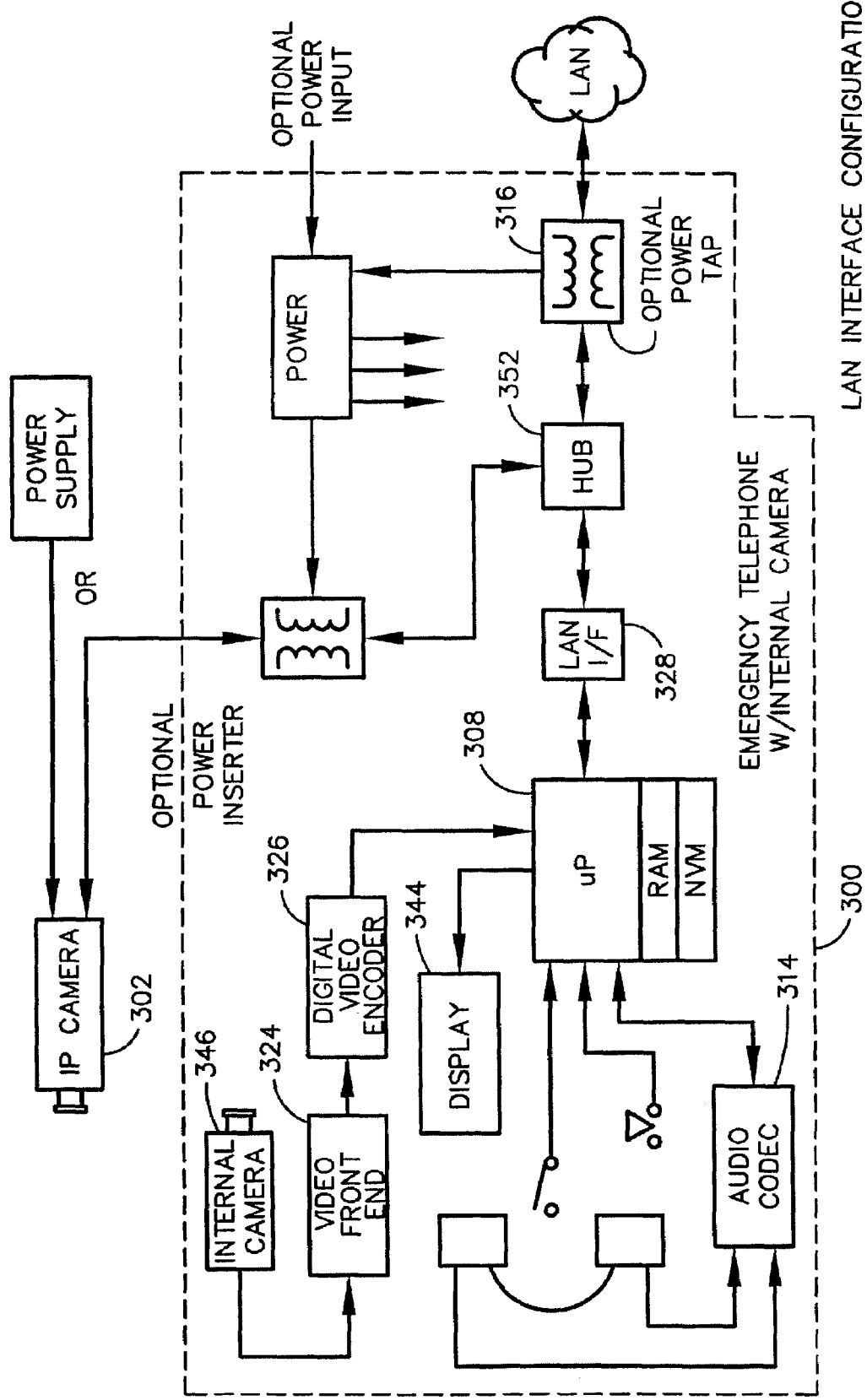
FIG. 19C illustrates the LAN interface configuration for a system similar to FIG. 19A, but having an internal camera.

FIGS. 18A-C, and FIGS. 19A-C show various configurations utilizing switched hubs 352. In the configuration of FIGS. 18A-C the camera signal is connected directly to the hub. In FIGS. 19A-C the camera signal is connected to an integral interface provided in the telephone unit. As shown in FIG. 18A, not all cameras 302 and telephones 300 are required to be connected through the hub 352. A combination of direct connect and hub connect components may be deployed. FIG. 18B is a circuit without a camera component and FIG. 18C includes an integral camera component. FIGS. 19A-C show a similar set up with the camera interface being an integral component of the telephone, as previously shown in FIGS. 15A-17C.

Figure 20A:
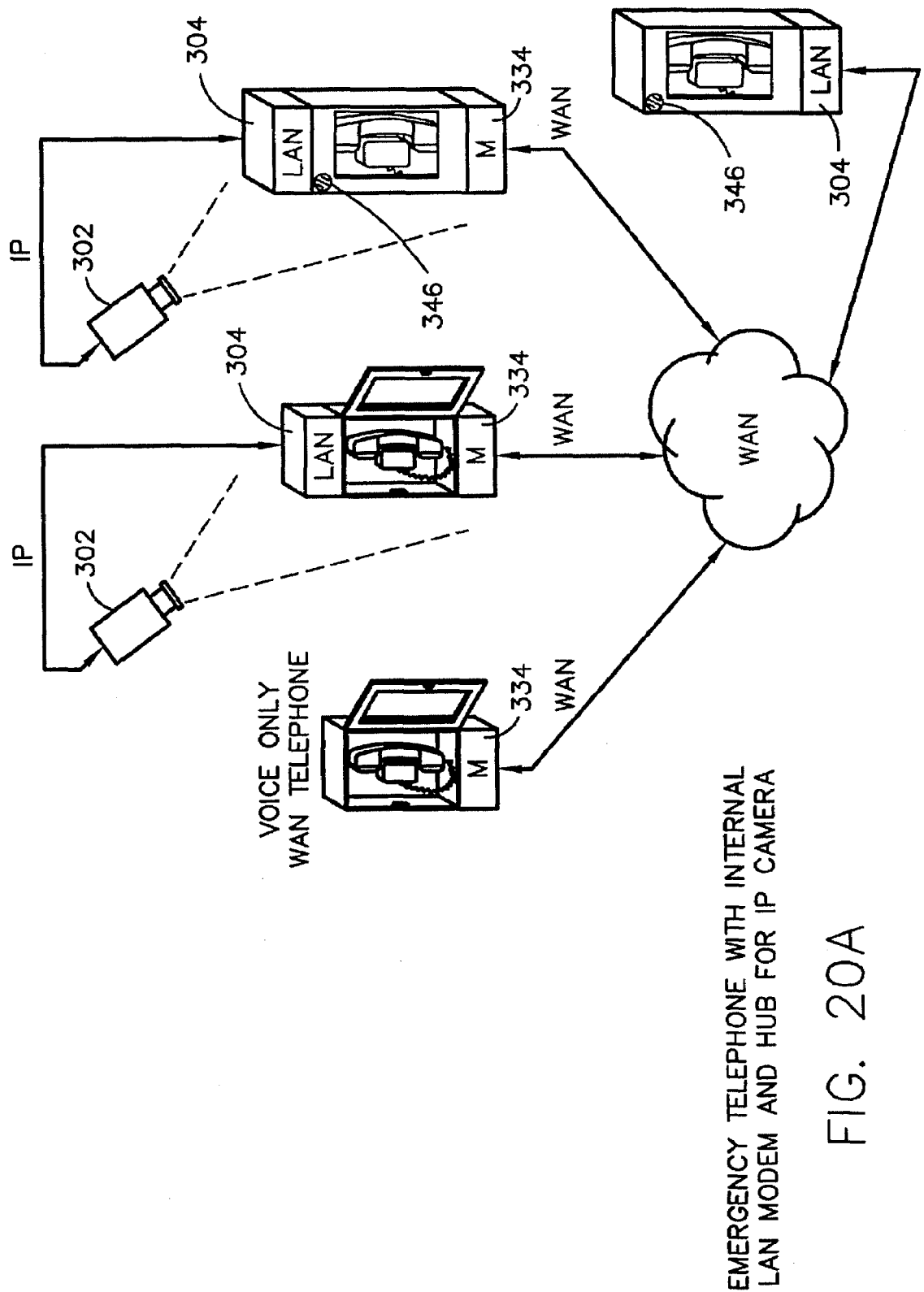
FIG. 20A is an illustration of a system for a VOIP telephone with an internal LAN modem and hub for an IP camera.
Figure 20D:
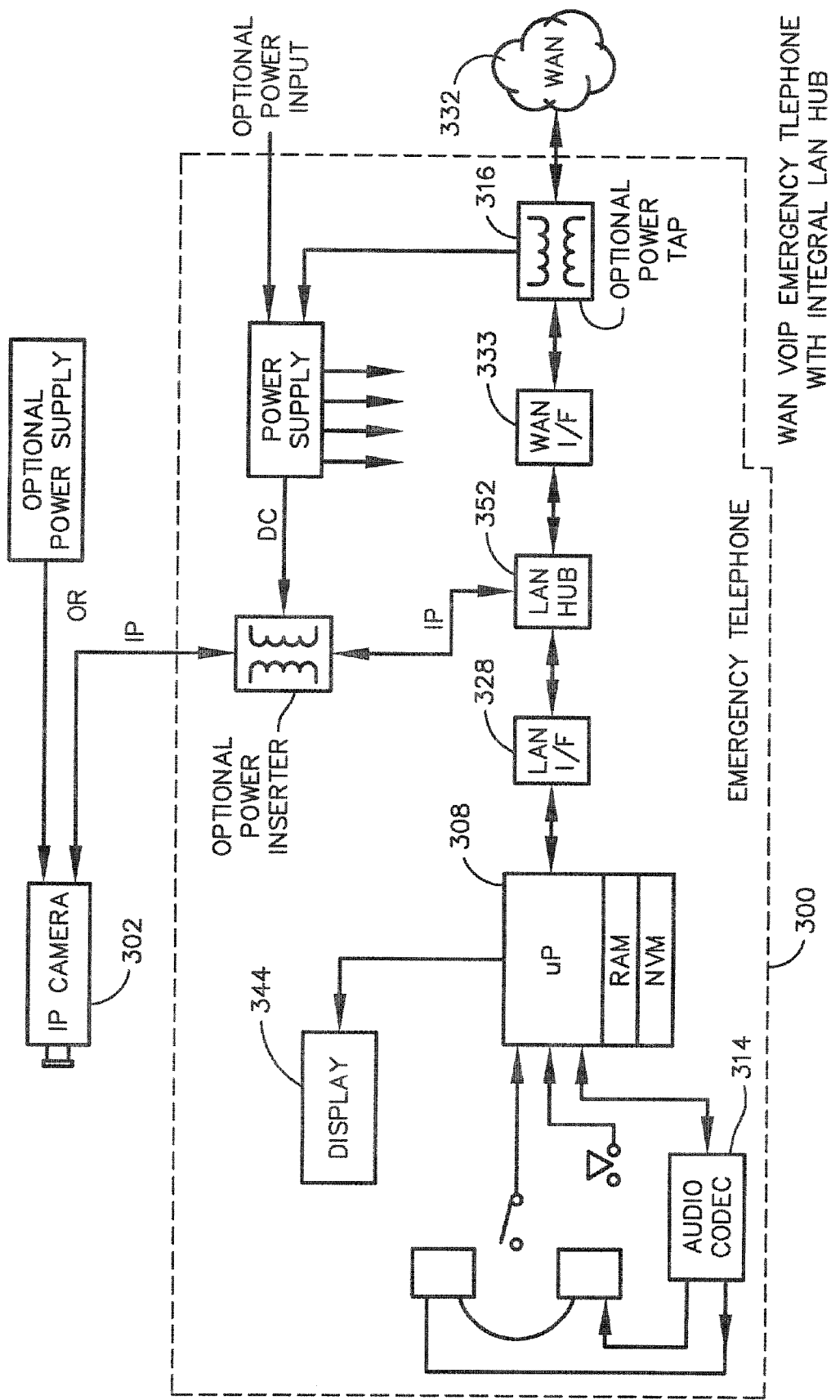
FIG. 20D illustrates the basic WAN VOIP telephone configuration for the system of FIG. 20A with an integral LAN hub.

An emergency telephone system with a VOIP telephone with an internal LAN modem and hub for an IP camera is shown in FIGS. 20A-20E. In this configuration the telephone 300 includes either or both of a LAN interface and a WAN modem 334 for supporting the telephone 300, companion camera 302 and/or the integral camera 346. The basic WAN configuration is shown in FIG. 20B. The WAN VOIP configuration with internal camera is shown in FIG. 20C. A WAN VOIP configuration for supporting a companion camera with an internal hub is shown in FIG. 20D. A comprehensive system for supporting both companion cameras and internal cameras is shown in FIG. 20E.

Figure 21A:
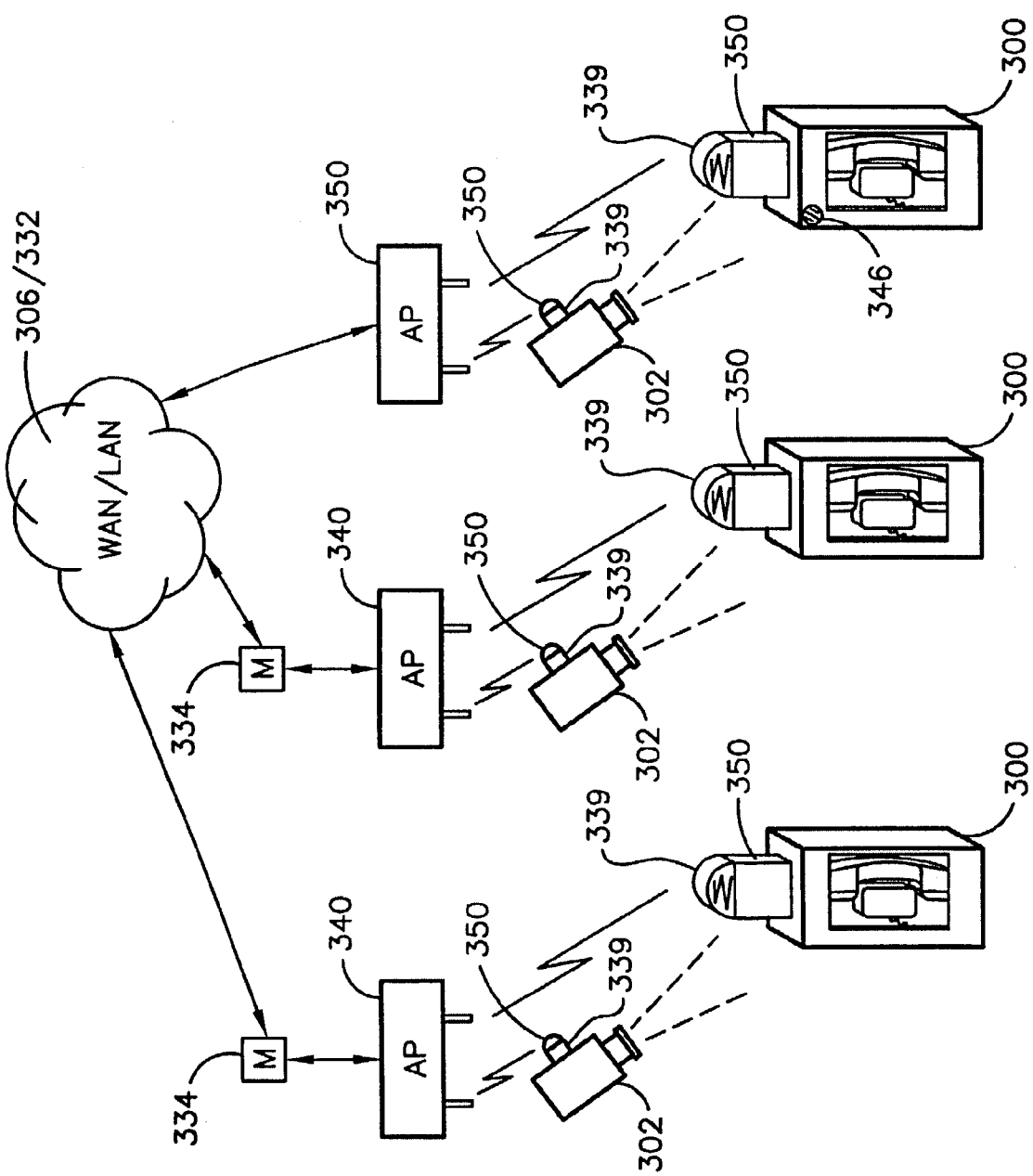
FIG. 21A is an illustration of a wireless VOIP telephone and companion wireless video.
Figure 21B:
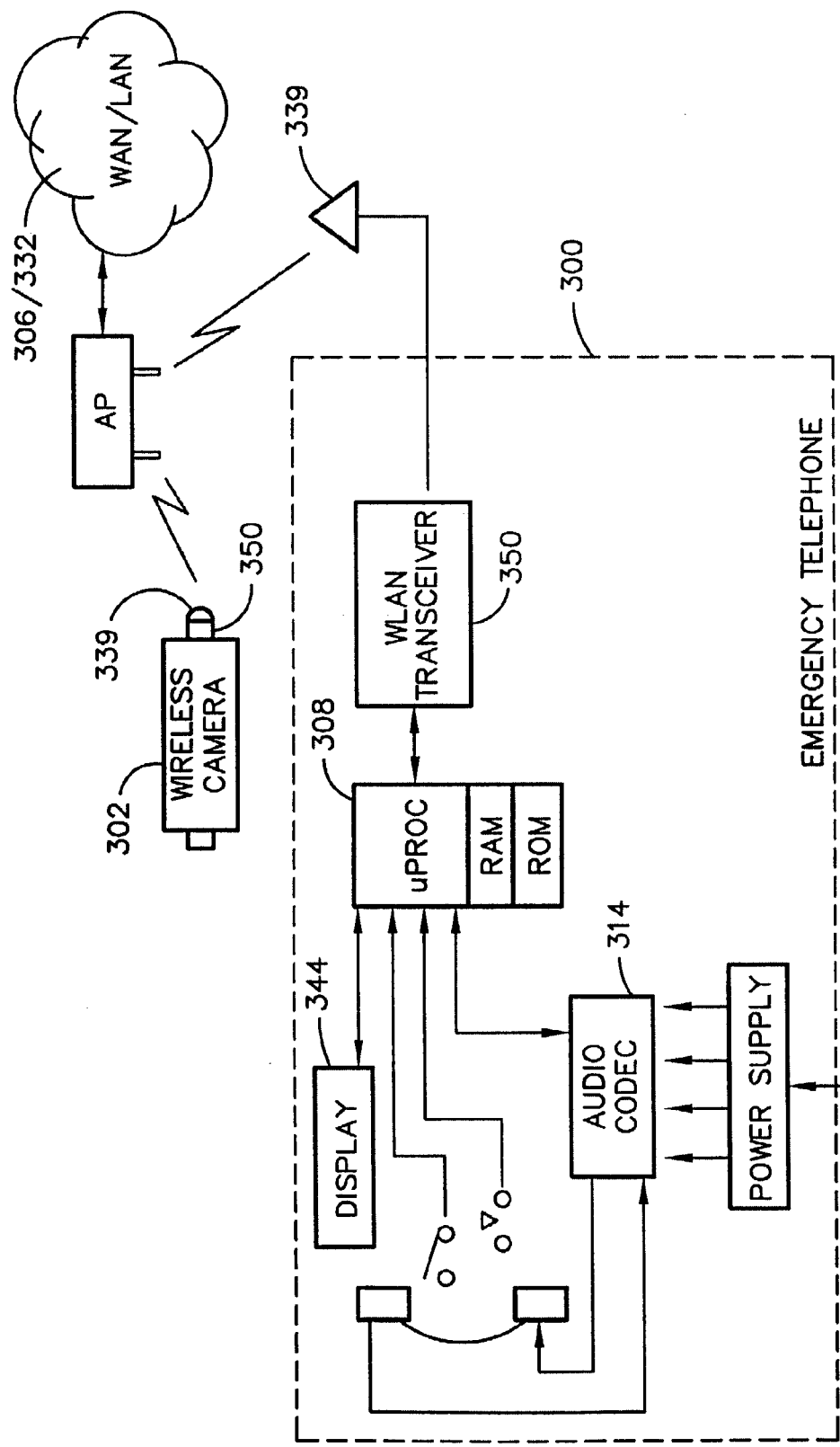
FIG. 21B is an illustration of the flow diagram for the circuitry of FIG. 21A.
Figure 21C:
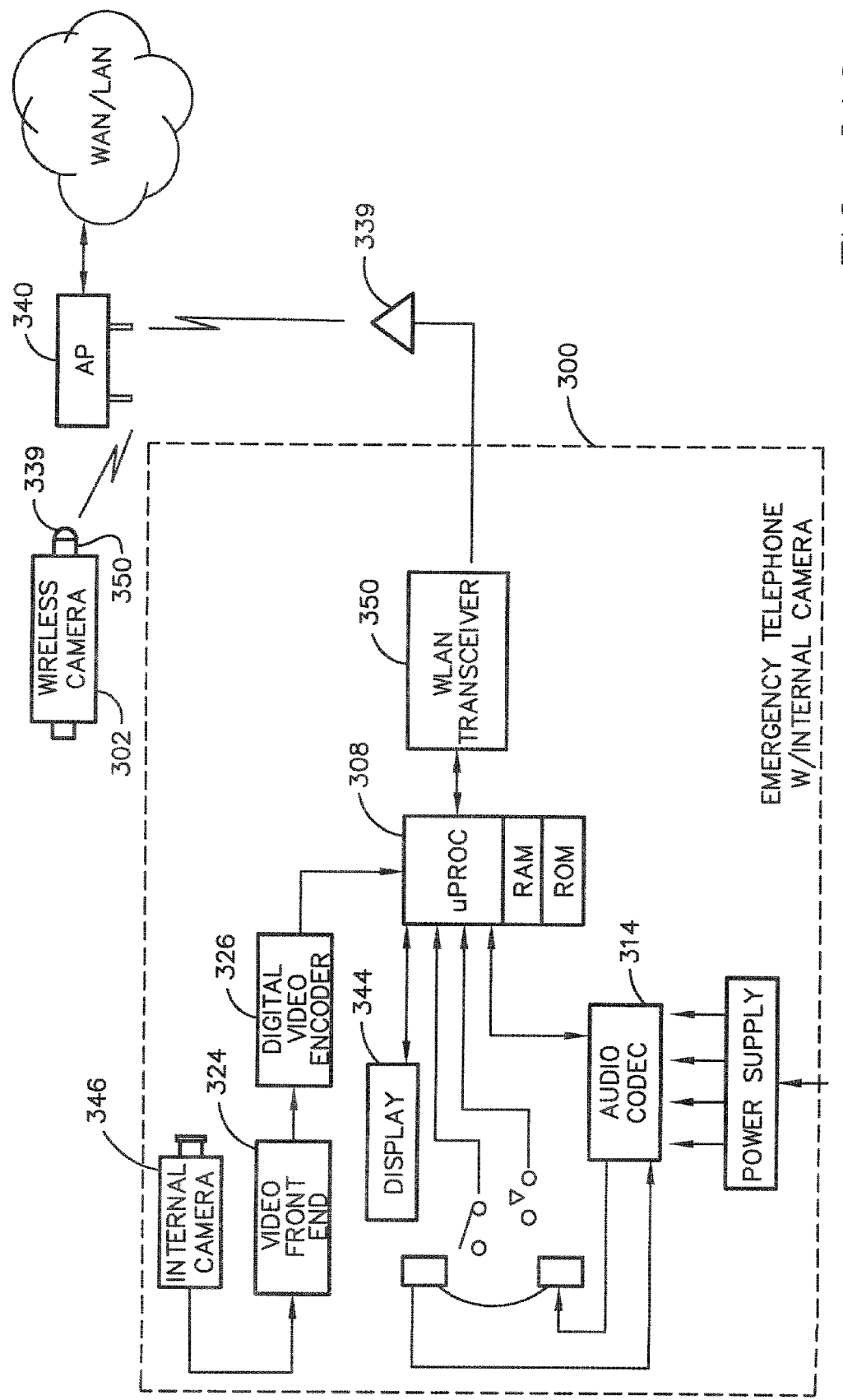
FIG. 21C is an illustration of the flow diagram for the circuitry of FIG. 21A, with an internal camera.

A wireless configuration is shown in FIGS. 21A-21C. In this configuration each companion camera 302 and each telephone 300 is provided with an integral wireless transceiver 350 and antenna 339 for transmitting wireless signals to an access point 340. The access point is connected to a WAN 332 via a WAN modem 334 or to a LAN 306 via a LAN interface 328. A basic configuration with companion cameras is shown in FIG. 21B. The system is adapted to support internal cameras in FIG. 21C.

Figure 22A:
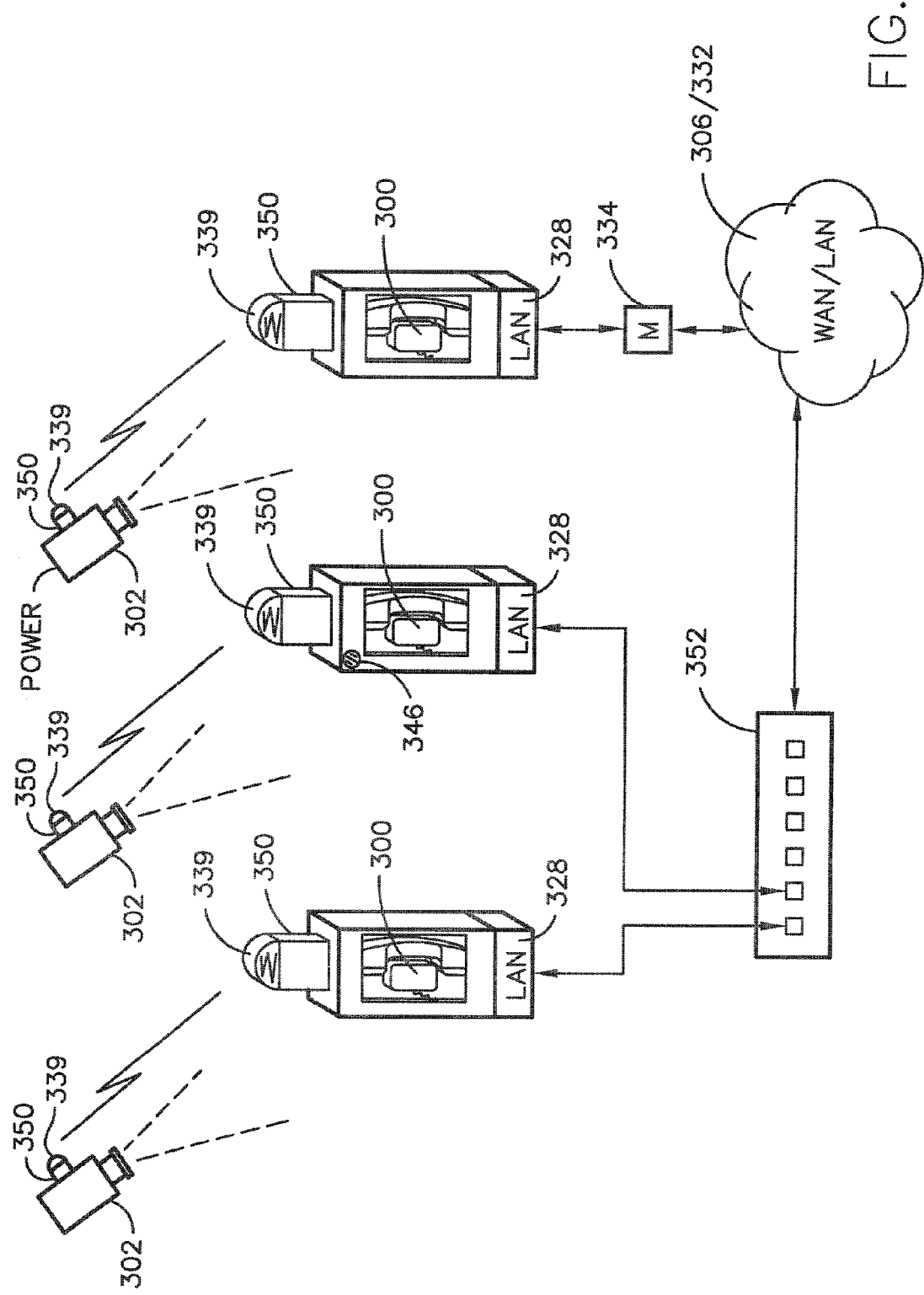
FIG. 22A is a system similar to that of FIG. 21A, with a switched hub.
Figure 22B:
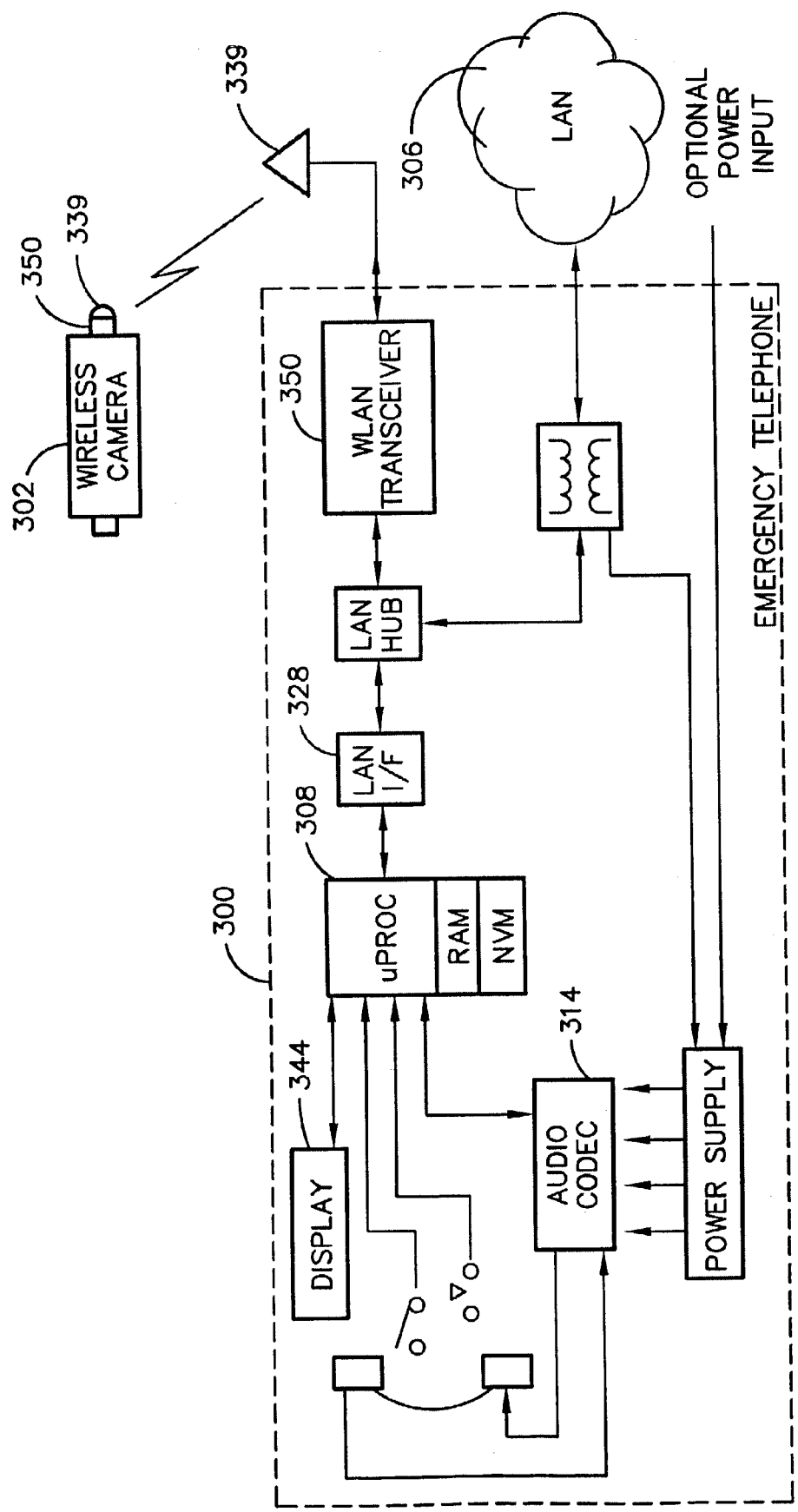
FIG. 22B is an illustration of the flow diagram for the circuitry of FIG. 22A.
Figure 22C:
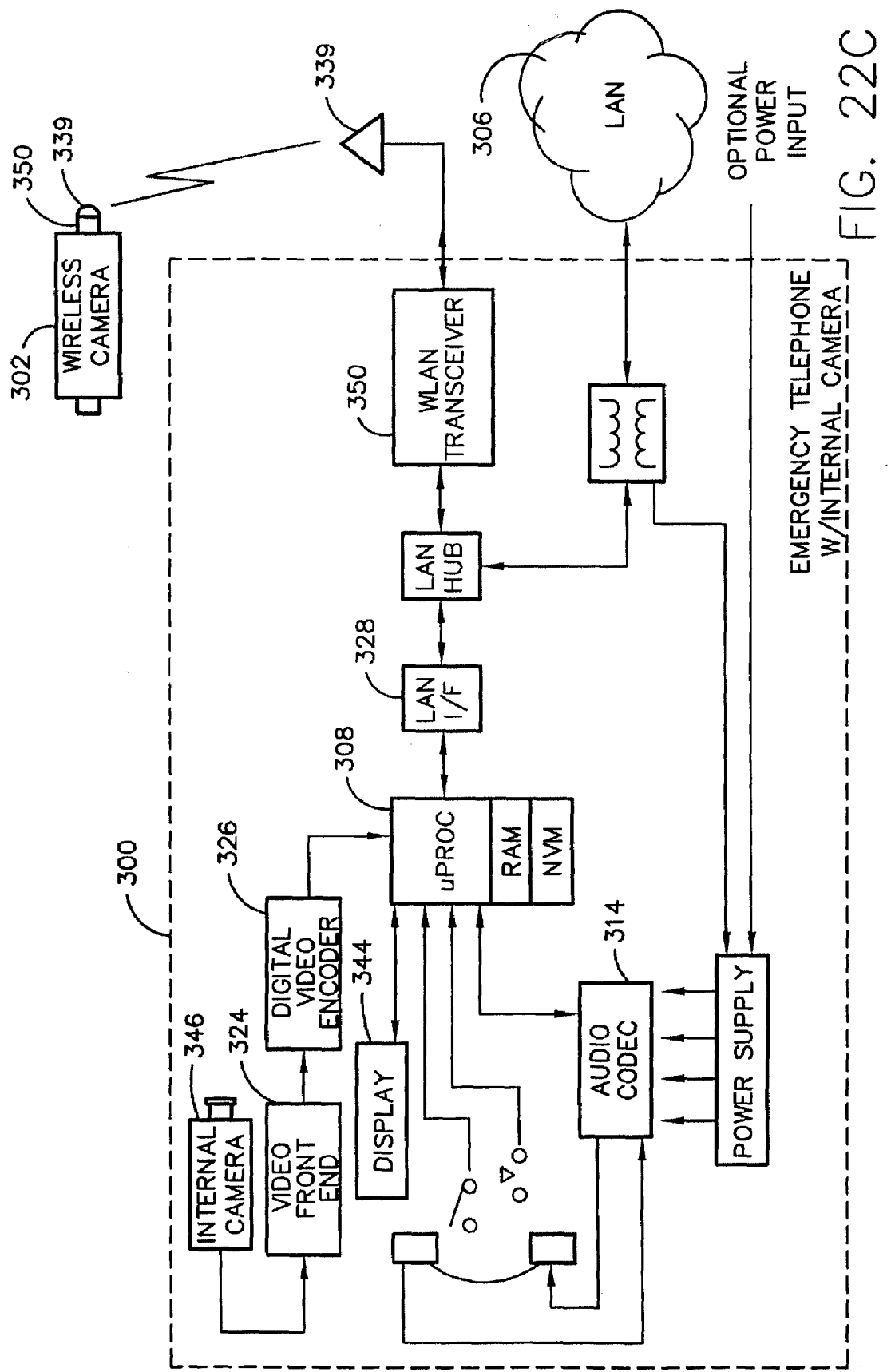
FIG. 22C is an illustration of the flow diagram for the circuitry of FIG. 22A, with an internal camera.

A wireless configuration wherein the telephone 300 includes an internal LAN interface 328 is shown in FIGS. 22A-22C. In this configuration the companion camera includes a transceiver 350 and an antenna 339. The telephone 300 includes a mated transceiver 350 and antenna 339 for receiving data from and transmitting data to the camera. The separate units may be coupled to a hub 352 or connected directly to the LAN 206 or through a WAN modem 334 to a WAN 332. A basic system for a companion camera is shown in FIG. 22B. The system includes an integral camera in FIG. 22C.

Figure 23B:
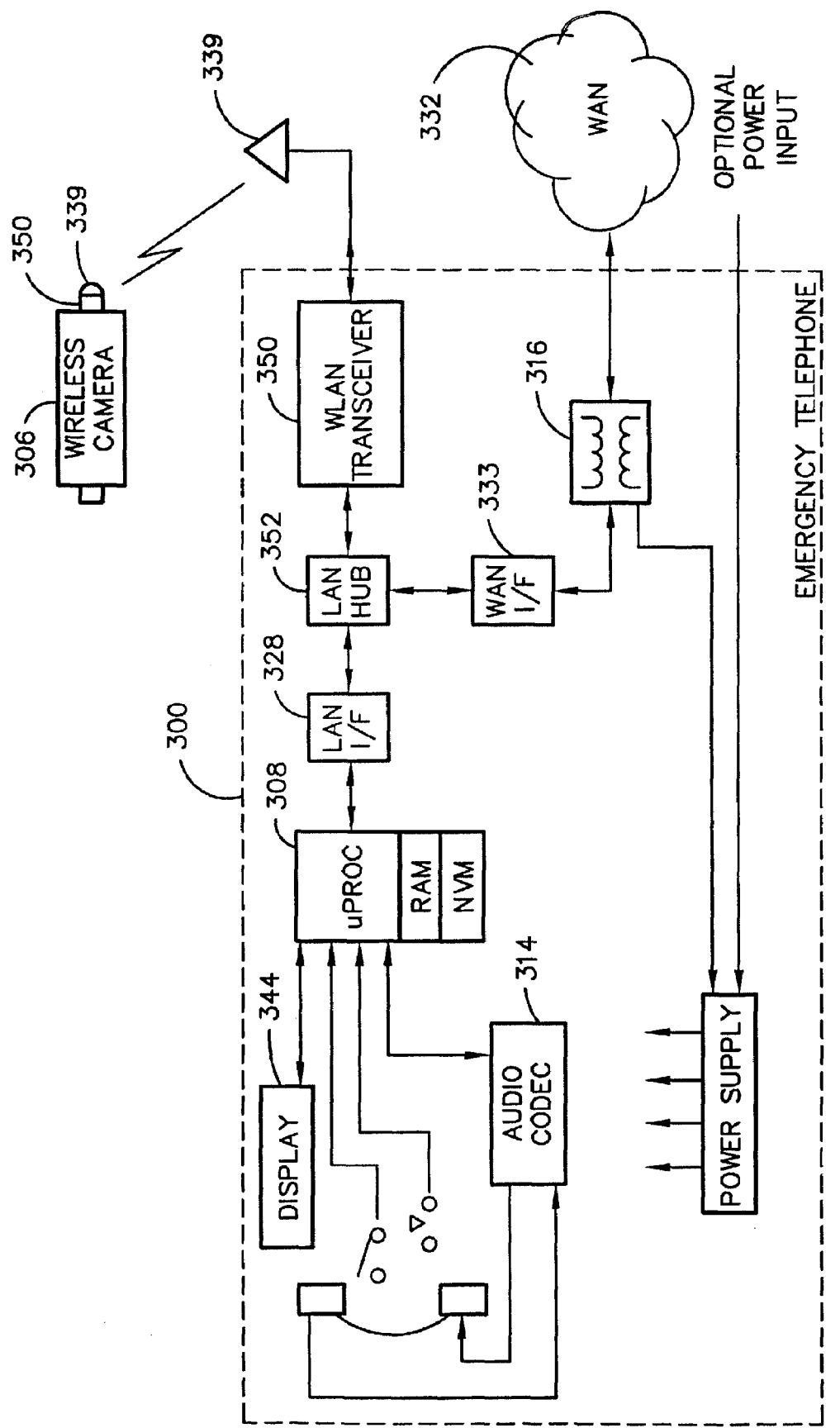
FIG. 23B is an illustration of the flow diagram for the circuitry of FIG. 23A.

A wireless system with integral WAN modem is shown in FIGS. 23A-23C. In this configuration the telephone units 300 include an integral WAN modem or interface 333 for connecting the unit and the companion camera 302 and/or integral camera 346 to the WAN 332. The companion camera 302 is wirelessly connected to the associated telephone unit using mated transceivers 350 and antennas 339. A basic system with companion cameras is shown in FIG. 23C. The configuration including the internal camera 346 is shown in FIG. 23C.

Figure 24A:
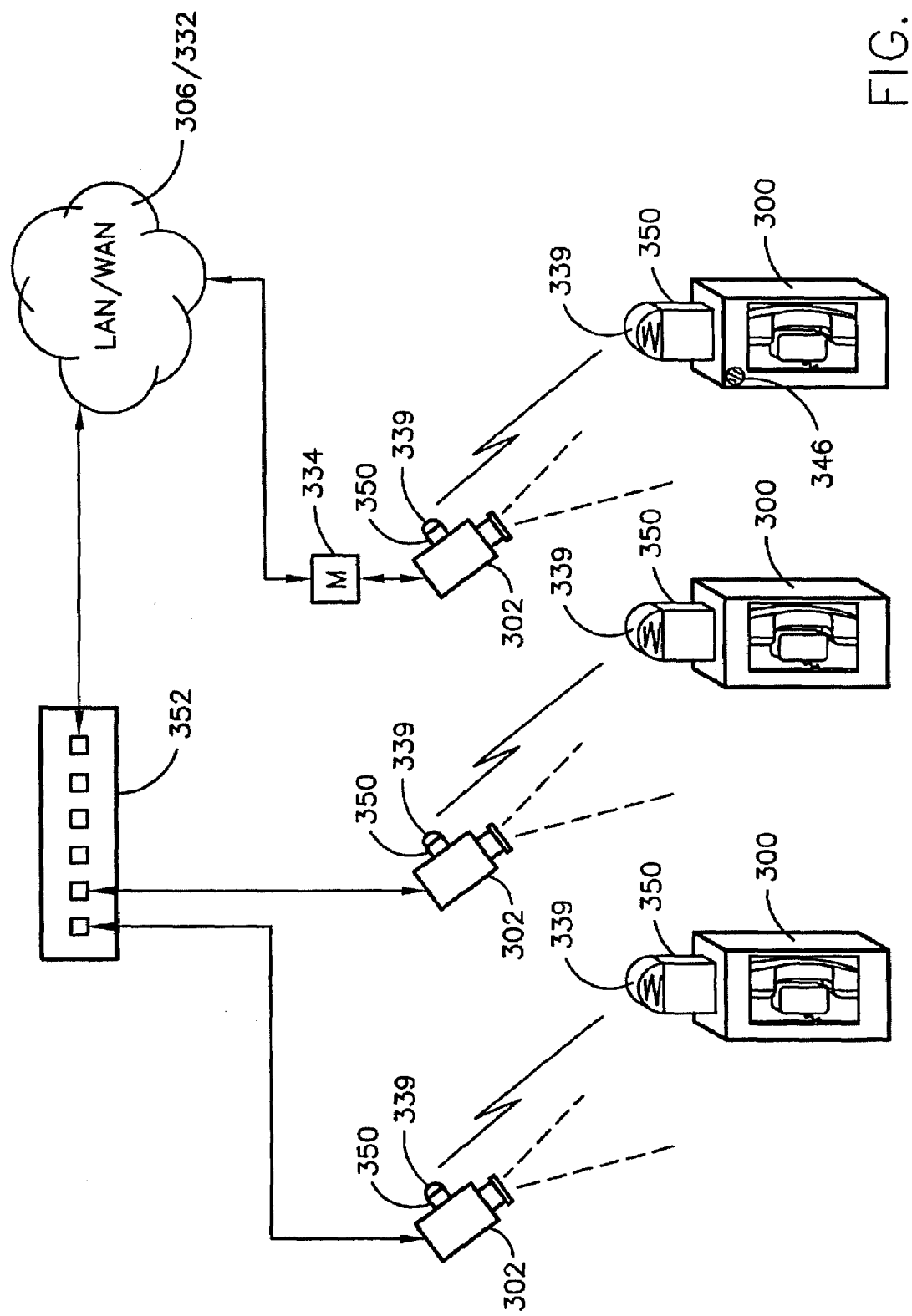
FIG. 24A is an illustration of a system similar to that of FIG. 23A, with a switched hub.
Figure 24B:
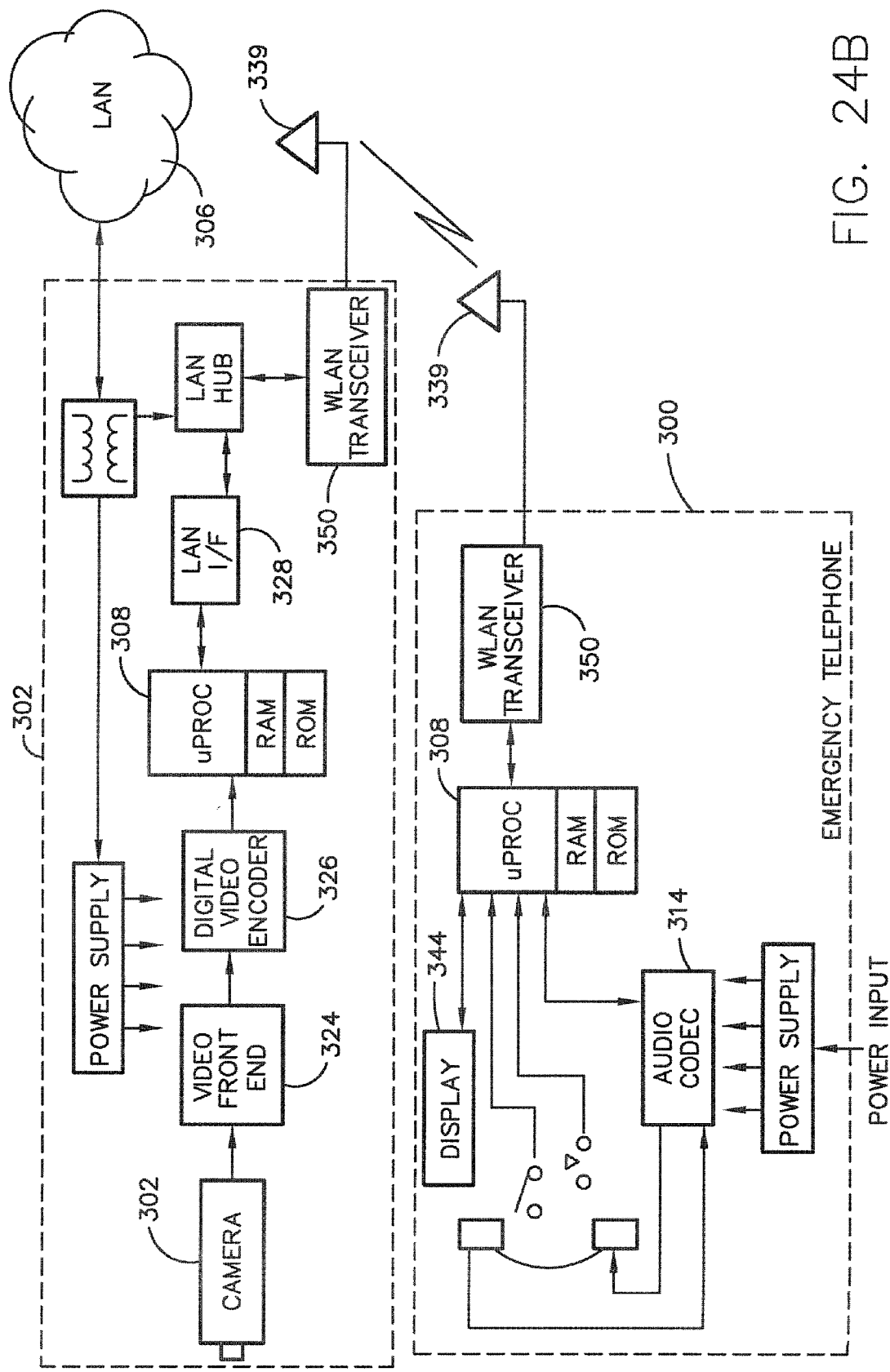
FIG. 24B is an illustration of the flow diagram for the circuitry of FIG. 24A.

The configuration of FIGS. 24A-24B includes a wireless telephone 300 connected to a companion camera 302 that is connected to the LAN/WAN via a suitable modem 334 or hub 352. In this instance the telephone data signals are sent to and from the camera via a wireless connection comprising the mated transceivers 350 and antennas 339. The system may optionally include internal cameras 346. The version without an internal camera and with direct interconnect to the LAN is shown in FIG. 24B.

Figure 25A:
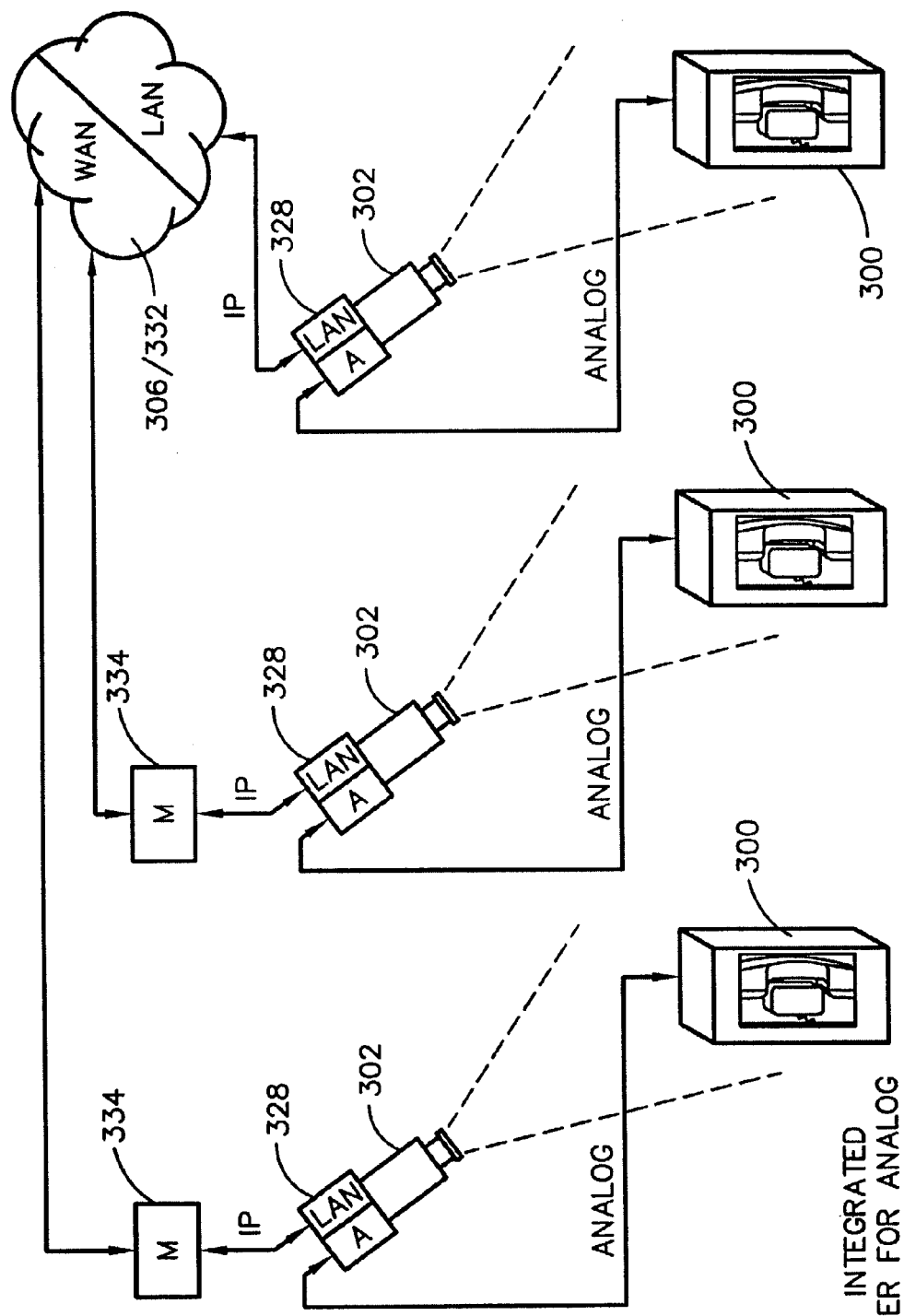
FIG. 25A is an illustration of an analog telephone or a POTS telephone with an integrated LAN and VOIP encoder and companion video.
Figure 25B:
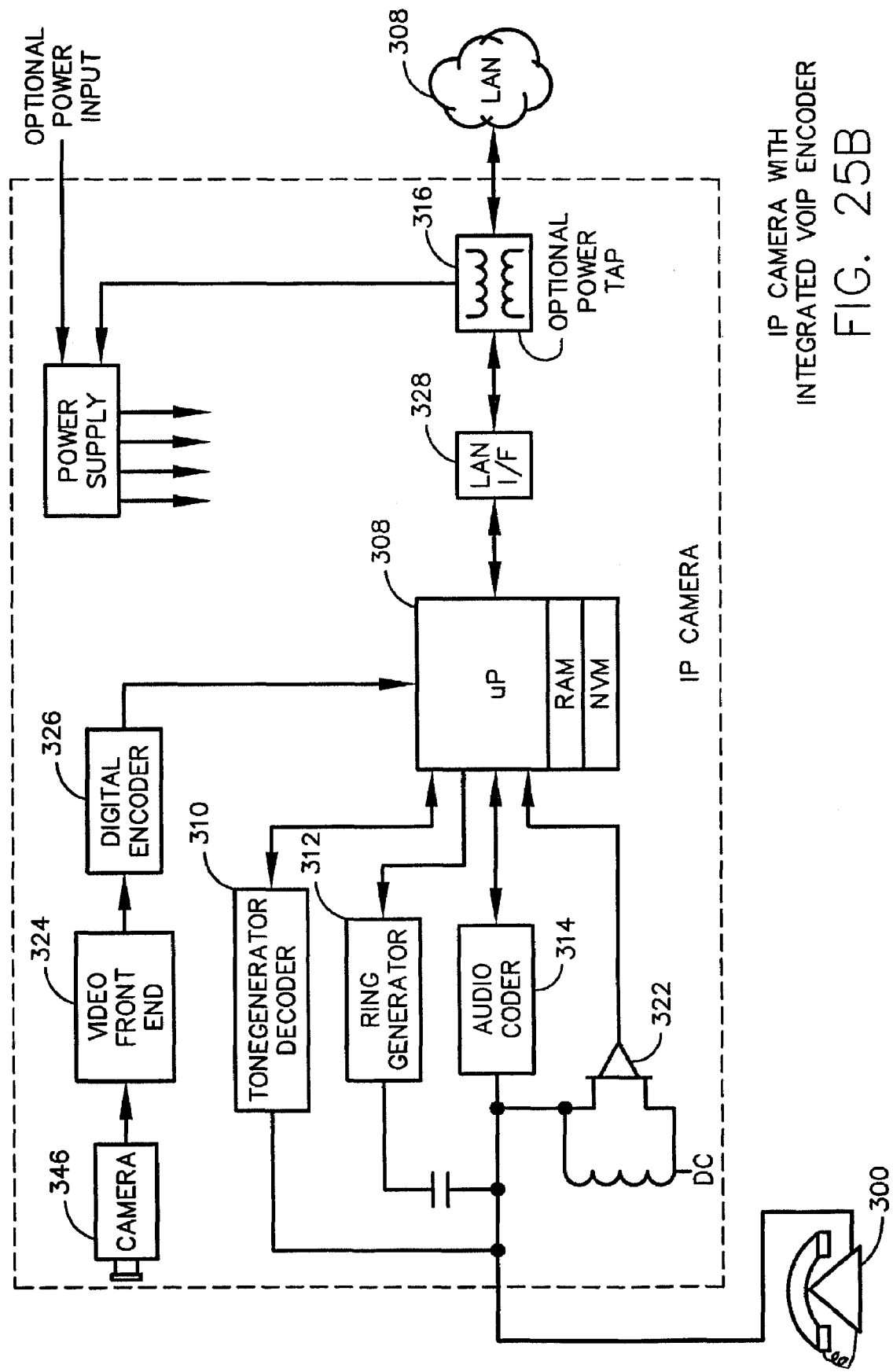
FIG. 25B is an illustration of the flow diagram for the circuitry of FIG. 25A.

A companion IP camera is shown in combination with an analog telephone and VOIP encoder in FIGS. 25A-25B. In this configuration an analog or POTS telephone 300 may be connected to a companion camera 302. Each camera includes an interface component 328 with conversion means for the telephone signal, permitting connection to the WAN/LAN 306/332. As shown in FIG. 25B the conversion components for converting the telephone signal to IP protocol is contained in the IP camera, specifically the tone generator decoder 310, ring generator 312, audio codec 314 and power supply 322.

Figure 26A:
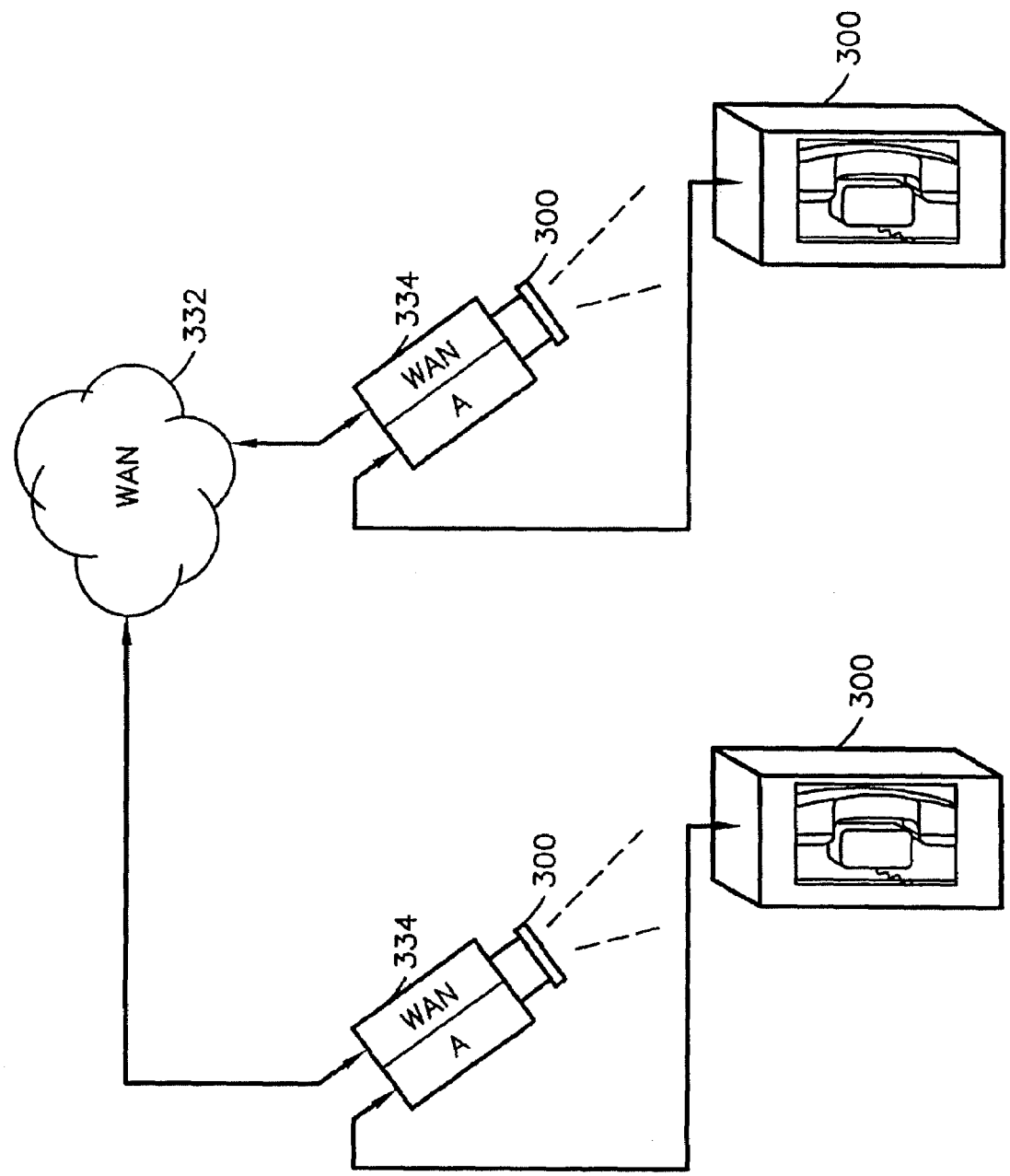
FIG. 26A is an illustration of an analog telephone with companion IP video with the analog telephone signal converted to IP in an internal converter in the companion video unit.
Figure 26B:
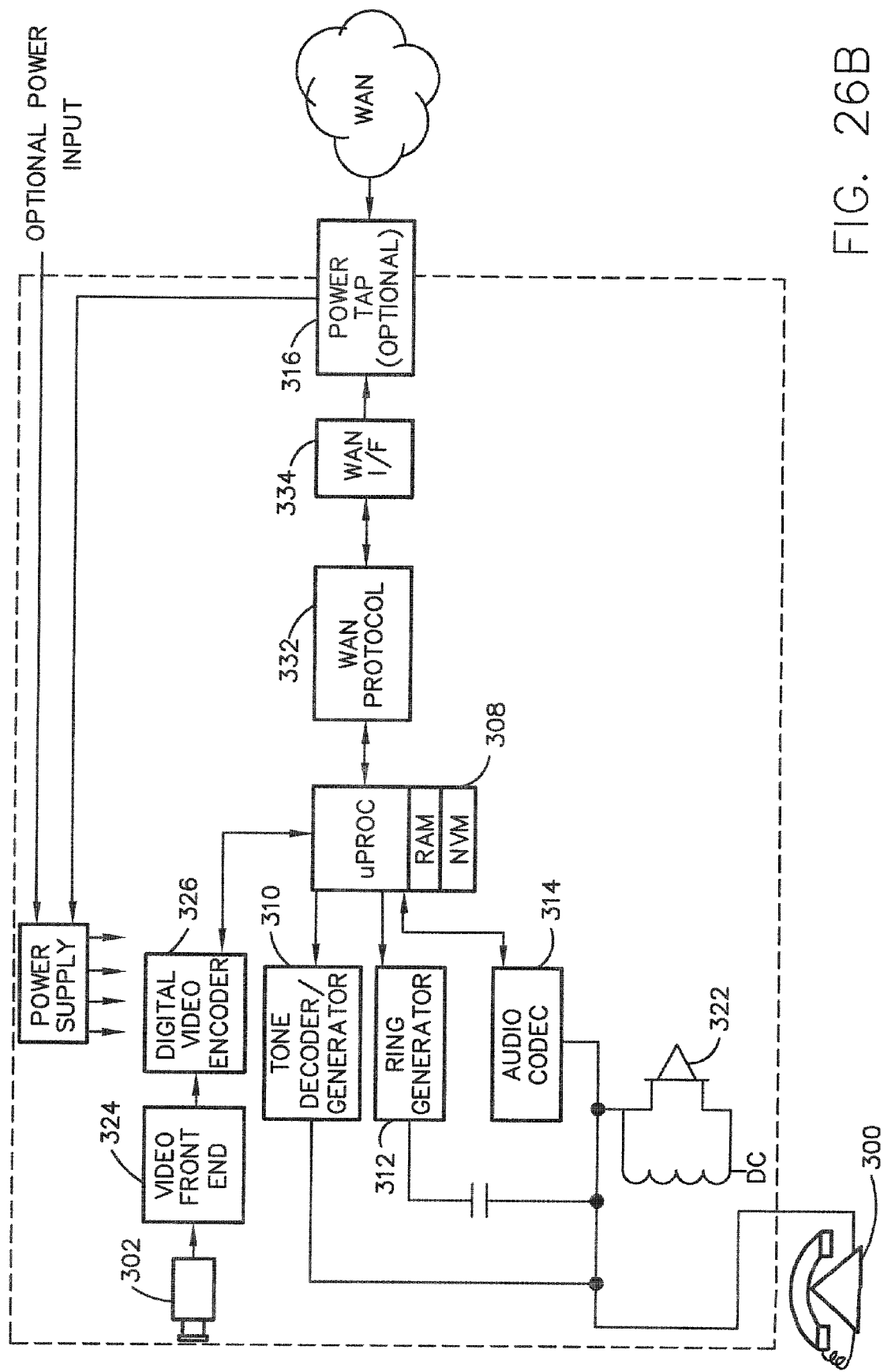
FIG. 26B is an illustration of the flow diagram for the circuitry of FIG. 26A.

A companion IP camera is shown in combination with a VOIP telephone in FIGS. 26A-26B, and is similar to the system of FIGS. 25A and 25B. The camera LAN interface is replaced with a WAN interface 334. The circuit configuration is shown in FIG. 26B.

Figure 27A:
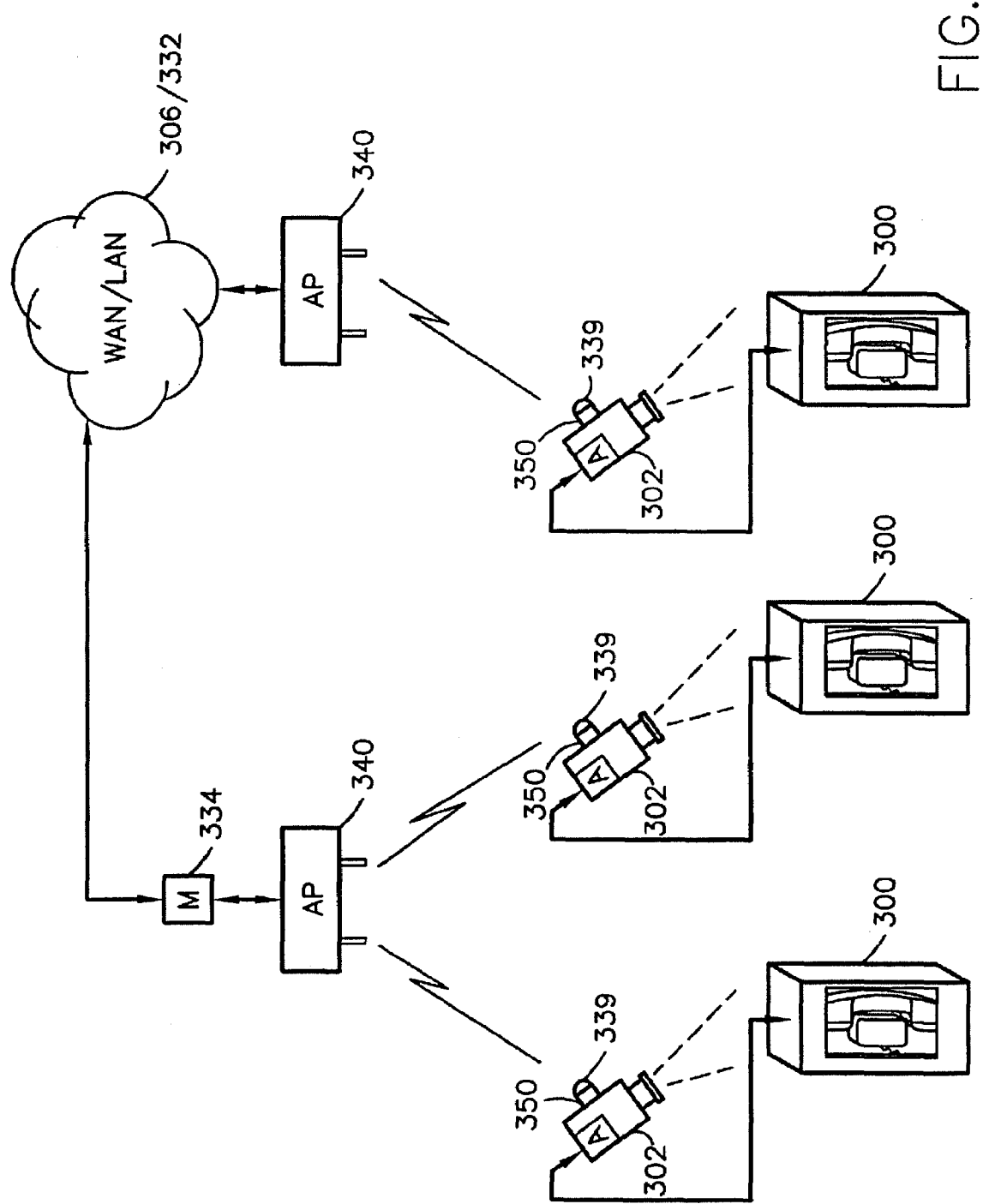
FIG. 27A is a wireless version of the system of FIG. 26A.
Figure 27B:
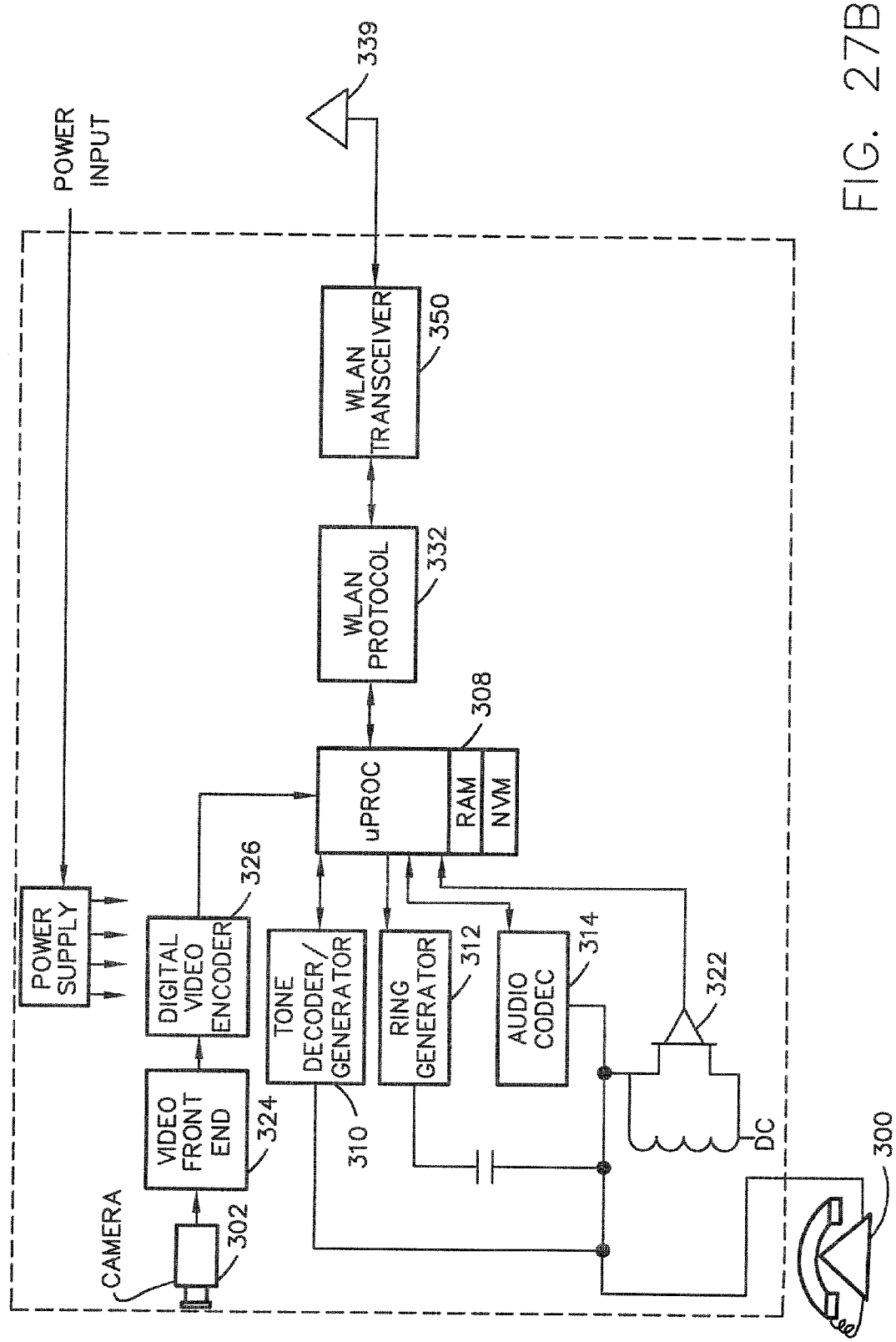
FIG. 27B is an illustration of the flow diagram for the circuitry of FIG. 27A.

FIGS. 27A-27B show a wireless configuration similar to the wired version of FIGS. 26A-26B. The transceiver 350 and the antenna 339 are added to each camera 302 for communication with an access point 304 for connection to the LAN/WAN 306/332. The circuit configuration is shown in FIG. 27B.

Figure 28A:
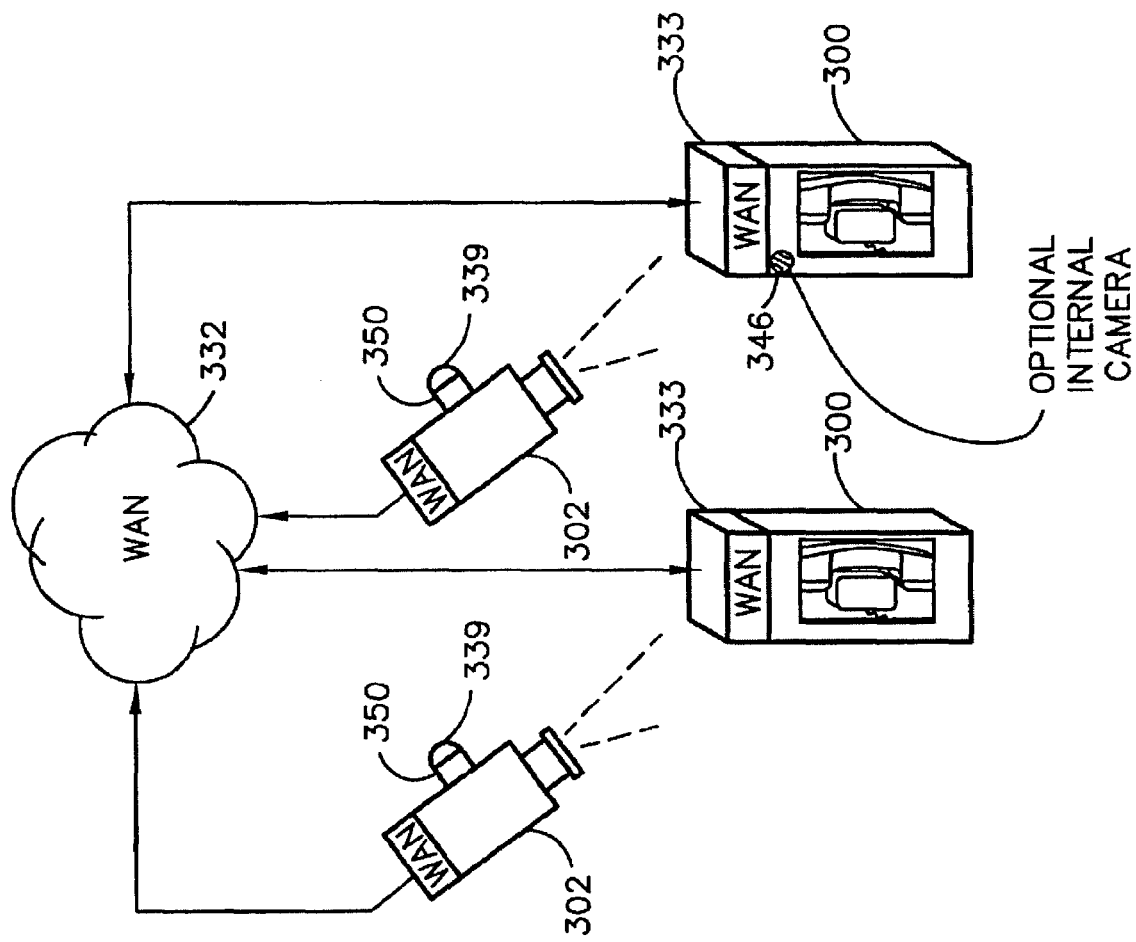
FIG. 28A is an illustration of an optional VOIP telephone system having companion and internal video configured for a WAN.
Figure 28B:
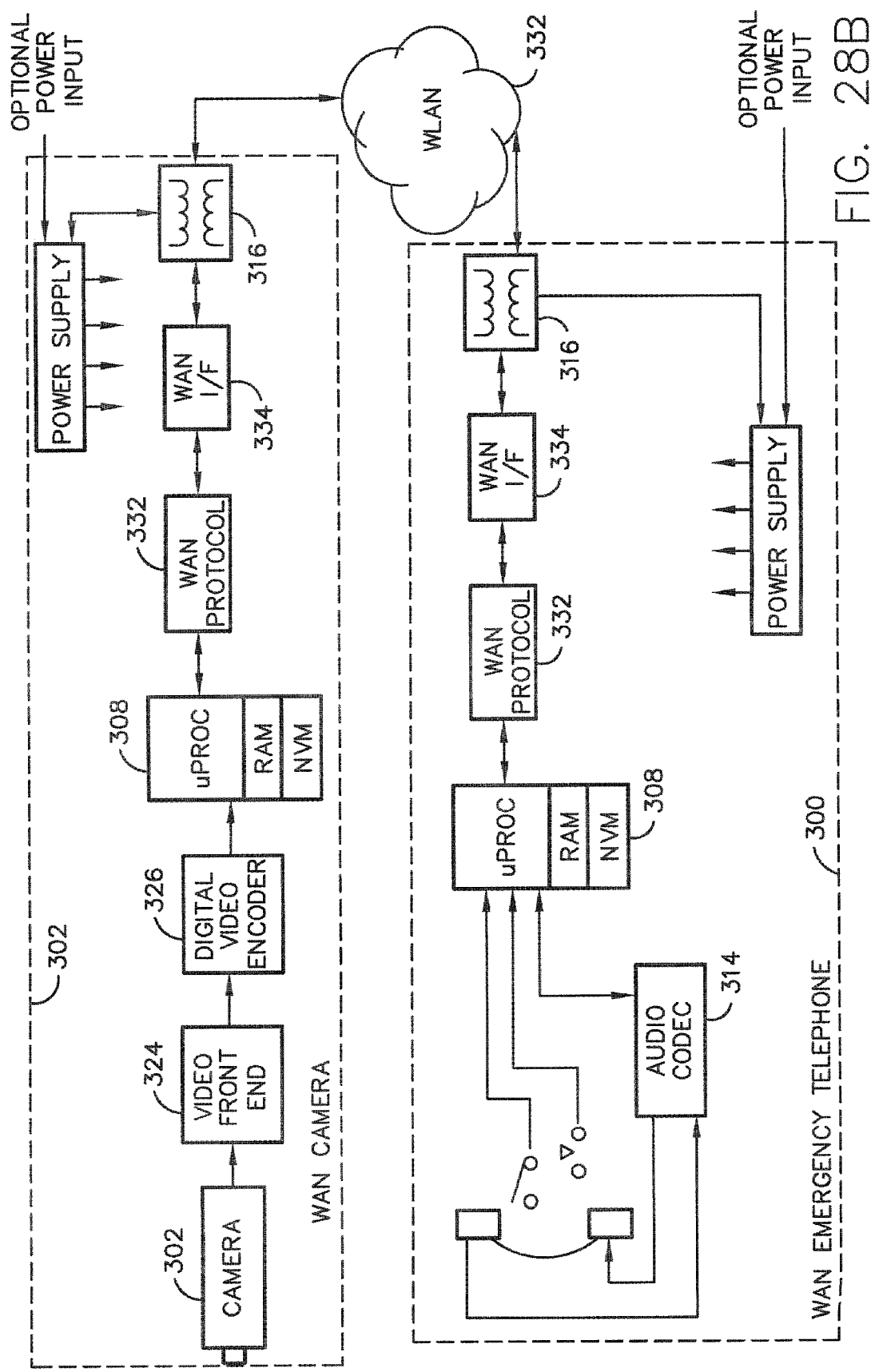
FIG. 28B is an illustration of the flow diagram for the circuitry of FIG. 28A, with companion video.
Figure 28C:
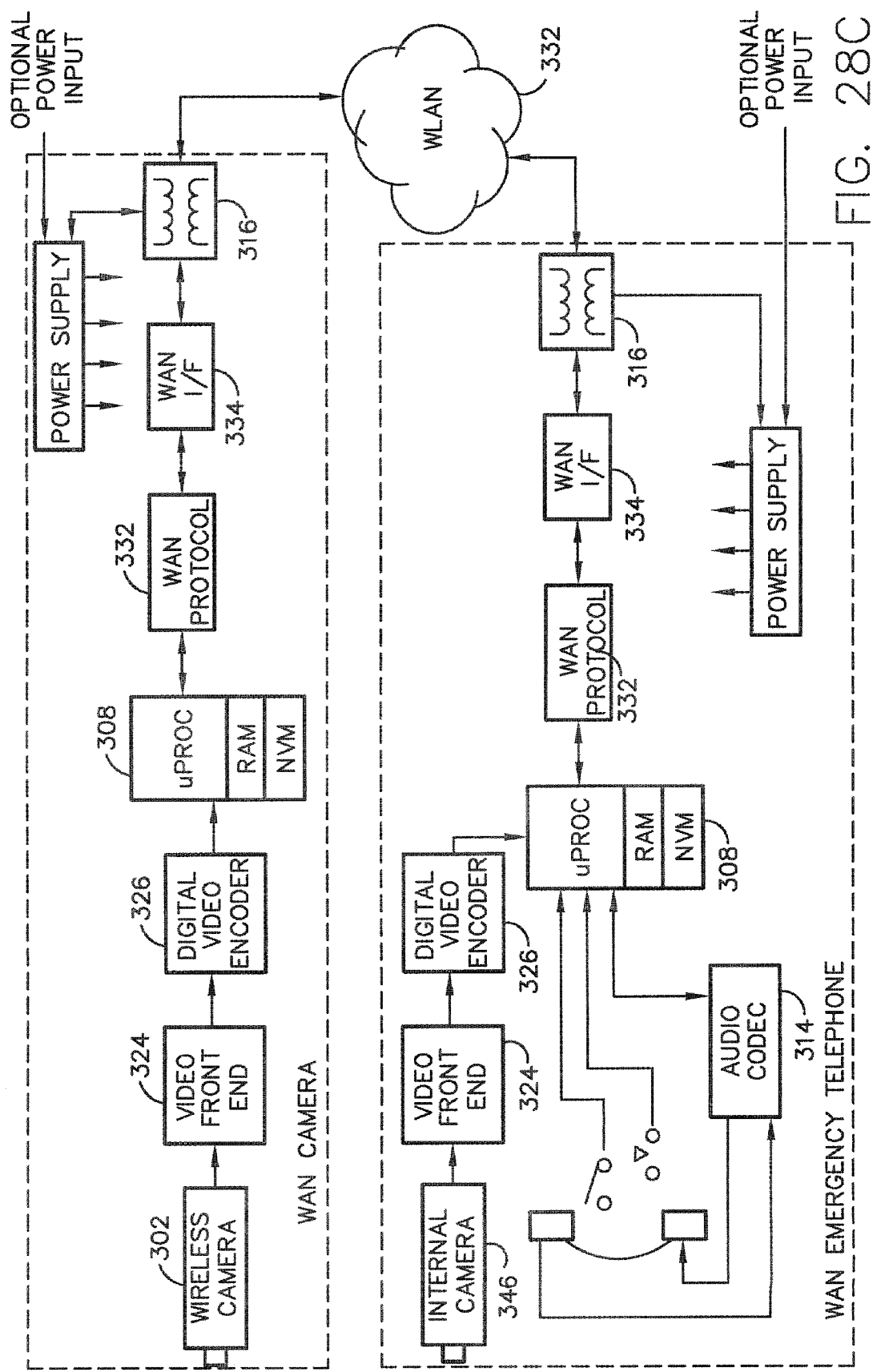
FIG. 28C is an illustration of the flow diagram for the circuitry of FIG. 28A, with internal video.
Figure 29A:
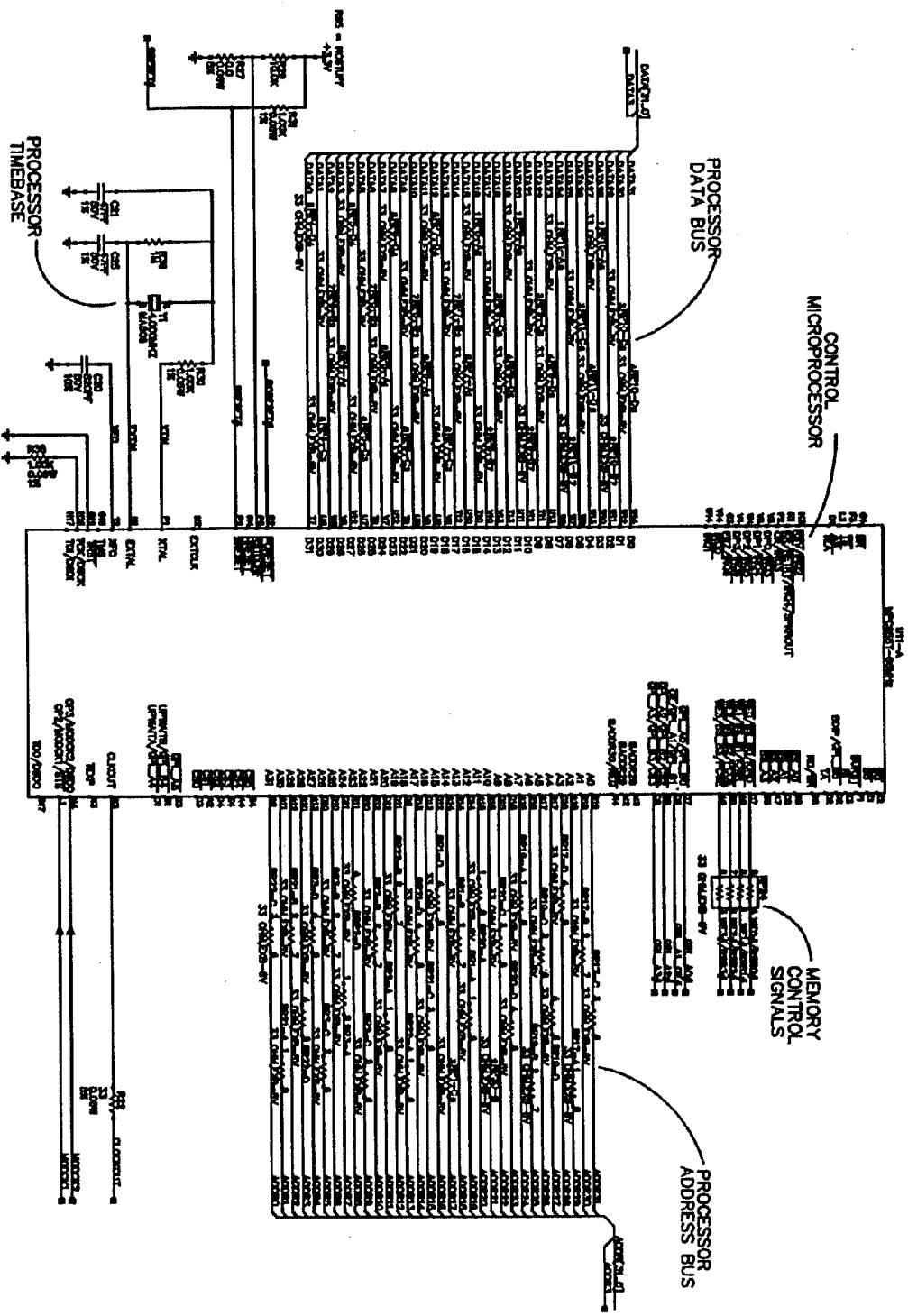
FIGS. 29A-D are schematics of the processor, RAM and NVM for the circuits of the various embodiments.
Figure 29B:
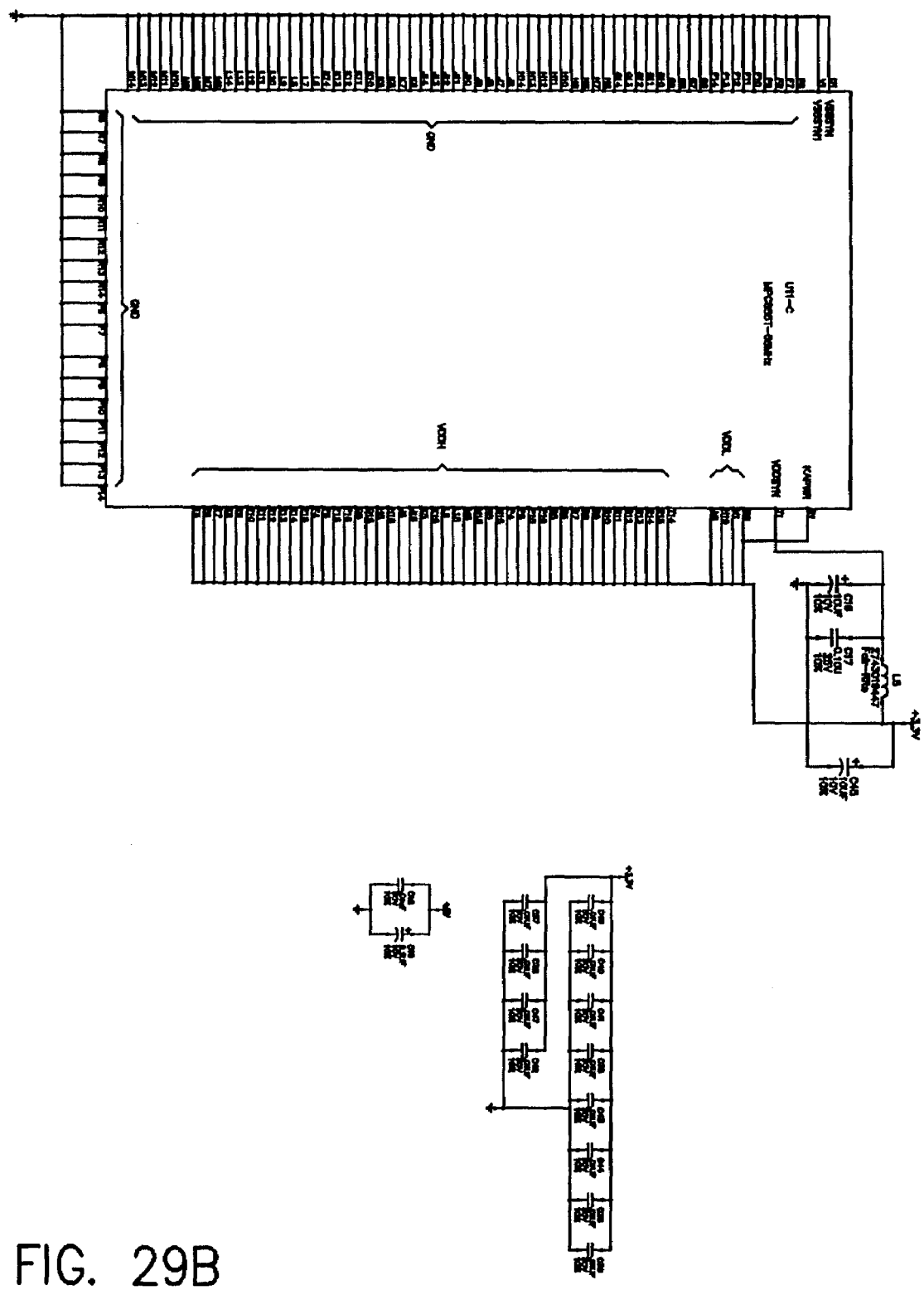
Figure 29C:
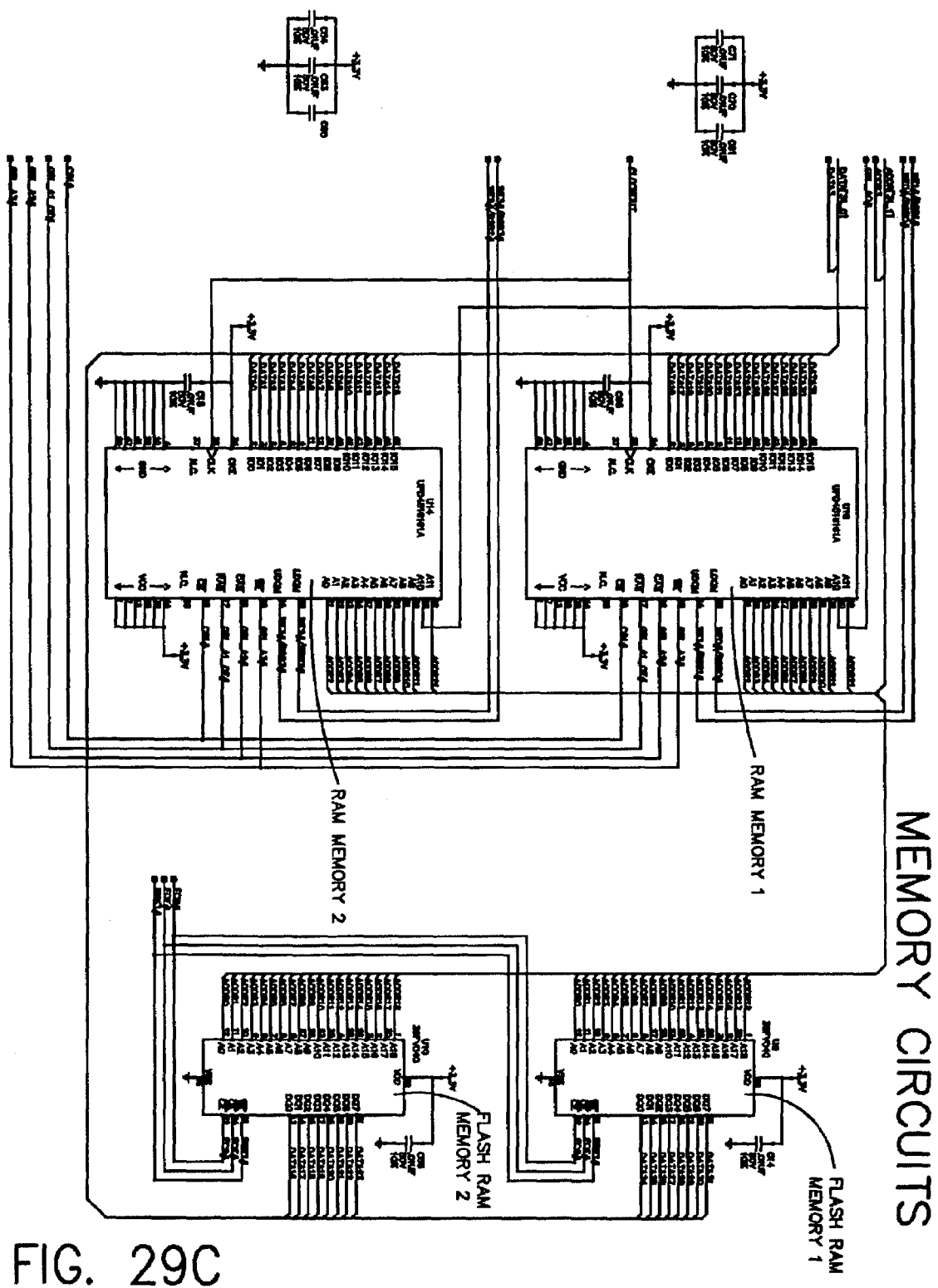
Figure 29D:
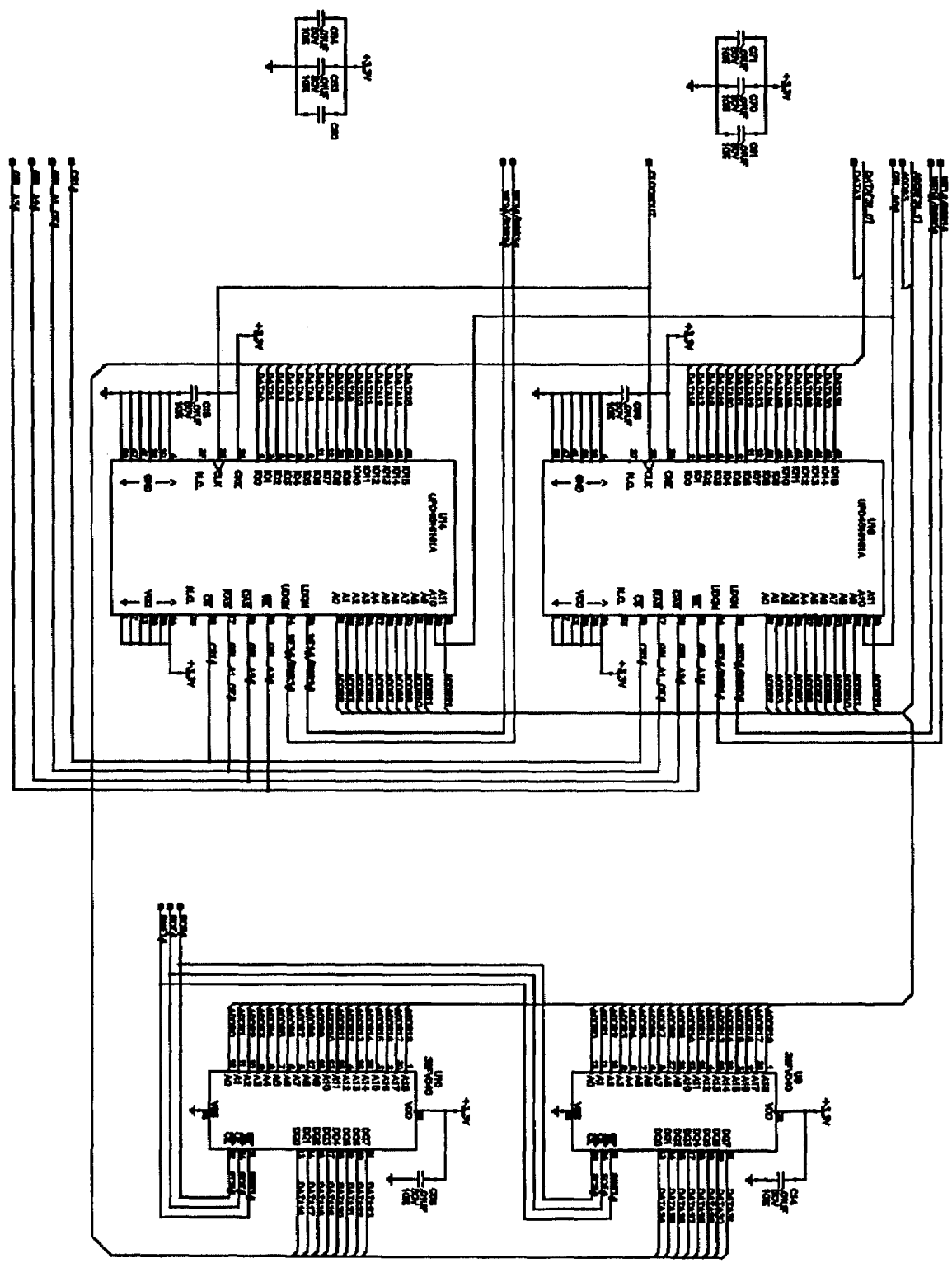

FIGS. 28A-28C show a configuration where both the camera and the telephone are equipped with integral WAN modems. A system with companion cameras is shown in FIG. 28B. A system including optional internal cameras is shown in FIG. 28C.

Figure 30:
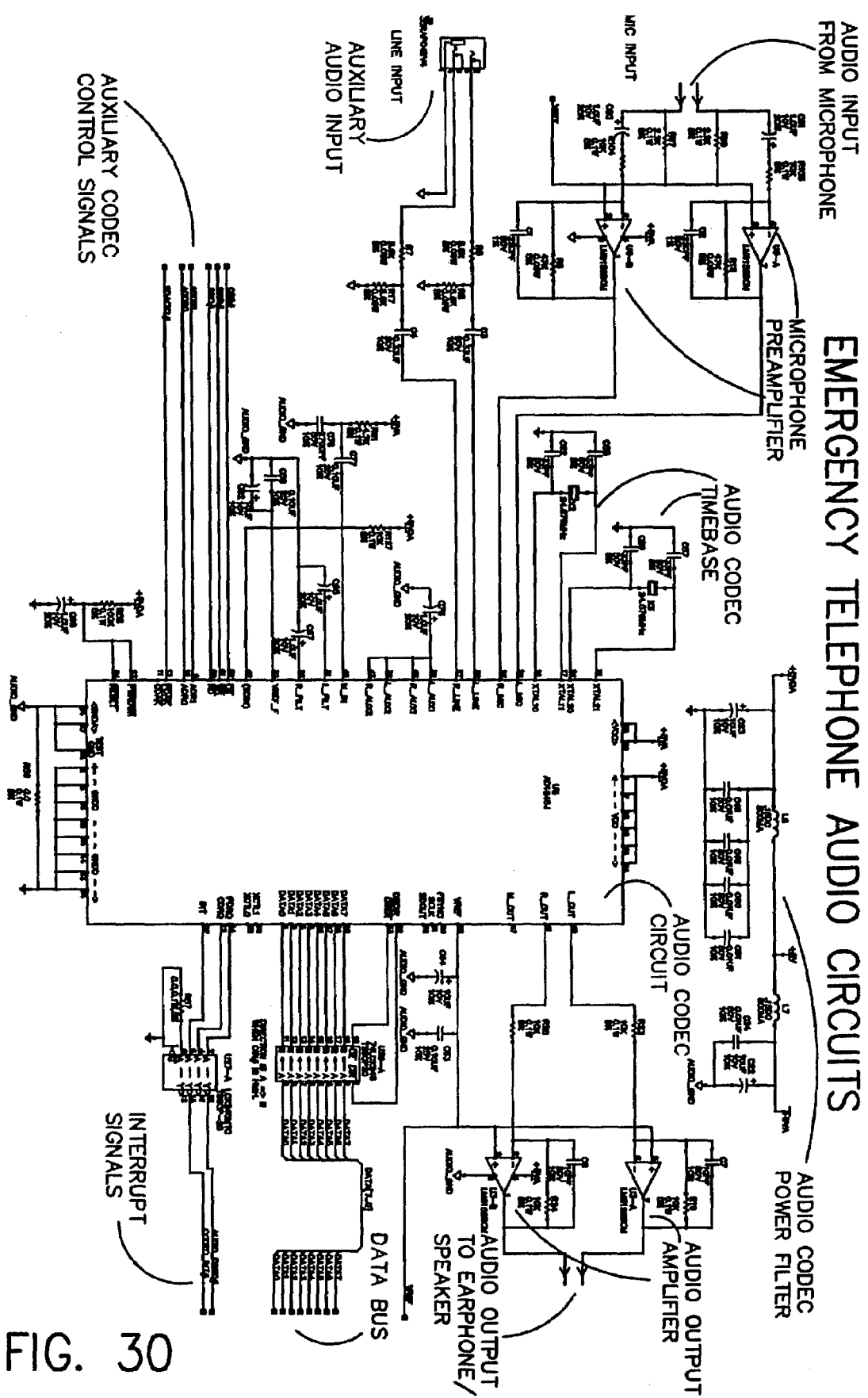
FIG. 30 is a schematic of the audio interface for the circuits of the various embodiments, specifically the emergency telephone audio circuits.
Figure 31A:
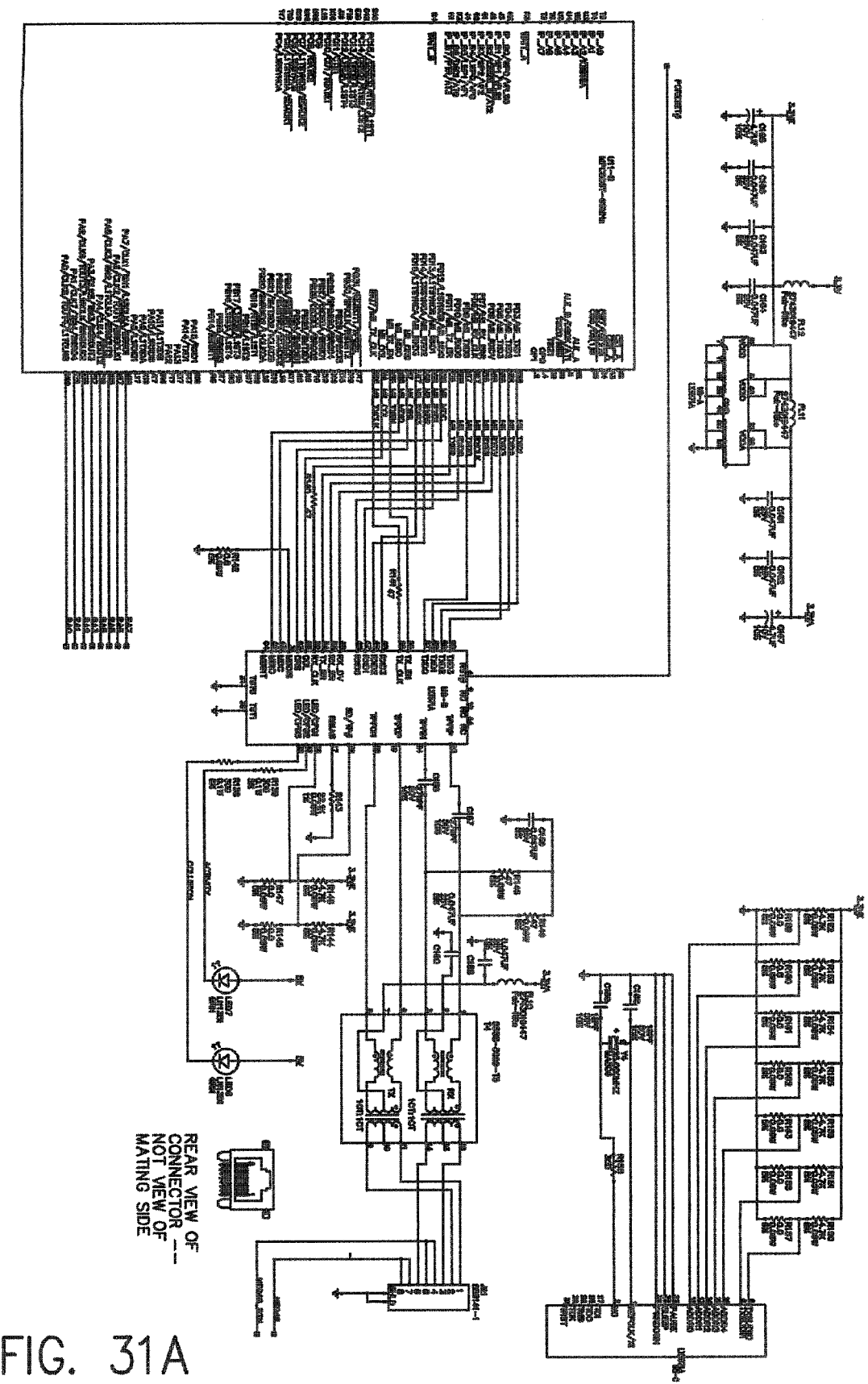
FIGS. 31A-C are schematics of the LAN interface for the circuits of the various embodiments.
Figure 31B:
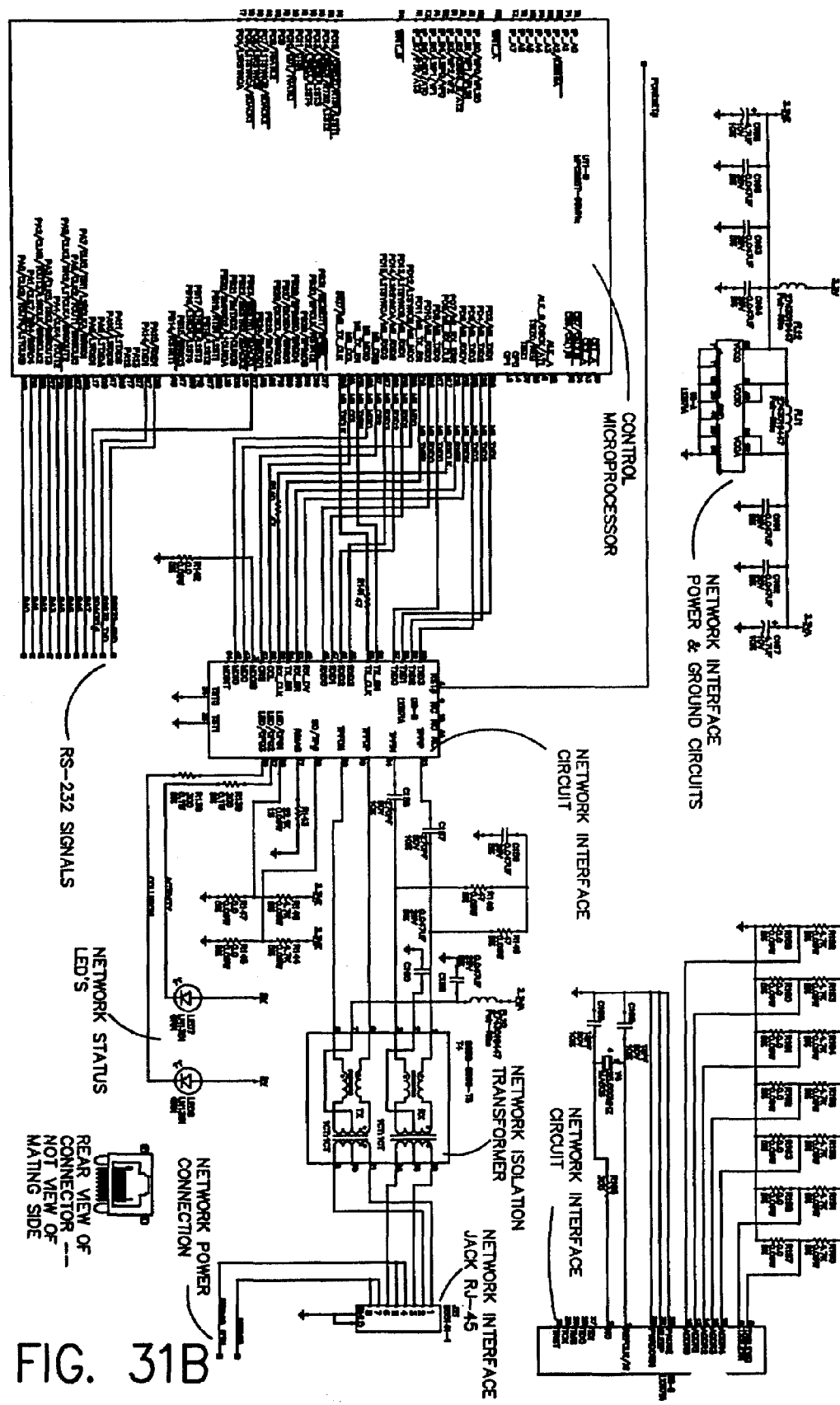
Figure 31C:
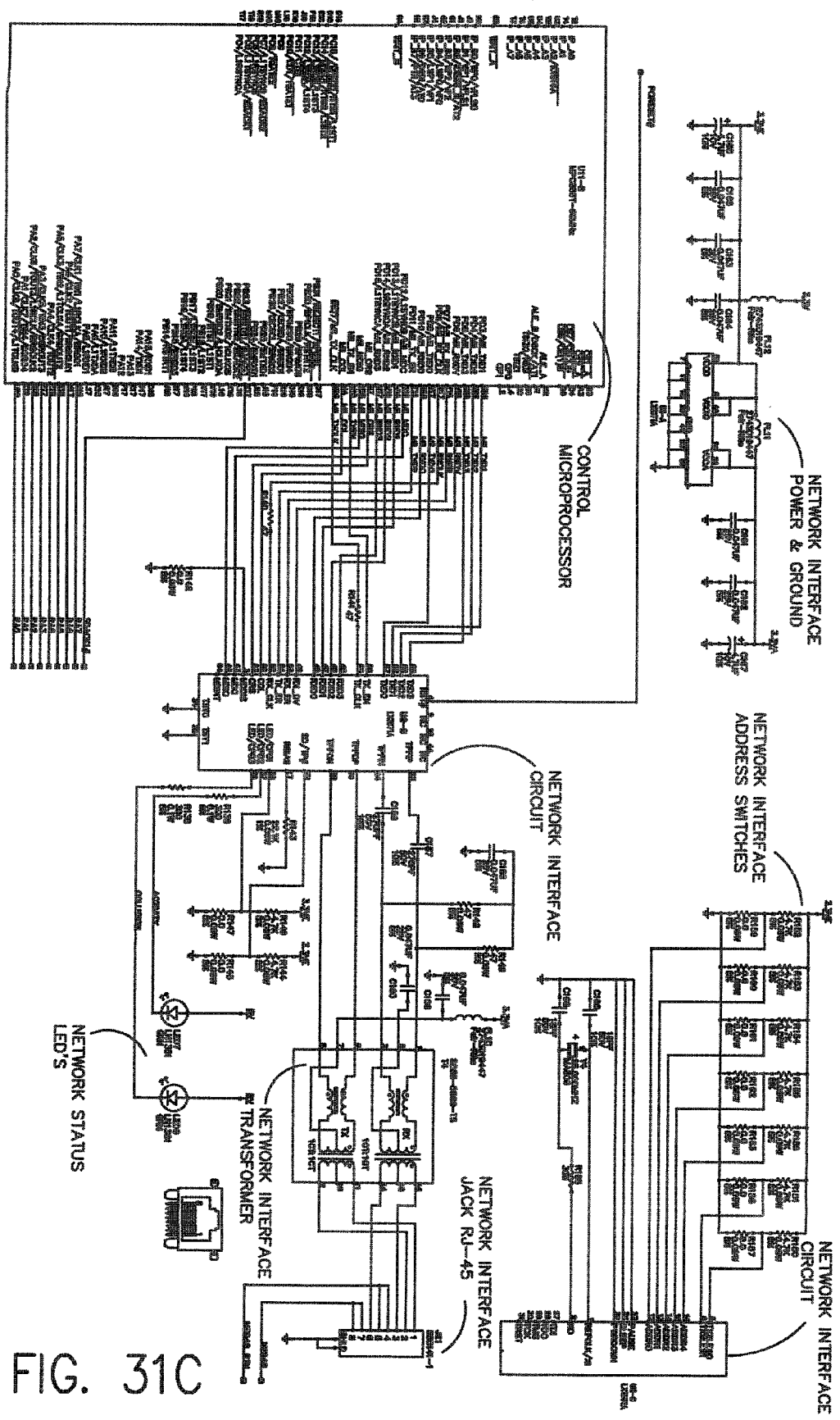
Figure 32A:
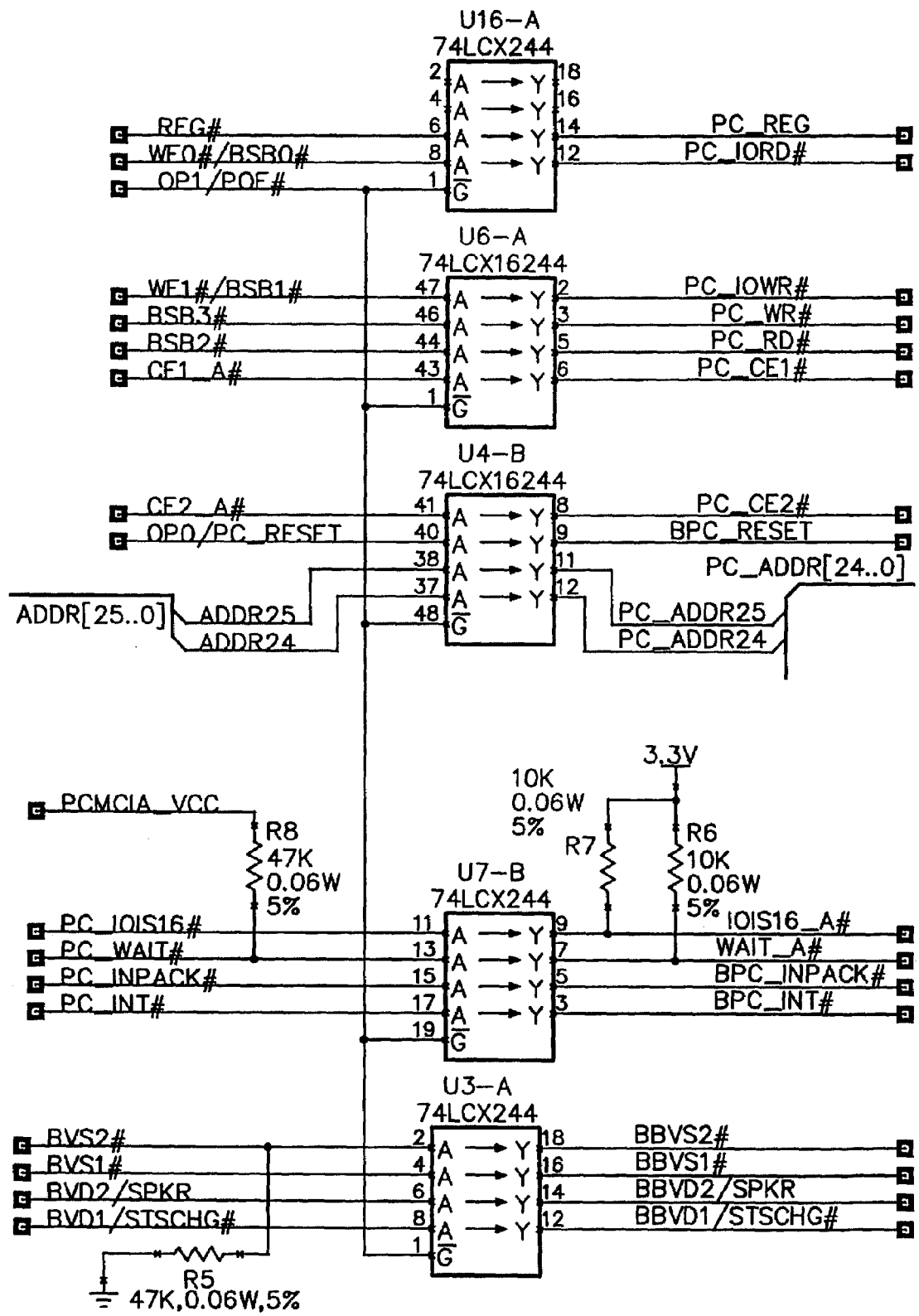
FIGS. 32A-D are schematics of the WLAN interface for the circuits of the various embodiments.
Figure 32B:
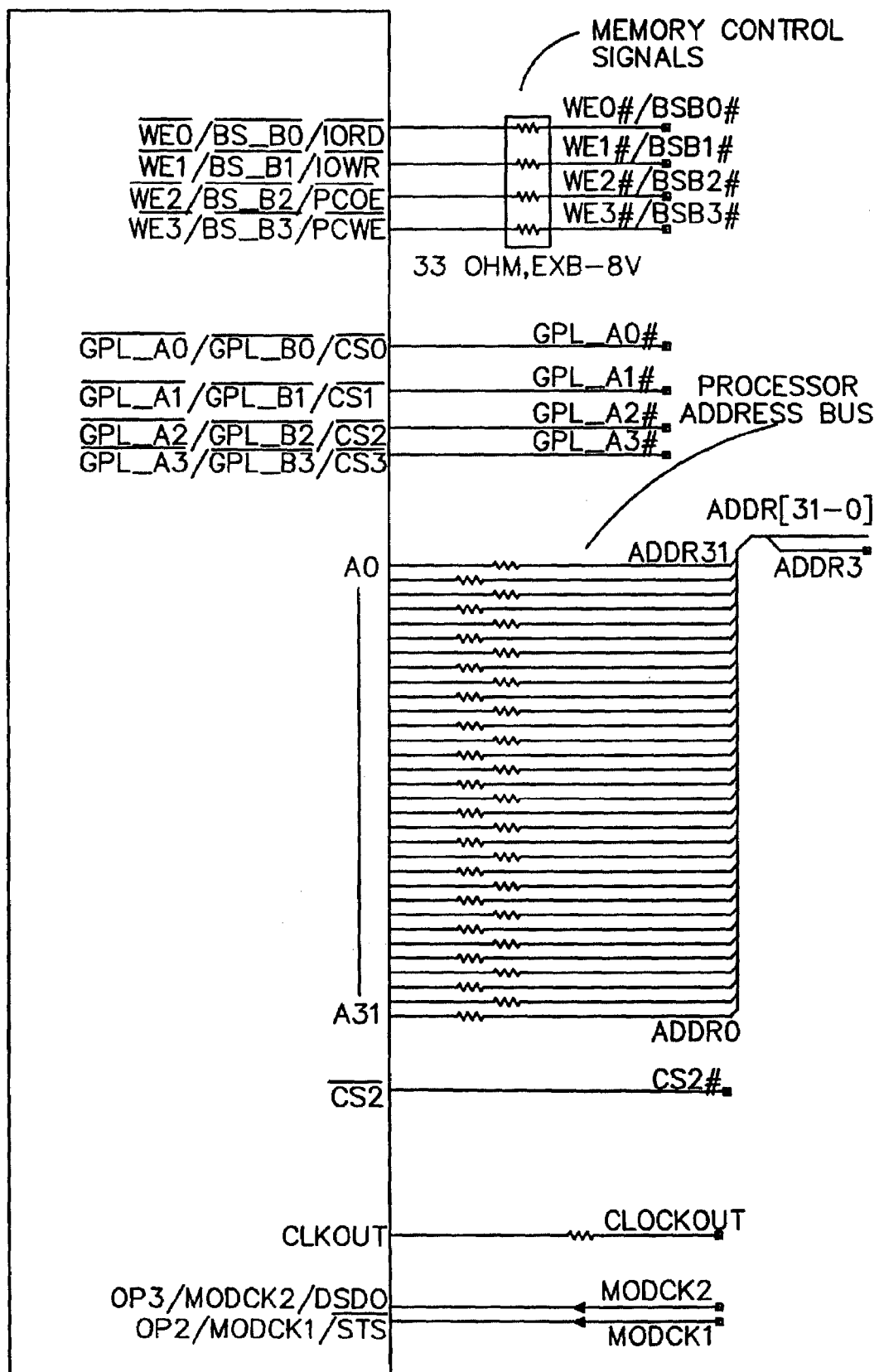
Figure 32C:
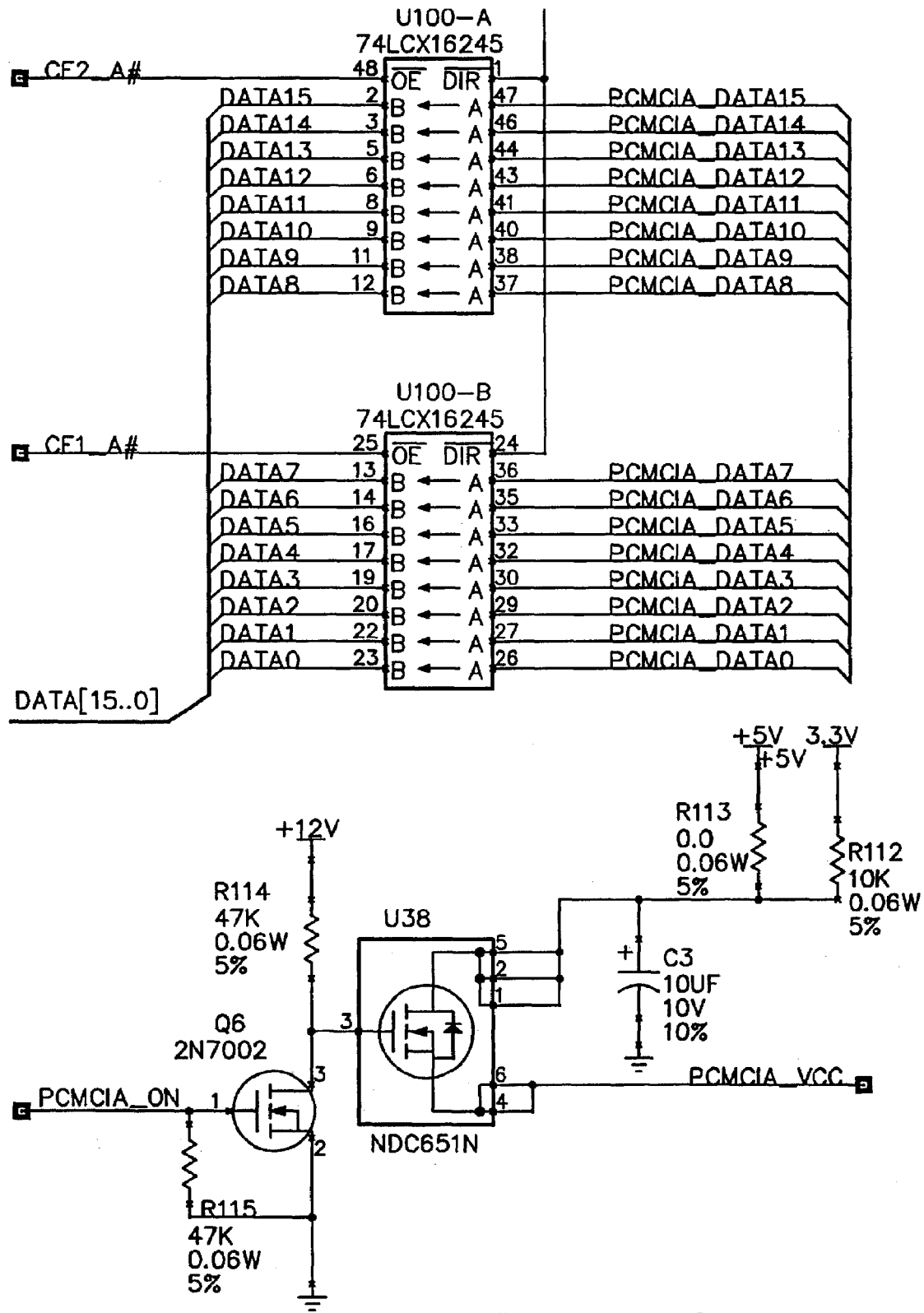
Figure 32D:
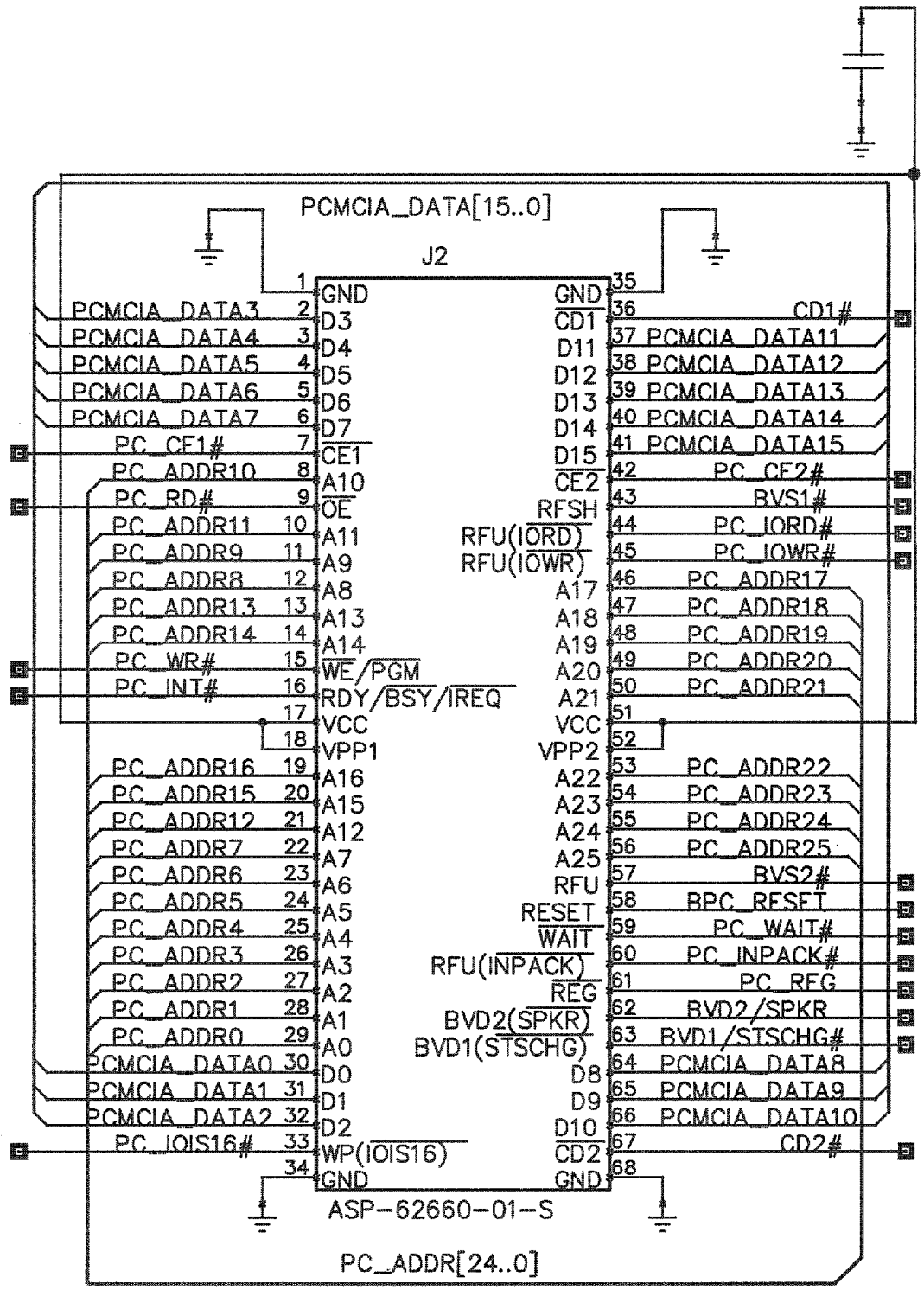
Figure 34:
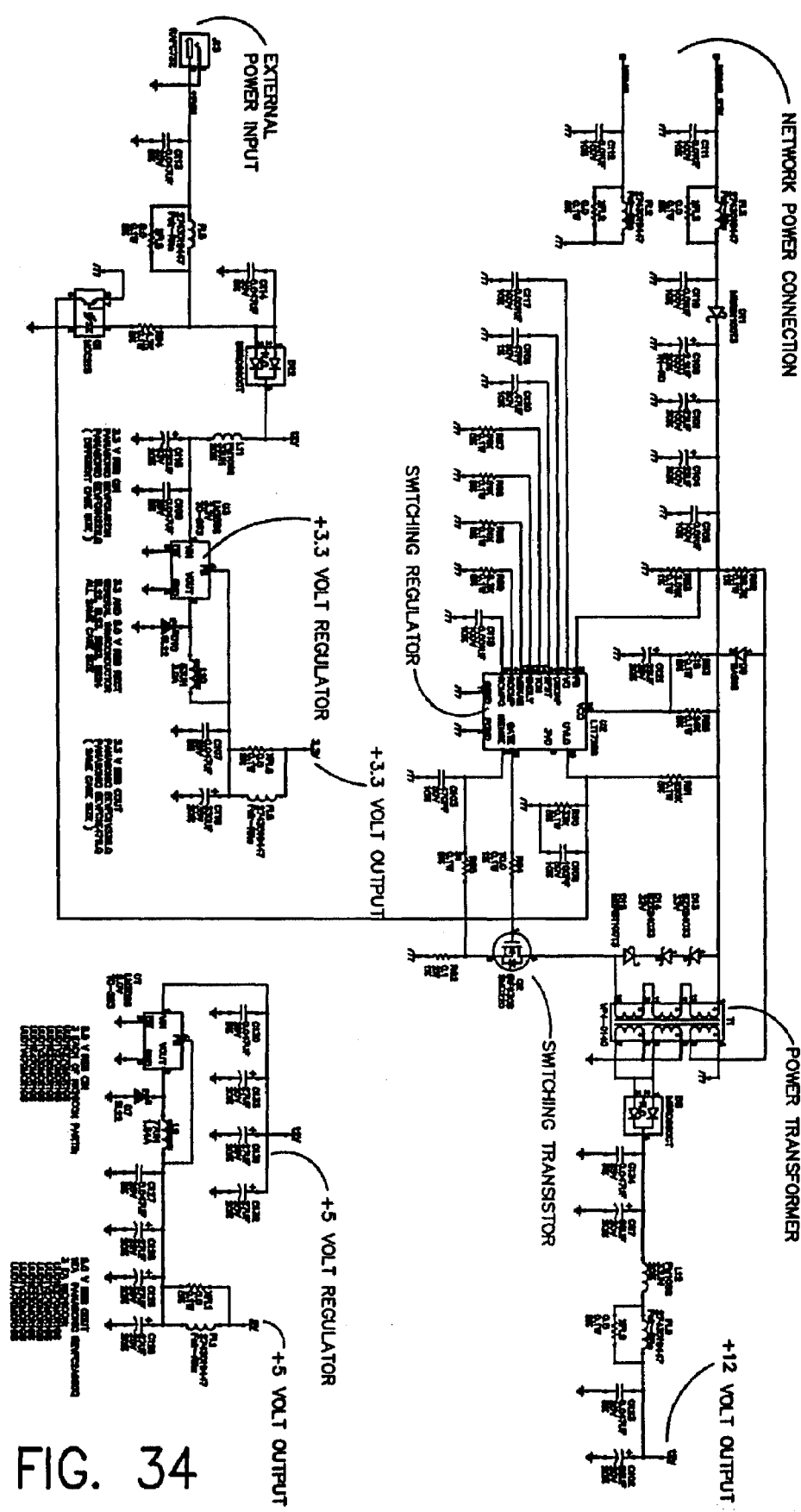
FIG. 34 is a schematic of the power supply for the circuits of the various embodiments.

FIGS. 29-34 are schematic diagrams for the various circuits for the each of the configurations. The pin numbers are those of the manufacturer. The processor 30, including RAM and NVM, is shown in FIGS. 29A-D. The audio interface is shown in FIG. 30. The LAN interface is shown in FIGS. 31A-C. The WLAN interface is shown in FIGS. 32A-E. The video interfaces are shown in FIGS. 33A-F. The power supply is shown in FIG. 34.

Figure 35:
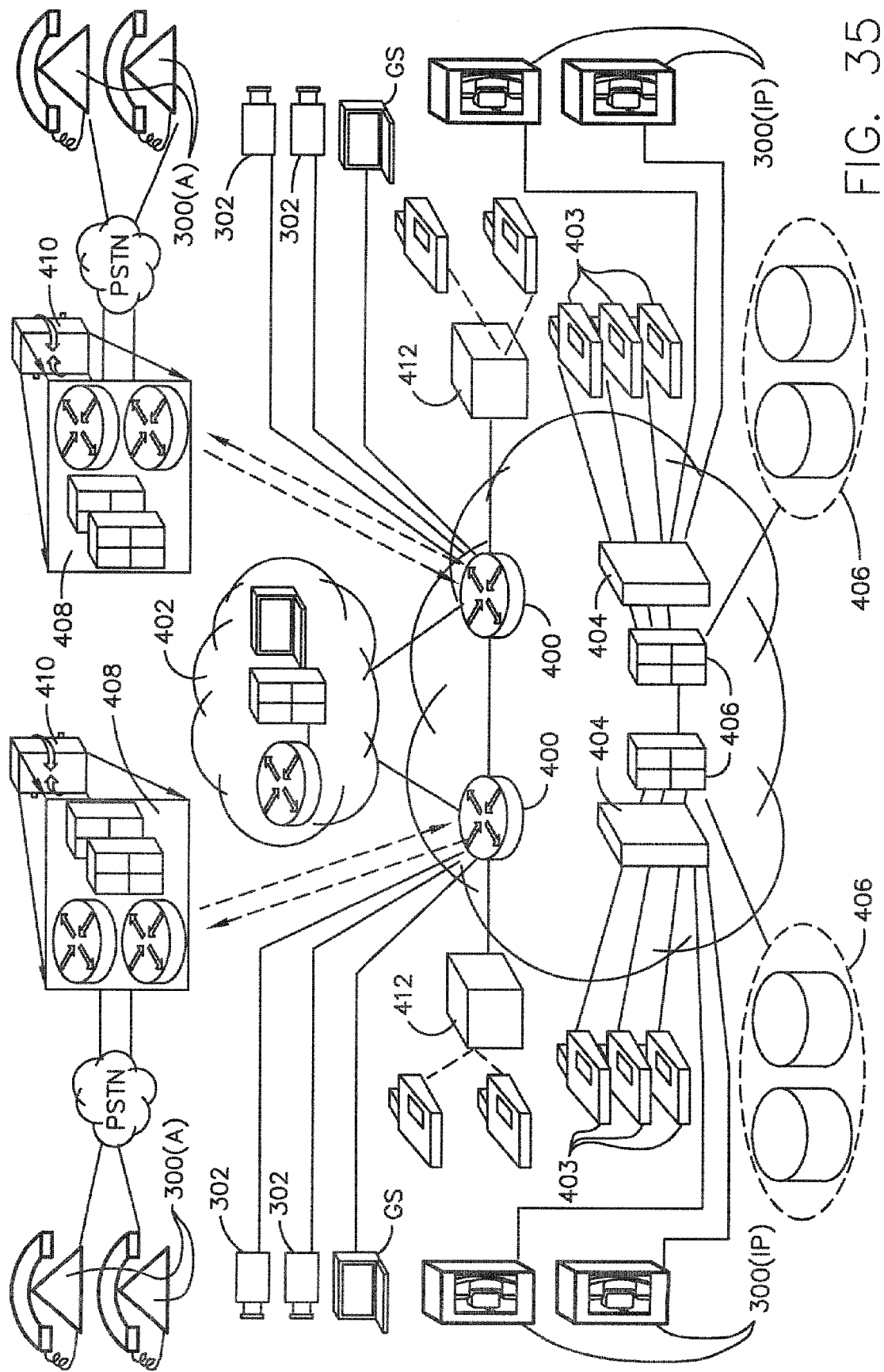
FIG. 35 is an illustration of a system interconnect for voice gateways implemented with an SIP VOIP network.

A typical interconnect for voice gateways solution implemented with a Session Initiated Protocol (SIP) VOIP network is shown in FIG. 35. There are two widespread standards for exchange of streaming multimedia information including voice and video. The oldest standard is the International Telecommunications Union (ITU) multimedia standard H.323. This standard is utilized for both packet telephone applications and for video streaming such as video teleconferencing. The H.323 incorporates sub-standards such as Q.931 for call initiation and signaling, H.245 for call negotiation and Registration Admission and Status (RAS) for session control.

A more recent standard is Session Initiation Protocol (SIP) that is the Internet Engineering Task Force's standard for multimedia conferencing over IP. SIP is an ASCII character transmission application layer protocol that is utilized to originate, maintain and terminate calls between two or more end points. The control protocol is defined in the RFC 2543 documents.

There are many analogies between the two multimedia standards:
- Clients must be intelligent for both standards (protocol capable)
- Network Intelligence is provided by servers in SIP, by gatekeepers in H.323
- SIP is based on the Internet/WWW, H.323 is based on Telephony Q.SIG
- SIP Signaling is UDP or TCP, H.323 is also UDP (ver.3) or TCP
- Medial Protocol is RTP in both standards
- Control Data is ASCII in SIP, Binary in H.323
- SIP embodies IETF/IP sub-protocols, H.323 embodies ITU/ISDN sub protocols
- SIP is targeted for wide interoperability; H.323 is limited to telephony carriers.

Because the Engineering Task Force's Session Initiation Protocol (SIP) is rapidly becoming the industry platform for widespread application of VOIP telephony, adaptation of security applications and appliances to utilize SIP provides an existing and expanding platform on which to implement sophisticated security applications. It also a allows widespread interoperability between the security system with other IP devices supported by SIP, such as VOIP devices. A more in-depth discussion of Session Initiation Protocol (SIP) follows. Session Initiation Protocol (SIP) is the Internet Engineering Task Force's (IETF's) standard for multimedia conferencing over IP. SIP is an ASCII-based, application-layer control protocol (defined in RFC 2543) that can be used to establish, maintain, and terminate calls between two or more end points.

Like other VOIP protocols, SIP is designed to address the functions of signaling and session management within a packet telephony network. Signaling allows call information to be carried across network boundaries. Session management provides the ability to control the attributes of an end-to-end call.

SIP provides the capabilities to:
- Determine the location of the target end point-SIP supports address resolution, name mapping, and call redirection.
- Determine the media capabilities of the target end point— Via Session Description Protocol (SDP); SIP determines the "lowest level" of common services between the end points. Conferences are establishing using only the media capabilities that can be supported by all ends.
- Determine the availability of the target end point-If a call cannot be completed because the target end point is unavailable; SIP determines whether the called party is already on the phone or did not answer the allotted number of rings. It then returns a message indicating why the target end point was unavailable.
- Establish a session between the originating and target end point-If the call can be completed, SIP establishes a session between the end points. SIP also supports mid-call changes, such as the addition of another end point to the conference or the changing of a media characteristic or codec.
- Handle the transfer and termination of calls-SIP supports the transfer of calls from one end point to another. During a call transfer, SIP simple establishes a session between the transferee and a new end point (specified by the transferring party) and terminates the session between the transferee and the transferring party. At the end of call, SIP terminates the sessions between all parties. Conferences can consist of two or more users and can be established using multicast or multiple unicast sessions.

With specific reference to FIG. 35, the heart of the system is the SIP gateway 400 with unified messaging 402. The SIP telephones 403 are connected to the SIP proxy server 404 via a firewall 403. Facility security databases 406 are associated with each facility on the system and are connected to the associated proxy server. Signal controllers 408 and links 410 are connected via the gateway 400. Various units may be connected to the system such as the POTS telephones 300(A), the IP telephones 300(IP); the guard stations GS and the companion cameras 302, via both the gateway 400 and through the PSTN network link. A PBX connection 412 may also be utilized.

Components of SIP: SIP is a peer-to-peer protocol. The peers in a session are called User Agents (UAs). A user agent can function in one of the following roles:

User agent client (UAC)-A client application that initiates the SIP request.

User agent server (UAS)-A server application that contacts the user when a SIP request is received and that returns a response on behalf of the user.

Typically, a SIP end point is capable of functioning as both a UAC and a UAS, but functions only as one or the other per transaction. Whether the endpoint functions as a UAC or a UAS depends on the UA that initiated the request.

From an architecture standpoint, the physical components of a SIP network can be grouped into two categories: clients and servers.

In addition, the SIP servers can interact with other application services, such as Lightweight Directory Access Protocol (LDAP) servers, location servers, a database application, RADIUS server, or an extensible markup language (XML) application. These application services provide back-end services such as directory, authentication, and billing services.

SIP Clients: SIP clients include:

Phones—Can act as either a UAS or UAC. Softphones (PCs that have phone capabilities installed) and Cisco SIP IP phones can initiate SIP request and respond to requests.

Gateways—Provide call control. Gateways provide many services, the most common being a translation function between SIP conferencing endpoints and other terminal types. This function includes translation between transmission formats and between communications procedures. In addition, the gateway translates between audio and video codecs and performs call setup and clearing on both the LAN side and the switched-circuit network side.

Figure 36:
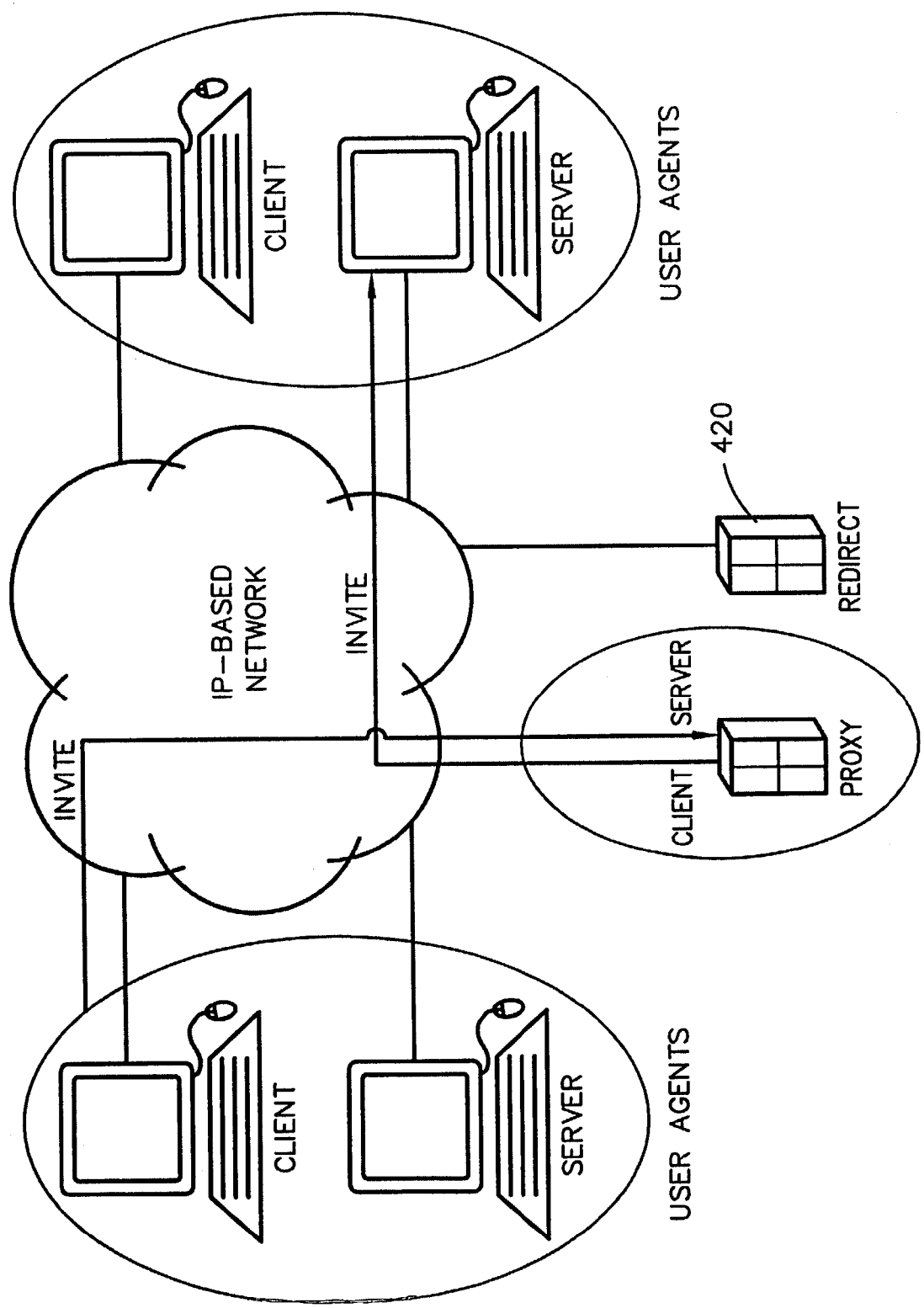
FIG. 36 is a diagram of an SIP request path through a proxy server, supporting the system of FIG. 35.
Figure 37:
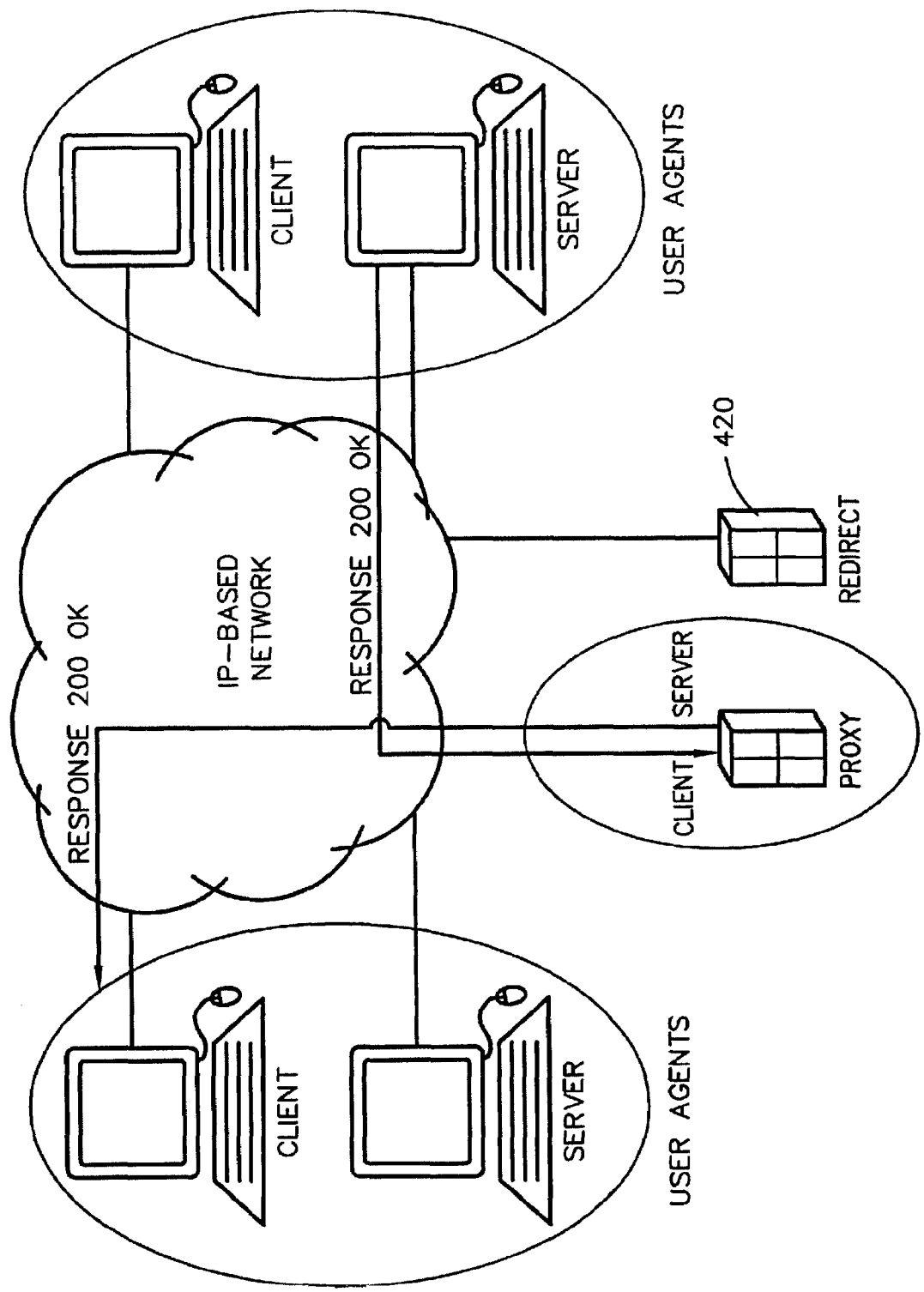
FIG. 37 shows the SIP response path through a proxy server.
Figure 38:
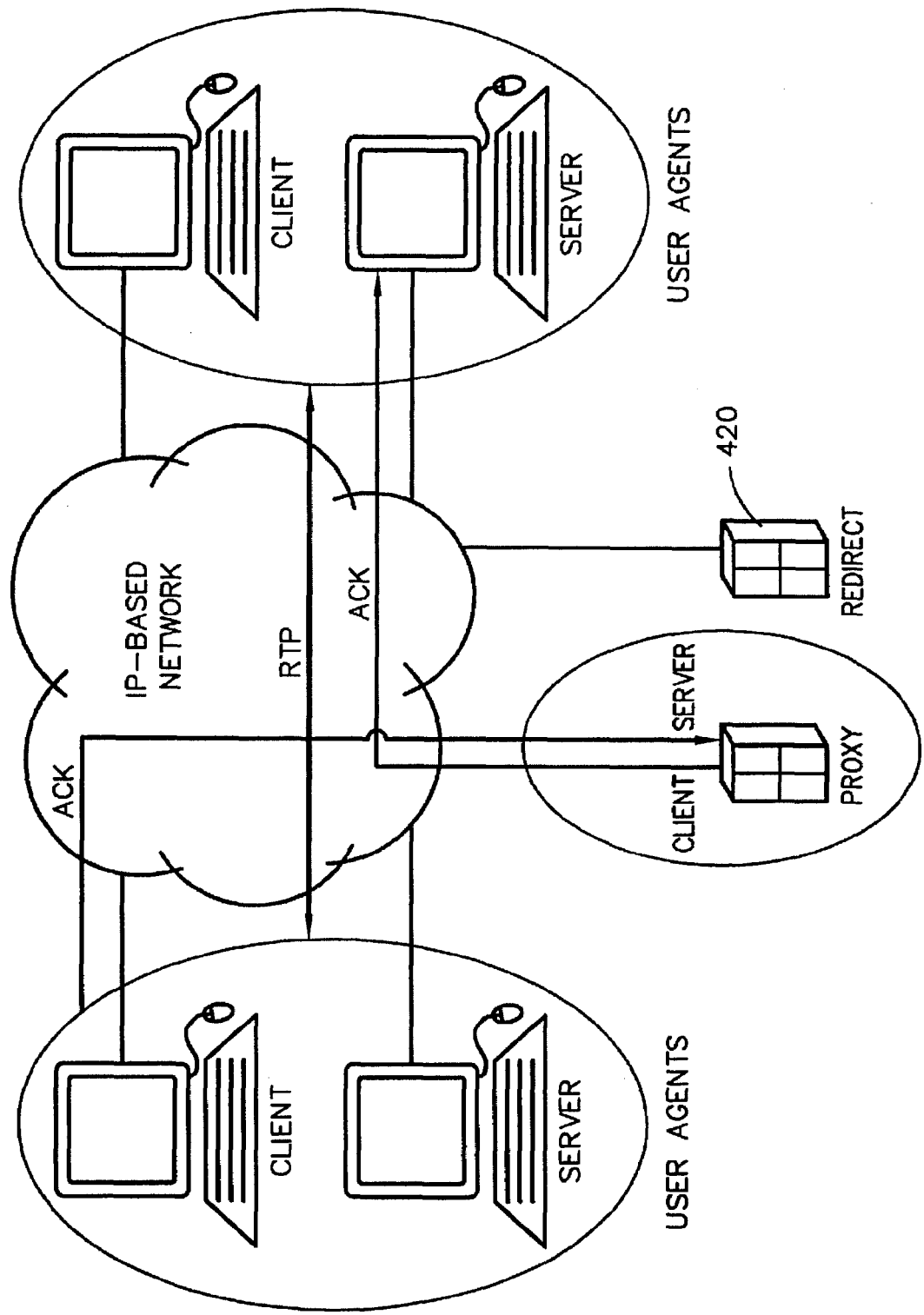
FIG. 38 shows an SIP session through a proxy server.
Figure 39:
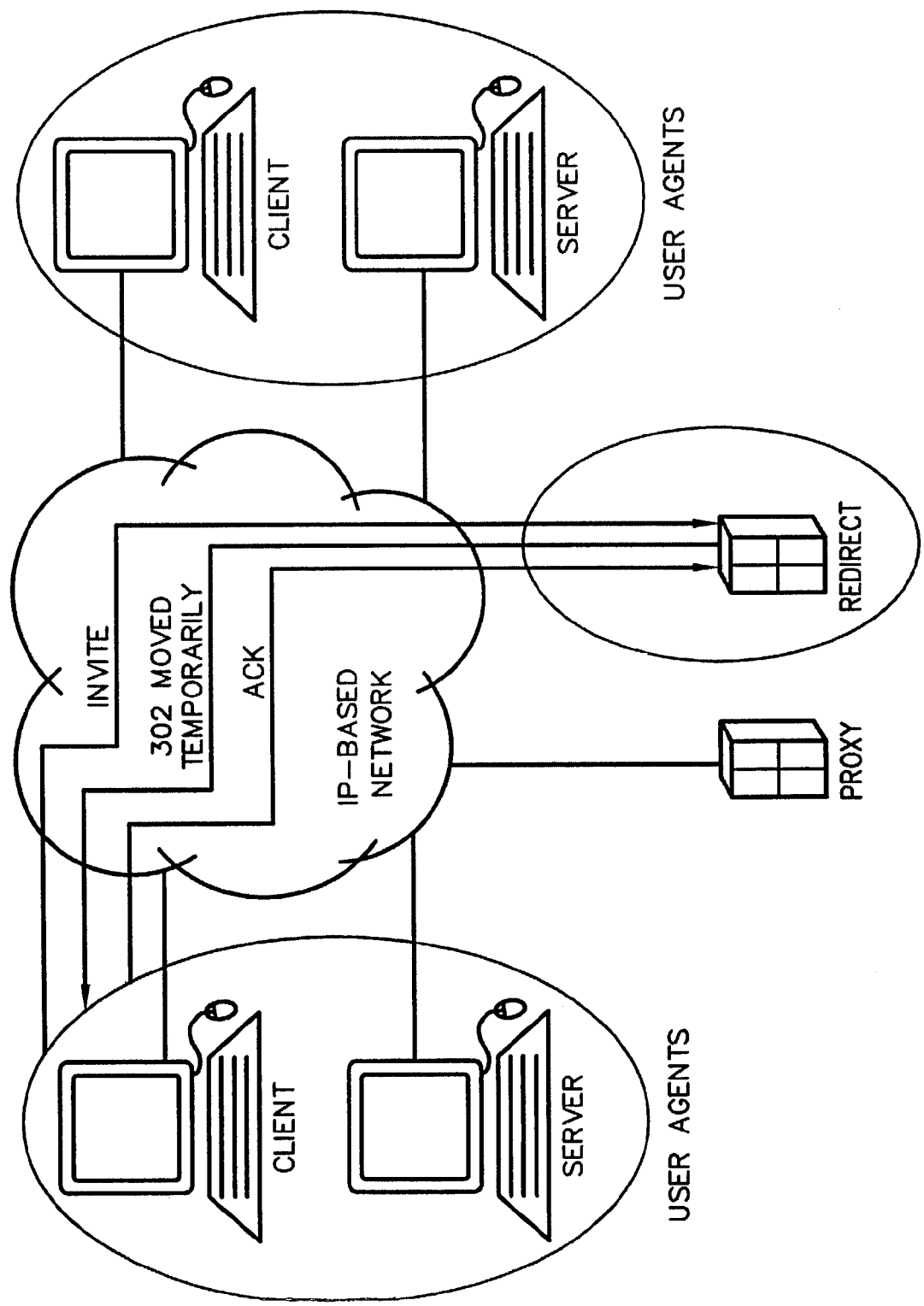
FIG. 39 shows an SIP request through a redirect server.
Figure 40:
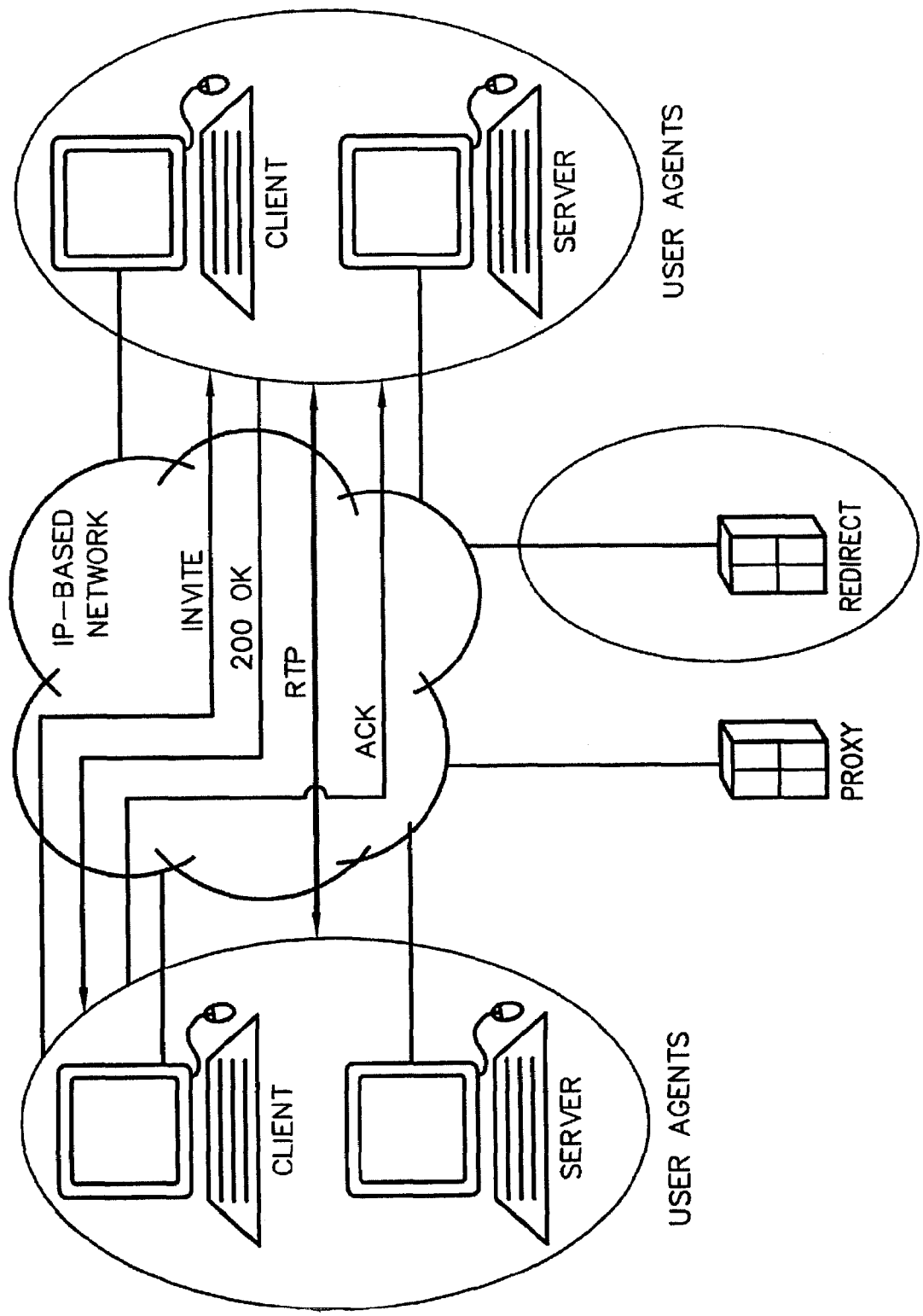
FIG. 40 shows an SIP session through a redirect server.

SIP Servers: An SIP request through a proxy server 406 is shown in FIG. 35. If a proxy server is used, the caller UA sends and INVITE request to the proxy server, the proxy server determines the path, and then forwards the request to the callee. As shown in FIG. 36, the callee responds to the proxy server, which in turn, forwards the response to the caller, see FIG. 37. The proxy server forwards the acknowledgements of both parties. A session is then established between the caller and callee. Real-time transfer protocol is used for the communication between the caller and callee, as shown in FIG. 38. If a redirect server 420 is used, see FIGS. 36, 37, 38, the caller UA sends and INVITE request to the redirect sever, the redirect server contacts the location server to determine the path to the callee, and then the redirect server sends the information back to the caller. The caller then acknowledges receipt of the information, as shown in FIG. 39. The caller then sends the request to the device indicated in the redirection information. Once the request reaches the callee, it sends back a response and the caller acknowledges the response. Real-time transfer protocol is used for the communication between the caller and the callee as shown in FIG. 40.

Figure 41:
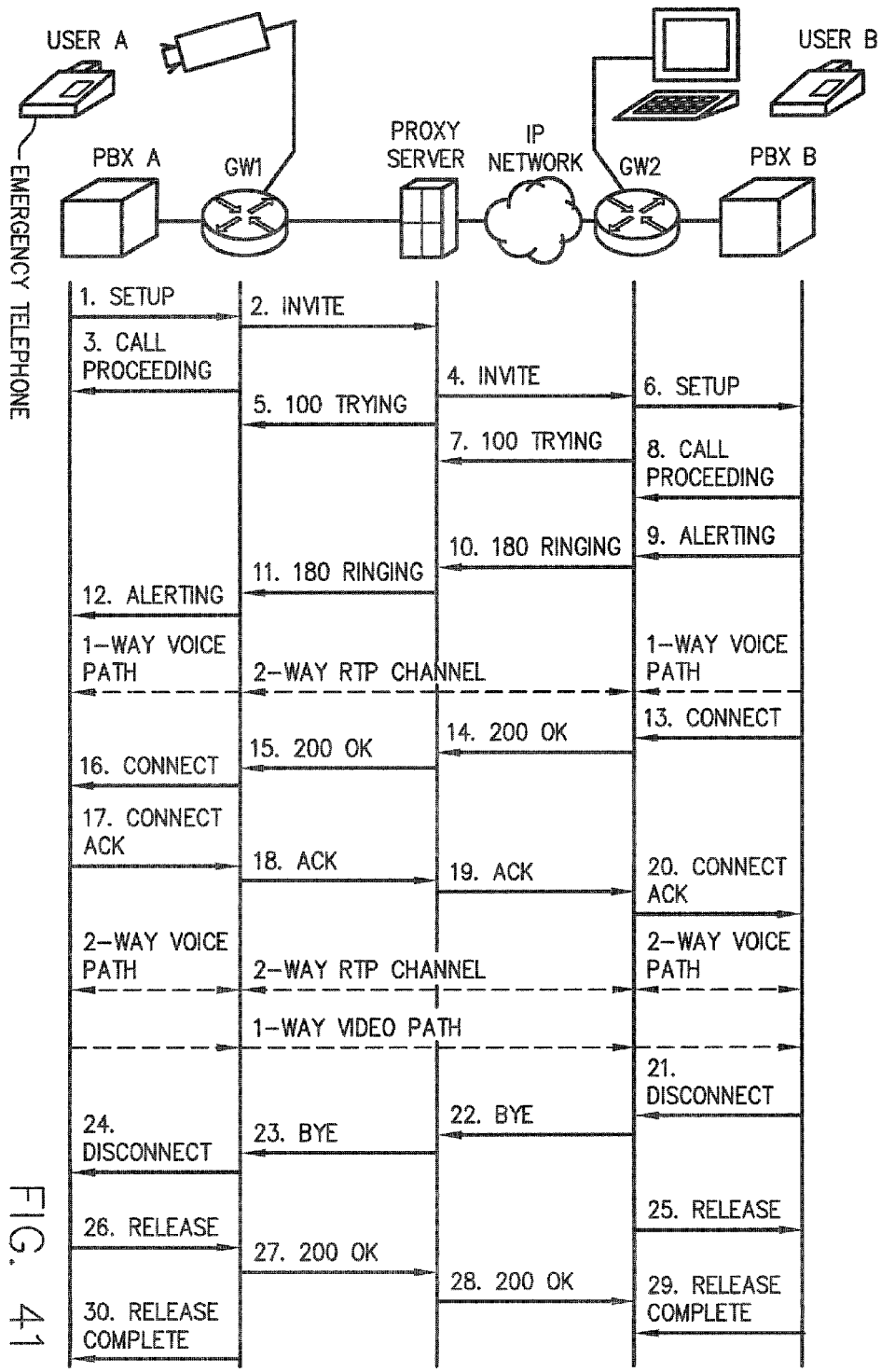
FIG. 41 is an illustration of SIP gateway-to-gateway call via an SIP proxy server with a record route.
Figure 42:
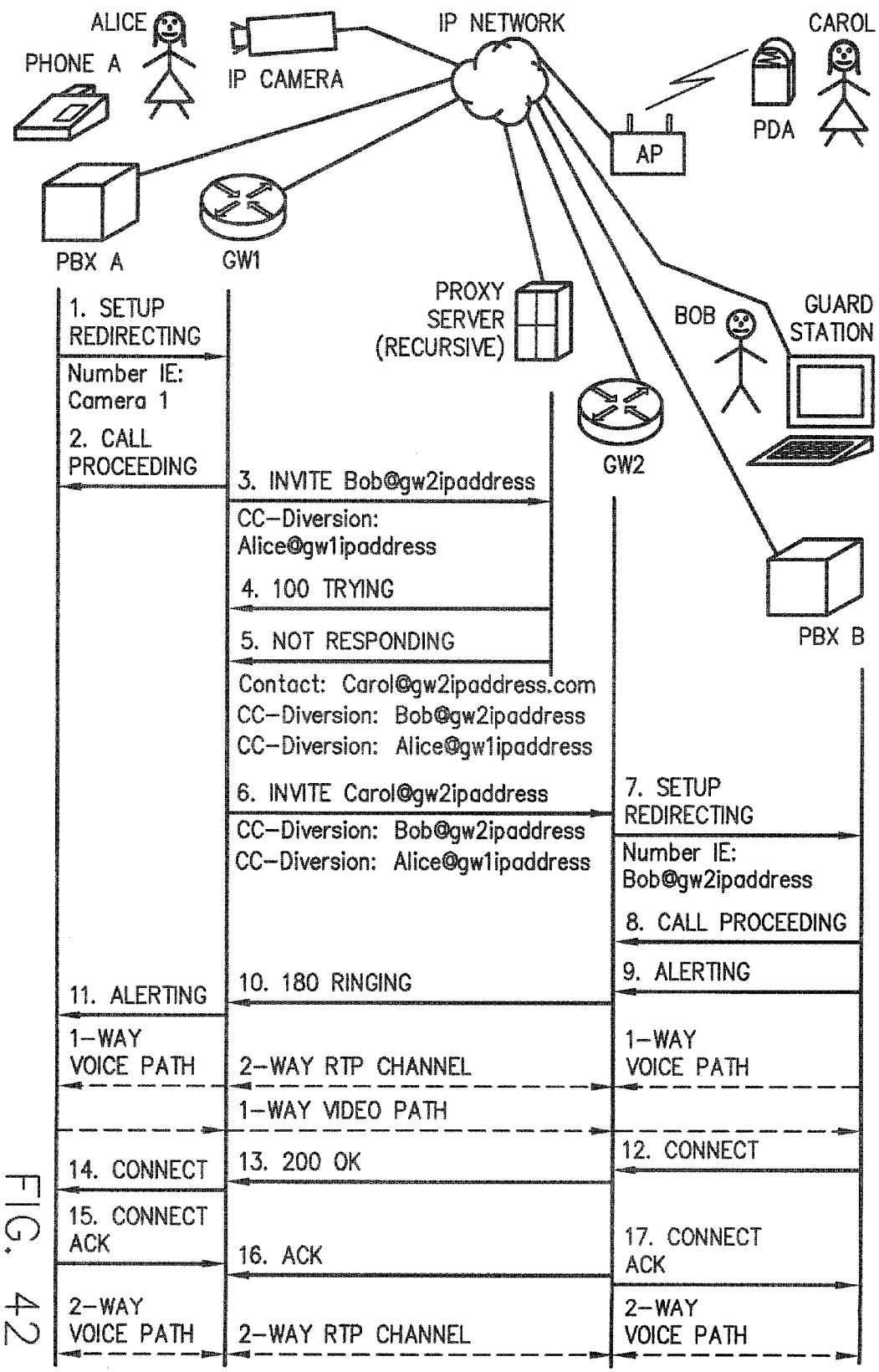
FIG. 42 shows a gateway-to-gateway call with call redirection.
Figure 43:
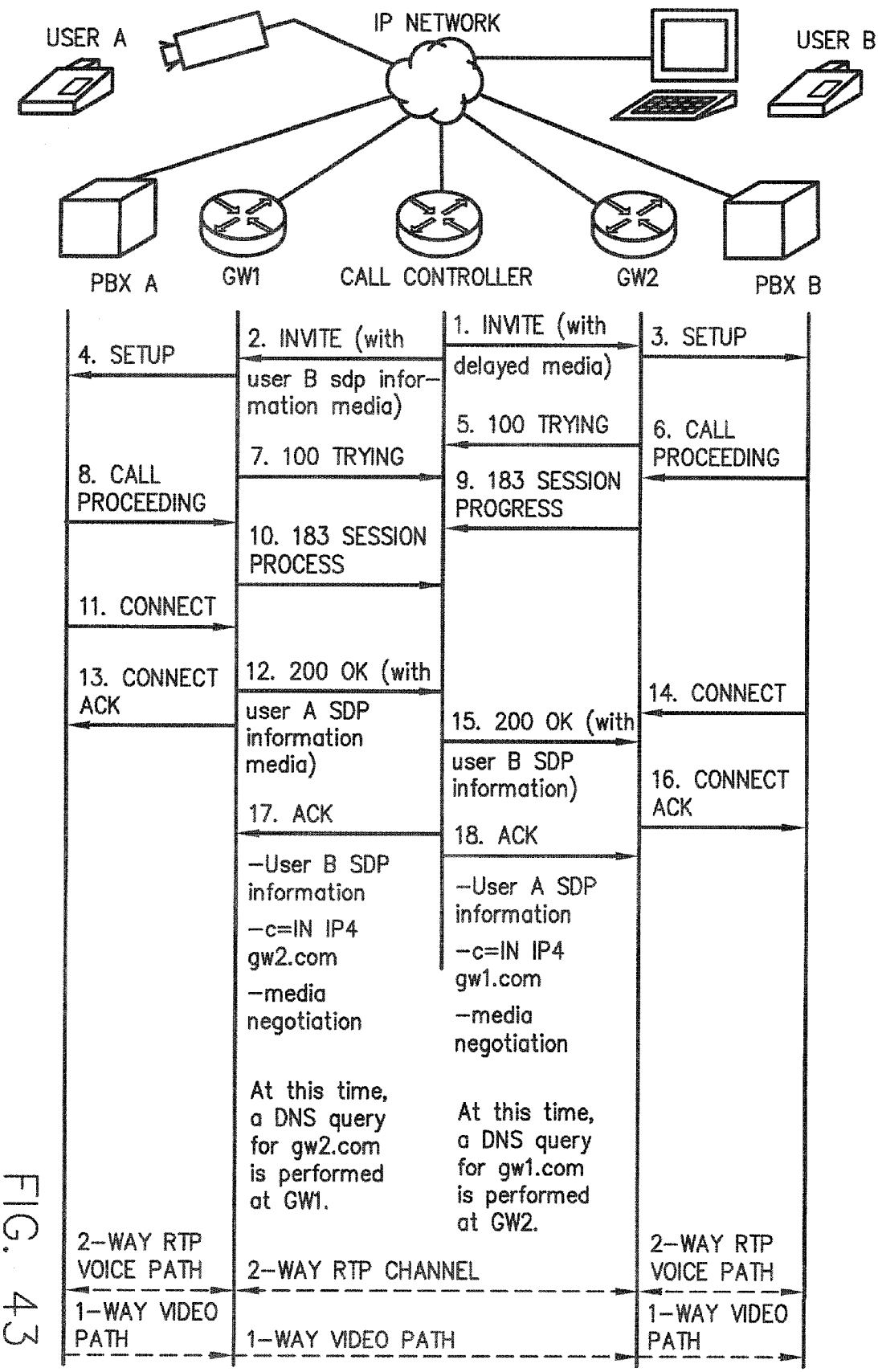
FIG. 43 shows an SIP gateway-to-SIP gateway call setup.
Figure 44:
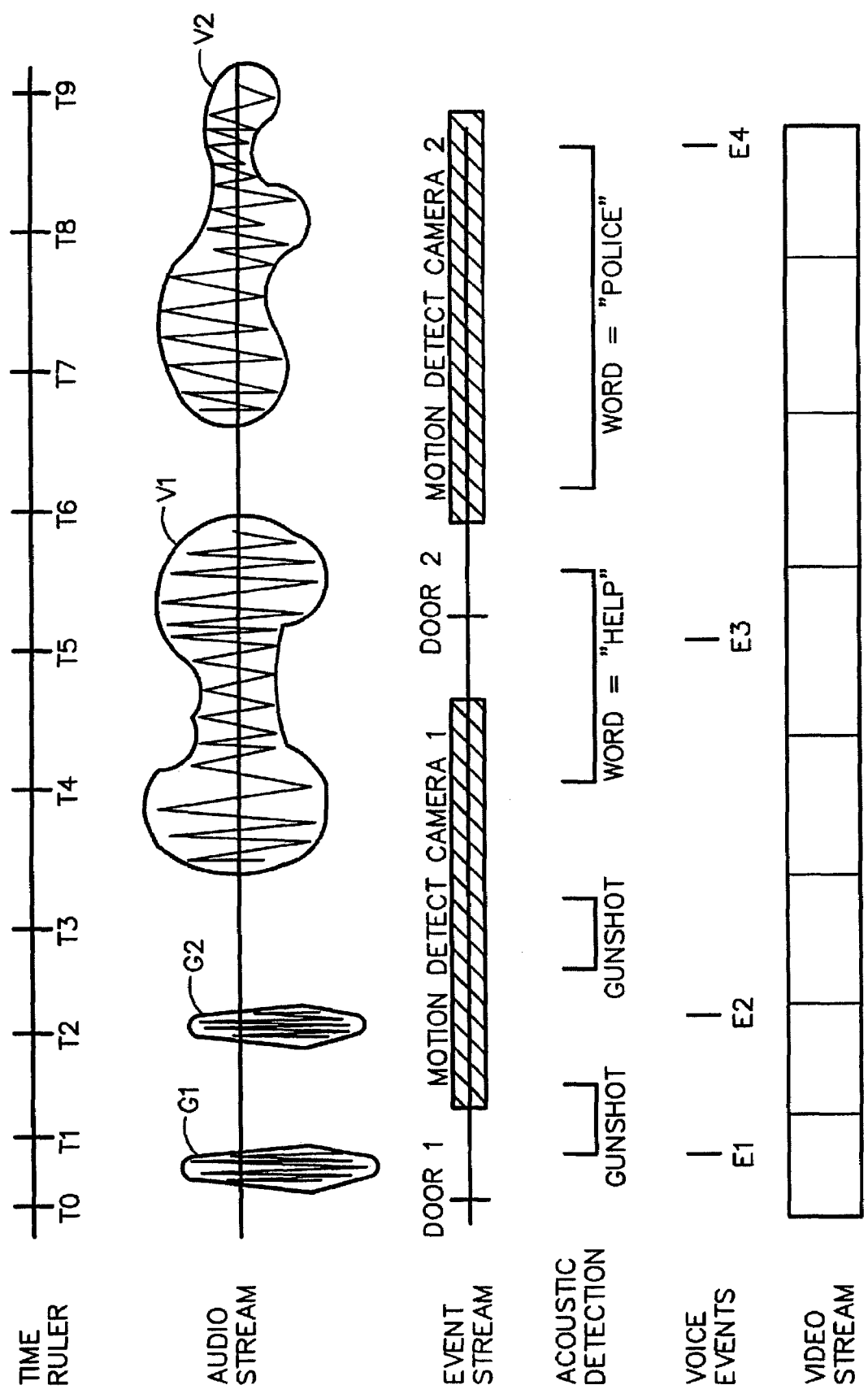
FIG. 44 is a representation of recorded surveillance audio data being searched to generate an index into a comprehensive multimedia database.

The SIP gateway-to-SIP gateway record route and timing sequence is shown in FIG. 41. Call redirection is shown in FIG. 42. FIG. 43 shows call set-up in SDP for a voice call with or without associated video. FIG. 44 shows a typical time sequence for the audio, event and video streams associated with the system, including audio over the telephone, event detection and associated video.

SIP servers include:

Proxy server—The proxy server is an intermediate device that receives SIP requests from a client and then forwards the requests on the client's behalf. Basically, proxy servers receive SIP messages and forward them to the next SIP server in the network. Proxy servers can provide functions such as authentication, authorization, network access control, routing, reliable request retransmission, and security.

Redirect server—Provides the client with information about the next hop or hops that a message should take and then the client contacts the next hop server or UAS directly.

Registrar server—Processes requests from UACs for registration of their current location. Registrar servers are often co-located with redirect or proxy server.

How SIP Works: SIP is a simple, ASCII-based protocol that uses requests and responses to establish communication among the various components in the network and to ultimately establish a conference between two or more end points.

Users in a SIP network are identified by unique SIP addresses. A SIP address is similar to an e-mail address and is in the format of sip:userID@gateway.com. The user ID can be either a user name or an E.164 address.

Users register with a registrar server using their assigned SIP addresses. The registrar server provides this information to the location server upon request.

When a user initiates a call, a SIP request is sent to a SIP server (either a proxy or a redirect server). The request includes the address of the caller (in the From header field) and the address of the intended callee (in the To header field). The following sections provide simple examples of successful, point-to-point calls established using a proxy and a redirect server.

Over time, a SIP end user might move between end systems. The location of the end user can be dynamically registered with the SIP server. The location server can use one or more protocols (including finger, rwhois, and LDAP) to locate the end user. Because the end user can be logged in at more than one station, it might return more than one address for the end user. If the request is coming through a SIP proxy server, the proxy server will try each of the returned addresses until locates the end user. If the request is coming through a SIP redirect server, the redirect server forwards all the address to the caller in the Contact header field of the invitation response.

Using A Proxy Server: If a proxy server is used, the caller UA sends INVITE request to the proxy server, the proxy server determines the path, and then forwards the request to the callee.

The callee responds to the proxy server, which in turn, forwards the response to the caller.

SIP Response Through A Proxy Server: The proxy server forwards the acknowledgments of both parties. A session is then established between the caller and callee. Real-time Transfer Protocol (RTP) is used for the communication between the caller and the callee.

Using a Redirect Server: If a redirect server is used, the caller UA sends an INVITE request to the redirect server, the redirect server contacts the location server to determine the path to the callee, and then the redirect server sends that information back to the caller. The caller then acknowledges receipt of the information.

The caller then sends a request to the device indicated in the redirection information (which could be the callee or another server that will forward the request). Once the request reaches the callee, it sends back a response and the caller acknowledges the response. RTP is used for the communication between the caller and the callee.

In addition to SIP, there are other protocols that facilitate voice transmission over IP. One such protocol is H.323. H.323 originated as an International Telecommunications Union (ITU) multimedia standard and is used for both packet telephony and video streaming. The H.323 standard incorporates multiple protocols, including Q.931 for signaling, H.245 for negotiation, and Registration Admission and Status (RAS) for session control. H.323 was the first standard for call control for VOIP and is supported on all Cisco Systems' voice gateways. SIP and H.323 were designed to address session control and signaling functions in a distributed call control architecture. Although SIP and H.323 can also be used to communicate to limited intelligence end points, they are especially well suited for communication with intelligent end points. Although SIP messages are not directly compatible with H.323, both protocols can coexist in the same packet telephony network if a device that supports the interoperability is available. For example, a call agent could use H.323 to communicate with gateways and use SIP for inner-call agent signaling. Then, after the bearer connection is set up, the bearer information flows between the different gateways as an RTP stream.

Figure 45:
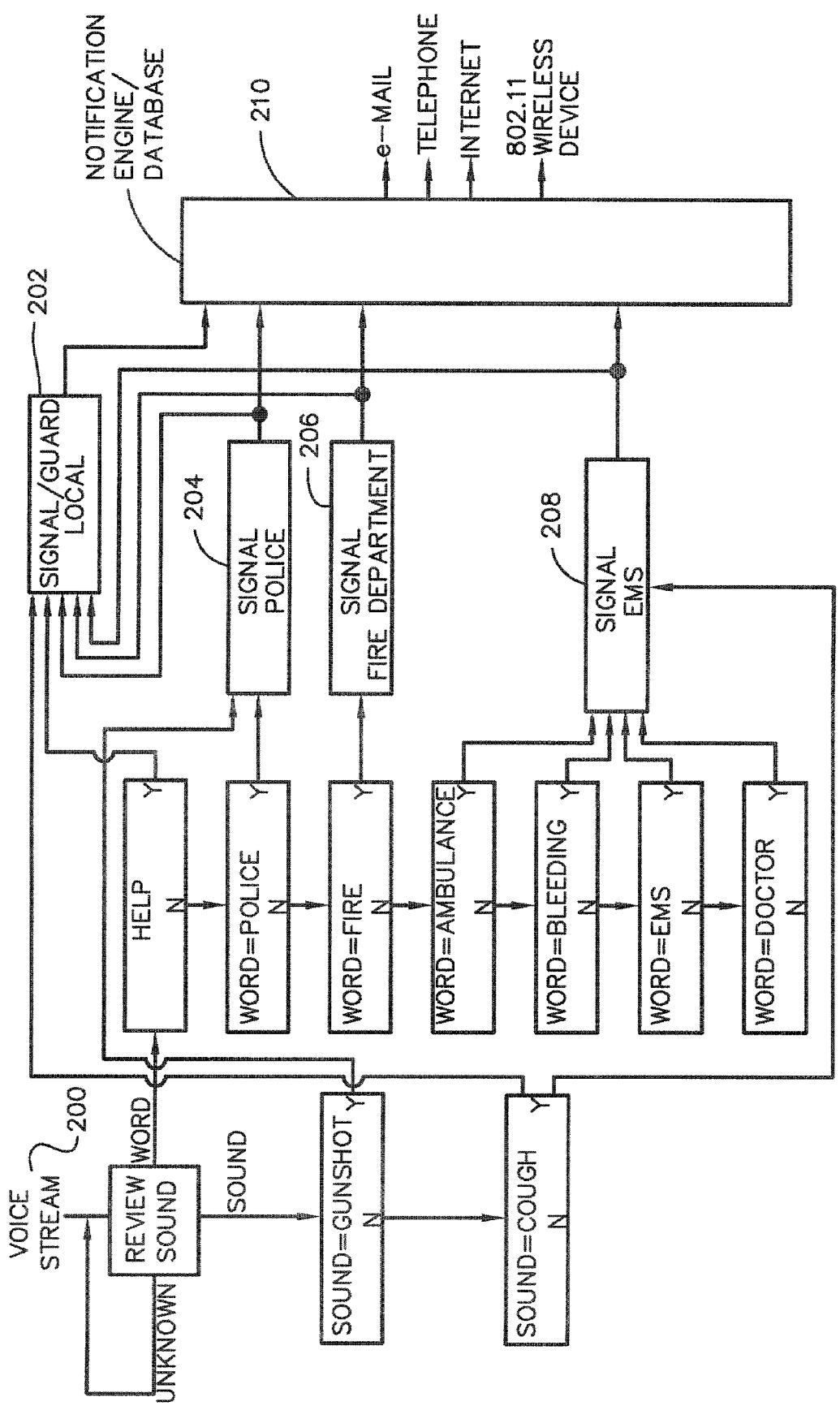
FIG. 45 is a representation of how voice recognition routes signaling among multiple monitoring stations.

FIG. 45 depicts a system having a plurality of pre-programmed signals in addition to the voice stream associated with the VOIP telephone. In this configuration certain sounds such as a gunshot or cough will activate the system as well as the voice stream 500. In addition, preprogrammed requests in word or text form may also be included such as HELP, POLICE, FIRE, AMBULANCE, BLEEDING, EMS, DOCTOR and the like. The selected request is then routed to the appropriate response team by activating a signal to a guard station 502, police 504, fire department 506, and EMS 508 and the like. The system data base is also notified as indicated at 510 and various notification priorities and responses may be activated such as e-MAIL, TELEPHONE, INTERNET and WIRELESS, and the like.

While certain embodiments and features of the subject invention have been described in detail herein it should be understood that the subject invention includes all modifications and enhancements within the scope and spirit of the subject claims.

What is claimed is:

1. A visual surveillance system comprising:
 a. An emergency telephone at an emergency call location, the emergency call location being remote from a monitoring station, the emergency telephone being usable by an emergency user at the emergency call location to generate a signal;
 b. An interface connecting the emergency telephone to an IP network;
 c. A discrete surveillance camera separate from the emergency telephone, the surveillance camera being connected to the IP network and focused on the emergency user and the emergency telephone during use of the emergency telephone, the camera when activated being operable to provide to the network camera captured data, the camera captured data including at least one visual image of the emergency user and the emergency telephone;
 d. A control system connected to the IP network for receiving the signal, the control system activating the camera upon receiving the signal from the emergency telephone;
 e. the monitoring station being connected to the network for receiving the camera captured data, the monitoring station being operable to display a visual image to be viewed by personnel, the monitoring station upon receiving the camera captured data displaying the at least one visual image of the emergency user and the emergency telephone.

2. The system of claim 1, wherein the control system is responsive to receipt of an incoming telephone calls from the emergency telephone.

3. The system of claim 1, wherein the emergency telephone includes an access door for protecting the telephone and wherein the control system is responsive to opening the access door.

4. The system of claim 1, wherein the emergency telephone is a VOIP telephone.

5. The system of claim 1, wherein the emergency telephone is an analog telephone and wherein the system further includes a voice over IP converter device for receiving the telephone signal and transmitting it to the network interface.

6. The system of claim 5, further including a plurality of emergency analog telephones, the system further including a PBX switch for the plurality of telephones and wherein the IP converter device is connected to the PBX and the network interface.

7. The system of claim 1, further including a hub for connecting the camera and the telephone to the network.

8. The system of claim 7, further including a power inserter associated with the hub for powering the camera and telephone.

9. The system of claim 7, wherein the hub is a powered hub for powering the camera and telephone.

10. The system of claim 1, wherein the monitoring station includes a VOIP telephone for communicating with the emergency telephone.

11. The system of claim 1, wherein the monitoring station includes an analog telephone and a voice over IP converter device for converting the transmissions therefrom to an IP protocol for communicating via the network with the emergency telephone.

12. The system of claim 5, including an analog telephone positioned at the monitoring station and connected to the PBX switch for communicating with the emergency telephones.

13. The system of claim 1, including an Internet gateway, and wherein the monitoring station is a remote station on the internet.

14. The system of claim 1, including a wireless access point and wherein the monitoring station is adapted for wireless communication with the wireless access point.

15. The system of claim 14, wherein the monitoring station is a handheld PDA.

16. The system of claim 14, wherein the monitoring station includes VOIP communications capability.

17. A surveillance system adapted for use with an emergency telephone system, the emergency telephone system including an emergency telephone accessible by a respective emergency user at a respective emergency call location for placing a respective emergency call, the emergency location being remote from personnel receiving the emergency call from the emergency telephone on the emergency telephone system, the surveillance system comprising:
 an internet protocol network;
 a network interface connected to the internet protocol network, the network being connected to the emergency telephone system, the emergency telephone system via the network interface being in communication with the internet protocol network to provide to the internet protocol network the emergency call, the emergency call being provided to the internet protocol network in a format compatible with the internet protocol network;

a discrete surveillance camera separate from the emergency telephone, the surveillance camera being operable to capture visual image data of the emergency user placing the emergency call on the emergency telephone, the surveillance camera being in communication with the internet protocol network to provide to the internet protocol network captured visual image data of the emergency user placing the emergency call on the emergency telephone;

a monitoring station in communication with the internet protocol network to receive the captured visual image data of the emergency user placing the emergency call on the emergency telephone, the monitoring station upon receiving the captured visual image data of the emergency user placing the emergency call on the emergency telephone being operable to display for viewing by personnel a visual image of the emergency user placing the emergency call on the emergency telephone; and the emergency call received from the internet protocol network being provided to personnel at the monitoring station viewing the visual image.

18. The system of claim 17, further including a monitoring station on the network for monitoring and assessing the situation at the location from which a call is generated over the emergency telephone.

19. The system of claim 18, the monitoring station including a video monitor.

20. The system of claim 19, further including on the monitor the means for flashing an icon on a map for indicating the position of the specific emergency telephone based on an emergency telephone being accessed.

21. The system of claim 17, further including apparatus for archiving a call and security system data for later retrieval purposes.

22. The system of claim 17, further including a hierarchy manager for answering incoming emergency calls to assure that if the first priority recipient does not respond addition recipients are contacted in an established priority.

23. The system of claim 17, wherein the emergency telephone is an off-the-shelf IP telephone.

24. The system of claim 17, wherein the emergency telephone is an off the shelf analog telephone with an IP analog telephone adapter.

25. The system of claim 23, wherein the telephone includes a display screen for displaying real time alarm events by name, location, type and description in textual and graphical forms.

26. The system of claim 17, further including a processor for providing IP voice applications to host the voice processing functions of the comprehensive multimedia security system.

27. The system of claim 26, wherein the processor is further adapted for providing audio switching/connection functions for the comprehensive multimedia security system.

28. The system of claim 26, wherein the processor is further adapted for providing voice mail functions for providing the audio recording and playback functions of the comprehensive multimedia security system.

29. The system of claim 26, wherein the processor is further adapted for providing an audio search capability allowing for searching by voice recognition and playback of all multimedia data such as audio, video, and textual event data from the voice recognition.

30. The system of claim 29, wherein the voice recognition is adapted for responding to key words.

31. The system of claim 29, wherein the audio search capability is adapted for searching by audio processing seeking events such as gunshots, loud noises, screams, and the like, with playback of all multimedia data such as audio, video, and textual event data from the key point found by audio processing.

32. The system of claim 26, wherein the processor audio capability is further adapted for providing as a monitor for interacting with analog telephones, digital telephones, IP telephones, and security sensors for the purpose of monitoring the audio data.

33. The system of claim 32, wherein the audio capability is further adapted for use as a monitor station as response telephone for answering emergency calls in a comprehensive multimedia security system.

34. The system of claim 32, wherein the audio capability is further adapted for use as intercommunication telephones between two or more monitoring stations in order for multiple response personnel to hear emergency calls simultaneously.

35. The system of claim 32, wherein the audio capability is further adapted for use as intercommunication telephones between two or more monitoring stations in order for multiple response personnel to discuss emergency response action among themselves.

36. The system of claim 32, wherein the audio capability is further adapted for use as telephones to intercommunicate with multiple response personnel to hear emergency calls immediately.

37. The system of claim 32, wherein the audio capability is further adapted for use as intercommunication telephones to monitor the components of the multimedia security system.

38. The system of claim 32, wherein the audio capability is further adapted for use as intercommunication telephones interconnected with the multimedia security system.

39. The system of claim 32, wherein the audio capability is further adapted for use for recalling stored audio information that has been recorded in a comprehensive multimedia database, and to recall data that is associated with it.

40. The system of claim 39, wherein the PDA further includes a VOIP speaker and microphone adapted for use as an intercommunication telephone.

41. The system of claim 17, including a protective housing for the emergency telephone.

42. The system of claim 17, wherein the protective housing includes an openable door and an interactive door switch.

43. The system of claim 17, wherein the protective housing includes an interactive switch hook.

44. The system of claim 17, wherein the multimedia surveillance system includes an alarm appliance configured for communication with an IP telephony processing system in a manner compatible with IP telephones.

45. The system of claim 1, wherein the emergency telephone includes a LAN interface.

46. The system of claim 1, wherein the emergency telephone includes a WAN interface.

47. The system of claim 1, wherein the emergency telephone includes a wireless LAN interface.

48. The system of claim 1, wherein the emergency telephone includes a LAN hub.

49. The system of claim 1, wherein the emergency telephone includes an integral camera.

50. The system of claim 1, wherein the emergency telephone includes an integral camera interface for an associated external analog video camera.

51. The system of claim 1, wherein the emergency telephone includes an integral camera interface for an associated external digital video camera.

52. The system of claim 17, further adapted for utilizing Session Initiated Protocol (SIP) to establish and maintain voice connections between emergency telephones and the multimedia security system.

53. The system of claim 17, further adapted for utilizing H.343 Protocol to establish and maintain voice connections between emergency telephones and the multimedia security system.

54. An emergency communication system comprising:
an emergency telephone at an emergency call location, the emergency call location being remote from a monitoring station, the emergency telephone being usable by an emergency user at the emergency call location to generate an emergency call, the emergency telephone being in communication with the internet protocol network to provide to the internet protocol network the emergency signal;
a surveillance camera at the emergency call location, the surveillance camera being operable to capture visual image data of the emergency user using the emergency telephone to generate the emergency call, the surveillance camera being in communication with the internet protocol network to provide to the internet protocol network captured visual image data of the emergency user;
a monitoring station in communication with the internet protocol network to receive the captured visual image data of the emergency user, the monitoring station upon receiving the captured visual image data of the emergency user being operable to display for viewing by personnel a visual image of the emergency user, the emergency call being directed to the personnel at the monitoring station viewing the visual image of the emergency user.

55. An emergency communication system comprising:
an emergency telephone at an emergency call location, the emergency call location being remote from a monitoring station, the emergency telephone being usable by an emergency user at the emergency call location to generate an emergency call, the emergency telephone being in communication with the internet protocol network to provide to the internet protocol network the emergency signal;
a surveillance camera at the emergency call location, the surveillance camera when the emergency call is generated being operable to capture visual image data of the emergency user using the emergency telephone to generate the emergency call, the surveillance camera being in communication with the internet protocol network to provide to the internet protocol network captured visual image data of the emergency user;
a monitoring station in communication with the internet protocol network to receive the captured visual image data of the emergency user, the monitoring station upon receiving the captured visual image data of the emergency user being operable to display for viewing by personnel a visual image of the emergency user.

* * * * *